United States Patent
Peng et al.

(10) Patent No.: US 11,895,722 B2
(45) Date of Patent: Feb. 6, 2024

(54) COMMUNICATION METHOD IN MULTI-RAT DUAL CONNECTIVITY AND COMMUNICATIONS APPARATUS

(71) Applicant: HUAWEI TECHNOLOGIES CO., LTD., Guangdong (CN)

(72) Inventors: Wenjie Peng, Shanghai (CN); Guanchen Li, Shanghai (CN); Xin Xiong, Beijing (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/129,460

(22) Filed: Dec. 21, 2020

(65) Prior Publication Data

US 2021/0153280 A1    May 20, 2021

Related U.S. Application Data

(63) Continuation of application No. PCT/CN2019/092442, filed on Jun. 23, 2019.

(30) Foreign Application Priority Data

Jun. 22, 2018 (CN) .......................... 201810653785.0
Nov. 2, 2018 (CN) .......................... 201811302962.7

(51) Int. Cl.
*H04W 76/30* (2018.01)
*H04W 76/16* (2018.01)
(Continued)

(52) U.S. Cl.
CPC ............ *H04W 76/16* (2018.02); *H04L 1/1642* (2013.01); *H04W 28/04* (2013.01); *H04W 76/30* (2018.02); *H04W 80/02* (2013.01); *H04W 84/18* (2013.01)

(58) Field of Classification Search
CPC ..... H04W 76/16; H04W 28/04; H04W 76/30; H04W 80/02; H04W 84/18; H04W 76/12; (Continued)

(56) References Cited

U.S. PATENT DOCUMENTS

2015/0146617 A1    5/2015   Park et al.
2017/0034866 A1    2/2017   Wager et al.
(Continued)

FOREIGN PATENT DOCUMENTS

CN    103533586 A    1/2014
CN    104488308 A    4/2015
(Continued)

OTHER PUBLICATIONS

Huawei (PDCP SN Reconfiguration, R2-1702587, Apr. 2017).*
(Continued)

*Primary Examiner* — Lakeram Jangbahadur
(74) *Attorney, Agent, or Firm* — Fish & Richardson P.C.

(57) ABSTRACT

The present disclosure relates to communication methods in multi-rat dual connectivity, apparatus, and systems. In one example method, when a packet data convergence protocol sequence number (PDCP SN) length of a bearer is changed, a secondary node (SN) sends a PDCP SN length change indication to a master node (MN).

14 Claims, 16 Drawing Sheets

(51) Int. Cl.
*H04L 1/1607* (2023.01)
*H04W 28/04* (2009.01)
*H04W 80/02* (2009.01)
*H04W 84/18* (2009.01)

(58) Field of Classification Search
CPC ... H04W 76/32; H04W 28/065; H04W 28/18; H04W 76/15; H04L 1/1642; H04L 5/0091
See application file for complete search history.

(56) References Cited

U.S. PATENT DOCUMENTS

| | | | |
|---|---|---|---|
| 2017/0257792 A1* | 9/2017 | Kim | H04W 74/0833 |
| 2018/0097722 A1 | 4/2018 | Callard | |
| 2018/0183770 A1* | 6/2018 | Wu | H04L 9/32 |
| 2019/0053310 A1* | 2/2019 | Wu | H04W 80/08 |
| 2020/0178128 A1* | 6/2020 | Ingale | H04W 12/04 |

FOREIGN PATENT DOCUMENTS

| | | | | |
|---|---|---|---|---|
| CN | 104704881 | A | | 6/2015 |
| CN | 104704884 | A | | 6/2015 |
| CN | 106063360 | A | | 10/2016 |
| CN | 107342849 | A | | 11/2017 |
| CN | 107925931 | A | | 4/2018 |
| EP | 2854443 | A1 | | 4/2015 |
| IN | 201741028700 | | * 8/2017 | ........ H04W 36/0022 |
| WO | 2012008691 | A2 | | 1/2012 |
| WO | 2016112970 | A1 | | 7/2016 |
| WO | 2018030798 | A1 | | 2/2018 |
| WO | 2018084668 | A1 | | 5/2018 |

OTHER PUBLICATIONS

Ingale et al, Aug. 2017, ;Method and system to support lossless inter-RAT handover, pp. 1-53.*
Extended European Search Report issued in European Application No. 19823604.4 dated Jul. 9, 2021, 9 pages.
Huawei et al., "PDCP SN Reconfiguration," 3GPP TSG-RAN WG2 Meeting #97bis, R2-1702587, Spokane, USA, Apr. 3-7, 2017, 6 pages.
LG Electronics Inc., "pdcp sn length change at handover," 3GPP TSG-RAN WG2 #97bis, R2-1703508, Spokane, USA, Apr. 3-7, 2017, 3 pages.
3GPP TS 36.331 V15.2.1 (Jun. 2018), "3rd Generation Partnership Project;Technical Specification Group Radio Access Network;Evolved Universal Terrestrial Radio Access (E-UTRA);Radio Resource Control (RRC);Protocol specification (Release 15)," Jun. 2018, 791 pages.
3GPP TS 36.423 V15.1.0 (Mar. 2018), "3rd Generation Partnership Project Technical Specification Group Radio Access Network;Evolved Universal Terrestrial Radio Access Network(E-UTRAN);X2 application protocol (X2AP)(Release 15)," Mar. 2018, 354 pages.
3GPP TS 37.324 V15.0.0 (Jun. 2018), "3rd Generation Partnership Project;Technical Specification Group Radio Access Network;E-UTRA and NR;Service Data Adaptation Protocol (SDAP) specification (Release 15)," Jun. 2018, 13 pages.
3GPP TS 37.340 V15.2.0 (Jun. 2018), "3rd Generation Partnership Project;Technical Specification Group Radio Access Network;Evolved Universal Terrestrial Radio Access (E-UTRA) and NR;Multi-connectivity;Stage 2(Release 15)," Jun. 2018, 55 pages.
3GPP TS 37.470 V0.1.0 (May 2018), "3rd Generation Partnership Project;Technical Specification Group Radio Access Network;Evolved Universal Terrestrial Radio Access Network (E-UTRAN) and NG-RAN;W1 general aspects and principles(Release 15)," May 2018, 10 pages.
3GPP TS 37.473 V0.0.1 (May 2018), "3rd Generation Partnership Project;Technical Specification Group Radio Access Network;Evolved Universal Terrestrial Radio Access Network (E-UTRAN) and NG-RAN;W1 application protocol (W1AP)(Release 15)," May 2018, 7 pages.
3GPP TS 38.322 V15.2.0 (Jun. 2018), "3rd Generation Partnership Project;Technical Specification Group Radio Access Network;NR-;Radio Link Control (RLC) protocol specification(Release 15)," Jun. 2018, 33 pages.
3GPP TS 38.323 V15.2.0 (Jun. 2018), 3rd Generation Partnership Project;Technical Specification Group Radio Access Network;NR;Packet Data Convergence Protocol (PDCP) specification(Release 15), Jun. 2018, 26 pages.
3GPP TS 38.331 V15.2.1 (Jun. 2018), "3rd Generation Partnership Project;Technical Specification Group Radio Access Network;NR-;Radio Resource Control (RRC) protocol specification(Release 15)," Jun. 2018, 303 pages.
3GPP TS 38.401 V15.1.0 (Mar. 2018), "3rd Generation Partnership Project; Technical Specification Group Radio Access Network;NG-RAN;Architecture description(Release 15)," Mar. 2018, 23 pages.
3GPP TS 38.423 V1.0.0 (Jun. 2018), "3rd Generation Partnership Project;Technical Specification Group Radio Access Network;NG-RAN;Xn application protocol (XnAP)(Release 15)," Jun. 2018, 194 pages.
3GPP TS 38.473 V15.1.1 (Apr. 2018), "3rd Generation Partnership Project; Technical Specification Group Radio Access Network; NG-RAN; F1 application protocol (F1AP) (Release 15)," Apr. 2018, 106 pages.
Huawei et al., "L2 handling for bearer type change when PDCP SN length changed," 3GPP TSG-RAN WG2 102 R2-1808949, Busan, Korea, May 21-25, 2018, 3 pages.
Huawei, HiSilicon, "PDCP SN Reconfiguration," 3GPP TSG-RAN WG2 Meeting #97, R2-1701209, Athens, Greece, Feb. 13-17, 2017, 7 pages.
Nec et al., "X2 basic mobility procedures for EN-DC," 3GPP TSG-RAN WG3#98, R3-174910, Reno, USA, Nov. 27-Dec. 1, 2017, 11 pages.
Office Action issued in Chinese Application No. 201910899152.2 dated Mar. 27, 2020, 24 pages (with English translation).
Office Action issued in Chinese Application No. 201910899152.2 dated Jul. 8, 2020, 25 pages (with English translation).
PCT International Search Report and Written Opinion issued in International Application No. PCT/CN2019/092442 dated Sep. 27, 2019, 13 pages.
Guangdong OPPO Mobile Telecom, "Impact on Common Channel Reception to PDCCH design," 3GPP TSG RAN WG1 meeting #89, R1-1707709, Hangzhou, China, May 15-19, 2017, 6 pages.
Huawei, HiSilicon, "PDCP SN Reconfiguration," 3GPP TSG-RAN WG2 Meeting #97bis, R2-1702587, Spokane, USA, Apr. 3-7, 2017, 6 pages.

* cited by examiner

COMMUNICATION METHOD IN MULTI-RAT DUAL CONNECTIVITY AND COMMUNICATIONS APPARATUS

CROSS-REFERENCE TO RELATED APPLICATIONS

This application is a continuation of International Application No. PCT/CN2019/092442, filed on Jun. 23, 2019, which claims priority to Chinese Patent Application No. 201811302962.7, filed on Nov. 2, 2018 and claims priority to Chinese Patent Application No. 201810653785.0, filed on Jun. 22, 2018. The disclosures of the aforementioned applications are hereby incorporated by reference in their entireties.

TECHNICAL FIELD

This application relates to the field of wireless communications technologies, and in particular, to a communication method in multi-rat dual connectivity and a communications apparatus.

BACKGROUND

To improve a data transmission throughput, dual connectivity supporting different access technologies is introduced, for example, multi-rat dual connectivity (Multi-RAT Dual Connectivity, MR-DC).

FIG. 1 is a schematic diagram of a dual-connectivity communications system. As shown in FIG. 1, a terminal 21 may simultaneously communicate with a master node (master node, MN) 01 and a secondary node (secondary node, SN) 11. The MN 01 and the SN 11 may be connected to each other. Both the master node 01 and the secondary node 11 may be connected to a core network element 31. The MN 01 and the SN 11 may use different access technologies.

The MR-DC may specifically include the following scenarios:

1. Evolved universal terrestrial radio access (Evolved Universal Terrestrial Radio Access, E-UTRA) and new radio (New Radio, NR) dual connectivity (E-UTRA-NR Dual Connectivity, EN-DC)

As shown in FIG. 2, a core network element 31 is an evolved packet core (evolved packet core, EPC), an MN 01 is an evolved node (evolved universal terrestrial radio access network NodeB, eNB), and an SN 11 is a new radio node (new radio nodeB, gNB).

The MN 01 may be connected to the SN 11 by using an X2 interface, and a user plane connection may exist between the MN 01 and the SN 11. The MN 01 may be connected to the core network element 31 by using an S1 interface, and a user plane connection may exist between the MN 01 and the core network element 31. The SN 11 may be connected to the core network element 31 by using an S1-U interface, and a user plane connection may exist between the SN 11 and the core network element 31.

2. Next generation (Next Generation, NG) radio access network (Radio Access Network, RAN) E-UTRA and NR dual connectivity (NG-RAN E-UTRA-NR Dual Connectivity, NGEN-DC)

As shown in FIG. 3, a core network element 31 is a 5th generation (5G, 5th Generation) core (5G core, 5GC), an MN 01 is an eNB, and an SN 11 is a gNB.

The MN 01 may be connected to the SN 11 by using an Xn interface, and a user plane connection may exist between the MN 01 and the SN 11. The MN 01 may be connected to the core network element 31 by using an NG interface, and a user plane connection may exist between the MN 01 and the core network element 31. The SN 11 may be connected to the core network element 31 by using an NG-U interface, and a user plane connection may exist between the SN 11 and the core network element 31.

3. NR and E-UTRA dual connectivity (NR-E-UTRA Dual Connectivity, NG-DC)

As shown in FIG. 4, a core network element 31 is a 5GC, an MN 01 is a gNB, and an SN 11 is an eNB.

The MN 01 may be connected to the SN 11 by using, for example, an Xn interface, and a user plane connection may exist between the MN 01 and the SN 11. The MN 01 may be connected to the core network element 31 by using, for example, an NG interface, and a user plane connection may exist between the MN 01 and the core network element 31. The SN 11 may be connected to the core network element 31 by using, for example, an NG-U interface, and a user plane connection may exist between the SN 11 and the core network element 31.

In each of the foregoing scenarios, from a perspective of the MN 01 and the SN 11, a user plane may have the following six types of bearers. As shown in FIG. 5, the following separately describes a data flow direction of each type of bearer by using downlink as an example. A person skilled in the art may understand that a case in uplink is similar to that in downlink. Details are not described herein again.

1. MN-Terminated Master Cell Group (Master Cell Group, MCG) Bearer

Data is delivered from a core network element 31 to an MN 01, and is sent to a terminal 21 through a packet data convergence protocol (packet data convergence protocol, PDCP) layer, a radio link control (Radio Link Control, RLC) protocol layer, and a media access control (Media Access Control, MAC) layer of the MN 01 in sequence.

2. MN-Terminated Secondary Cell Group (Secondary Cell Group, SCG) Bearer

Data is delivered from a core network element 31 to the MN 01, sent to an RLC layer of an SN 11 through a PDCP layer of the MN 01, and sent to a terminal 21 through the RLC layer and a MAC layer of the SN 11 in sequence.

3. MN-Terminated Split (Split) Bearer

Data is delivered from a core network element 31 to the MN 01. The PDCP layer of the MN 01 splits the data. One part of the data is sent to a terminal 21 through an RLC entity and a MAC entity of the MN 01 in sequence. The other part of the data is sent to the RLC layer of the SN 11, and sent to the terminal 21 through the RLC layer and the MAC layer of the SN 11 in sequence.

4. SN-Terminated Split Bearer

Data is delivered from a core network element 31 to the SN 11. A PDCP layer of the SN 11 splits the data. One part of the data is sent to a terminal 21 through an RLC entity and a MAC entity of the SN 11 in sequence. The other part of the data is sent to an RLC layer of the MN 01, and sent to a terminal 21 through the RLC layer and a MAC layer of the MN 01 in sequence.

5. SN-Terminated MCG Bearer

Data is delivered from a core network element 31 to the SN 11, sent to the RLC layer of the MN 01 through the PDCP layer of the SN 11, and sent to a terminal 21 through the RLC layer and the MAC layer of the MN 01 in sequence.

6. SN-Terminated SCG Bearer

Data is delivered from a core network element 31 to the SN 11, and sent to a terminal 21 through the PDCP layer, the RLC layer, and the MAC layer of the SN 11 in sequence.

The MCG bearer relates to an MCG air interface resource, the SCG bearer relates to an SCG air interface resource, and the split bearer relates to an MCG air interface resource and an SCG air interface resource.

A PDCP entity of the bearer terminated at the MN is on the MN, and a PDCP entity of the bearer terminated at the SN is on the SN. Both the PDCP entity of the bearer terminated at the MN and the PDCP entity of the bearer terminated at the SN may be configured as an NR PDCP entity. The NR PDCP entity may add a PDCP sequence number (sequence number, SN) to each PDCP packet, so that after receiving a plurality of PDCP packets, the terminal 21 sorts the plurality of PDCP packets based on PDCP SNs. A length of the PDCP SN may have a plurality of possibilities, for example, may be 12 bits (bit) or 18 bits. How to change a length of a PDCP SN of a bearer is an urgent problem to be resolved.

SUMMARY

Embodiments of this application provide a communication method in multi-rat dual connectivity, an apparatus, and a system, to change a PDCP SN length of a bearer.

According to a first aspect, an embodiment of this application provides a communication method in multi-rat dual connectivity. The method may be applied to a secondary node or a chip in a secondary node.

The method may include: generating a second PDCP SN length configuration of a first bearer, where the second PDCP SN length configuration of the first bearer may indicate a second PDCP SN length of the first bearer; generating a PDCP SN length change indication of the first bearer when the second PDCP SN length of the first bearer is different from a first PDCP SN length of the first bearer; and sending the PDCP SN length change indication of the first bearer to an MN, where the first PDCP SN length is a PDCP SN length that is used before the PDCP SN length of the first bearer is the second PDCP SN length.

The secondary node sends the PDCP SN length change indication to the master node, so that the master node can learn that the PDCP SN length is changed, and the secondary node and the master node can generate release and addition configuration information for the bearer for a terminal, thereby completing the change of the PDCP SN length.

Optionally, in the method, the first bearer is terminated at the SN when the PDCP SN length of the first bearer is the first PDCP SN length.

Optionally, in the method, a bearer type that is of the first bearer and used when the PDCP SN length is the first PDCP SN length is the same as a bearer type that is of the first bearer and used when the PDCP SN length is the second PDCP SN length.

Optionally, in the method, a bearer type that is of the first bearer and used when the PDCP SN length is the first PDCP SN length is different from a bearer type that is of the first bearer and used when PDCP SN length is the second PDCP SN length.

Optionally, in the method, the sending, by the SN, the PDCP SN length change indication of the first bearer to an MN includes:

sending, by the SN, a secondary node modification required message or a secondary node modification request acknowledge message to the MN, where the secondary node modification required message includes the PDCP SN length change indication of the first bearer.

Optionally, the method further includes: generating, by the SN, first configuration information of the first bearer; and sending, by the SN, the first configuration information of the first bearer to the MN. The first configuration information of the first bearer includes configuration information for releasing and adding a PDCP entity.

Optionally, in the method, the first configuration information of the first bearer further includes configuration information for releasing and adding an RLC entity.

Optionally, in the method, before the secondary node SN generates the second PDCP SN length configuration of the first bearer, the first bearer is terminated at the MN. The method further includes: receiving, by the SN, a first PDCP SN length configuration from the MN, where the first PDCP SN length configuration is used to indicate the first PDCP SN length.

Optionally, in the method, the sending, by the SN, the PDCP SN length change indication of the first bearer to an MN includes: sending a secondary node modification required message or a secondary node modification request acknowledge message to the MN, where the secondary node modification required message or the secondary node modification request acknowledge message includes the PDCP SN length change indication of the first bearer.

Optionally, in the method, when the PDCP SN length of the first bearer is the first PDCP SN length, the first bearer is an MN-terminated MCG bearer. The sending, by the SN, the PDCP SN length change indication of the first bearer to the MN includes: sending, by the SN, a secondary node addition request acknowledge message to the MN, where the secondary node addition request acknowledge message includes the PDCP SN length change indication of the first bearer.

Optionally, the method further includes: generating, by the SN, first configuration information of the first bearer; and sending, by the SN, the first configuration information of the first bearer to the MN, where the first configuration information of the first bearer includes configuration information for adding a PDCP entity.

Optionally, the method further includes: generating, by the SN, first configuration information of the first bearer; and sending, by the SN, the first configuration information of the first bearer to the MN, where the first configuration information of the first bearer includes configuration information for deleting and adding a PDCP entity.

Optionally, in the method, the first configuration information of the first bearer further includes configuration information for releasing and adding an RLC entity.

According to a second aspect, an embodiment of this application provides a communication method in multi-rat dual connectivity. The method may be applied to a secondary node or a chip in a secondary node.

The method includes: receiving a second PDCP SN length of a second bearer from an MN, where a PDCP SN length of the second bearer is a first PDCP SN length before the second PDCP SN length of the second bearer is received from the MN; and determining, when the second PDCP SN length of the second bearer is different from the first PDCP SN length of the second bearer, that the PDCP SN length of the second bearer is changed.

The MN sends the second PDCP SN length to an SN, so that the SN can store the second PDCP SN length, and the SN can autonomously determine whether the PDCP SN length is changed. When the PDCP SN length may not be limited to 12 bits or 18 bits, there may be many possibilities of changing the PDCP SN length, and the SN can determine whether the PDCP SN length is changed, so that the SN can generate release and addition configuration information for the bearer for a terminal, thereby completing the change of the PDCP SN length.

Optionally, in the method, when the PDCP SN length of the second bearer is the first PDCP SN length, the second bearer is terminated at the MN; when the PDCP SN length of the second bearer is the second PDCP SN length, the second bearer is terminated at the MN.

Optionally, in the method, a bearer type that is of the second bearer and used when the PDCP SN length is the first PDCP SN length is the same as a bearer type that is of the second bearer and used when the PDCP SN length is the second PDCP SN length.

Optionally, in the method, a bearer type that is of the second bearer and used when the PDCP SN length is the first PDCP SN length is different from a bearer type that is of the second bearer and used when the PDCP SN length is the second PDCP SN length.

Optionally, the method further includes: generating first configuration information of the second bearer; and sending, by the SN, the first configuration information of the second bearer to the MN, where the first configuration information of the second bearer includes configuration information for releasing and adding an RLC entity.

Optionally, in the method, when the PDCP SN length of the second bearer is the first PDCP SN length, the second bearer is terminated at the SN; when the PDCP SN length of the second bearer is the second PDCP SN length, the second bearer is terminated at the MN. The method further includes: sending, by the SN, the first PDCP SN length to the MN.

Optionally, the method further includes: generating, by the SN, first configuration information of the second bearer; and sending, by the SN, the first configuration information of the second bearer to the MN, where the first configuration information of the second bearer includes configuration information for releasing a PDCP entity.

Optionally, in the method, the first configuration information of the second bearer further includes configuration information for releasing and adding an RLC entity.

Optionally, the method further includes: generating, by the SN, first configuration information of the second bearer; and sending, by the SN, the first configuration information of the second bearer to the MN, where the first configuration information of the second bearer includes configuration information for releasing and adding an RLC entity.

According to a third aspect, an embodiment of this application provides a communication method in multi-rat dual connectivity, which may be applied to a master node or a chip in a master node.

The method includes: receiving a PDCP SN length change indication of a first bearer from an SN; and storing the PDCP SN length change indication of the first bearer.

The master node receives the PDCP SN length change indication from a secondary node, so that the master node can learn that a PDCP SN length is changed, and the secondary node and the master node can generate release and addition configuration information for the bearer for a terminal, thereby completing the change of the PDCP SN length.

Optionally, in the method, the first bearer is terminated at the SN before the PDCP SN length of the first bearer is changed.

Optionally, in the method, a bearer type that is of the first bearer and used before the PDCP SN length is changed is the same as a bearer type that is of the first bearer and used after the PDCP SN length is changed.

Optionally, in the method, a bearer type that is of the first bearer and used before the PDCP SN length is changed is different from a bearer type that is of the first bearer and used after the PDCP SN length is changed.

Optionally, the method further includes: receiving, by the MN, first configuration information of the first bearer from the SN; and sending, by the MN, the first configuration information of the first bearer to the terminal. The first configuration information of the first bearer includes configuration information for releasing and adding a PDCP entity.

Optionally, in the method, the first configuration information of the first bearer further includes configuration information for releasing and adding an RLC entity.

Optionally, the method further includes: generating second configuration information of the first bearer based on the PDCP SN length change indication of the first bearer; and sending the second configuration information of the first bearer to the terminal, where the second configuration information of the first bearer includes configuration information for releasing and adding an RLC entity.

Optionally, in the method, the first bearer is terminated at the MN before the PDCP SN length of the first bearer is changed.

The method further includes: sending, by the MN to the SN, a PDCP SN length used before the PDCP SN length of the first bearer is changed.

Optionally, in the method, the first configuration information of the first bearer includes configuration information for adding a PDCP entity.

Optionally, in the method, the first configuration information of the first bearer further includes configuration information for releasing and adding an RLC entity.

Optionally, in the method, the first configuration information of the first bearer further includes configuration information for releasing and adding an RLC entity.

Optionally, the method further includes: generating second configuration information of the first bearer based on the PDCP SN length change indication of the first bearer; and sending the second configuration information of the first bearer to the terminal, where the second configuration information of the first bearer includes configuration information for releasing a PDCP entity.

Optionally, the method further includes: generating, by the MN, second configuration information of the first bearer based on the PDCP SN length change indication of the first bearer; and sending, by the MN, the second configuration information of the first bearer to the terminal, where the second configuration information of the first bearer includes configuration information for releasing and adding a PDCP entity.

Optionally, in the method, the second configuration information of the first bearer further includes configuration information for releasing and adding an RLC entity.

According to a fourth aspect, an embodiment of this application provides a communication method in multi-rat dual connectivity, which may be applied to a master node or a chip in a master node.

The method includes: generating a second PDCP SN length of a second bearer, where a PDCP SN length of the second bearer is a first PDCP SN length before the second PDCP SN length of the second bearer is generated; and determining, when the second PDCP SN length of the second bearer is different from the first PDCP SN length of the second bearer, that the PDCP SN length of the second bearer is changed.

The MN can autonomously determine whether the PDCP SN length is changed. When the PDCP SN length may not be limited to 12 bits or 18 bits, there may be many possibilities for changing the PDCP SN length, and the MN can determine whether the PDCP SN length is changed, so that the MN can generate release and addition configuration information for the bearer for a terminal, thereby completing the change of the PDCP SN length.

Optionally, in the method, the second bearer is terminated at the MN when the PDCP SN length of the second bearer is the first PDCP SN length.

Optionally, in the method, a bearer type that is of the second bearer and used when the PDCP SN length is the first PDCP SN length is the same as a bearer type that is of the second bearer and used when the PDCP SN length is the second PDCP SN length.

Optionally, in the method, a bearer type that is of the second bearer and used when the PDCP SN length is the first PDCP SN length is different from a bearer type that is of the second bearer and used when the PDCP SN length is the second PDCP SN length.

Optionally, the method further includes: receiving first configuration information of the second bearer from an SN, where the first configuration information of the second bearer includes configuration information for releasing and adding an RLC entity.

Optionally, the method further includes: generating second configuration information of the second bearer, where the second configuration information of the second bearer includes configuration information for releasing and adding a PDCP entity.

Optionally, in the method, the second configuration information of the second bearer further includes configuration information for releasing and adding an RLC entity.

Optionally, in the method, when the PDCP SN length of the second bearer is the first PDCP SN length, the second bearer is terminated at the SN. The method further includes: receiving the first PDCP SN length from the SN. The SN may carry the first PDCP SN length in an information element that can be read by the MN, and the MN may read the first PDCP SN length. Optionally, the MN may store the first PDCP SN length. The SN sends the first PDCP SN length to the MN, so that the MN reads the first PDCP SN length, and the MN can autonomously determine whether the PDCP SN length is changed.

Optionally, the method further includes: receiving first configuration information of the second bearer from an SN, where the first configuration information of the second bearer includes configuration information for releasing a PDCP entity.

Optionally, the first configuration information of the second bearer includes configuration information for releasing and adding an RLC entity.

Optionally, the method further includes: receiving first configuration information of the second bearer from an SN, where the first configuration information of the second bearer includes configuration information for releasing and adding an RLC entity.

Optionally, the method further includes: generating second configuration information of the second bearer, where the second configuration information of the second bearer includes configuration information for adding a PDCP entity.

Optionally, the method further includes: generating second configuration information of the second bearer, where the second configuration information of the second bearer includes configuration information for releasing and adding a PDCP entity.

Optionally, in the method, the second configuration information of the second bearer includes configuration information for releasing and adding an RLC entity.

According to a fifth aspect, an embodiment of this application provides a communications apparatus, which may be applied to a secondary node or a chip in a secondary node. The communications apparatus includes a memory and a processor. The memory is configured to store a computer program, and the processor is configured to invoke the computer program from the memory and run the computer program, so that the communications apparatus performs the method in the first aspect or the second aspect.

According to a sixth aspect, an embodiment of this application provides a communications apparatus, which may be applied to a master node or a chip in a master node. The communications apparatus includes a memory and a processor. The memory is configured to store a computer program, and the processor is configured to invoke the computer program from the memory and run the computer program, so that the communications apparatus performs the method in the third aspect or the fourth aspect.

According to a seventh aspect, an embodiment of this application provides a computer storage medium. The computer storage medium stores a program configured to implement the method in the first aspect or the second aspect. When the program is run in a wireless communications apparatus, the wireless communications apparatus is enabled to perform the method in the first aspect or the second aspect.

According to an eighth aspect, an embodiment of this application provides a computer storage medium. The computer storage medium stores a program configured to implement the method in the third aspect or the fourth aspect. When the program is run in a wireless communications apparatus, the wireless communications apparatus is enabled to perform the method in the third aspect or the fourth aspect.

According to a ninth aspect, an embodiment of this application provides a computer program product. The program product includes a program, and when the program is run, the method in the first aspect or the second aspect is performed.

According to a tenth aspect, an embodiment of this application provides a computer program product. The program product includes a program, and when the program is run, the method in the third aspect or the fourth aspect is performed.

BRIEF DESCRIPTION OF DRAWINGS

To describe this application more clearly, the following briefly describes the accompanying drawings for describing the embodiments. The accompanying drawings in the following description show merely some embodiments of the present invention, and a person of ordinary skill in the art may derive other drawings from these accompanying drawings without creative efforts.

DESCRIPTION OF EMBODIMENTS

The following describes technical solutions of this application with reference to the accompanying drawings.

Figure 1:
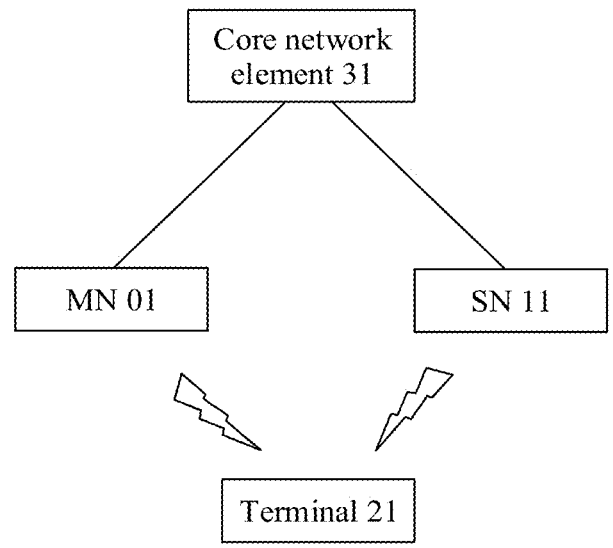
FIG. 1 is a schematic diagram of a dual-connectivity communications system.
Figure 2:
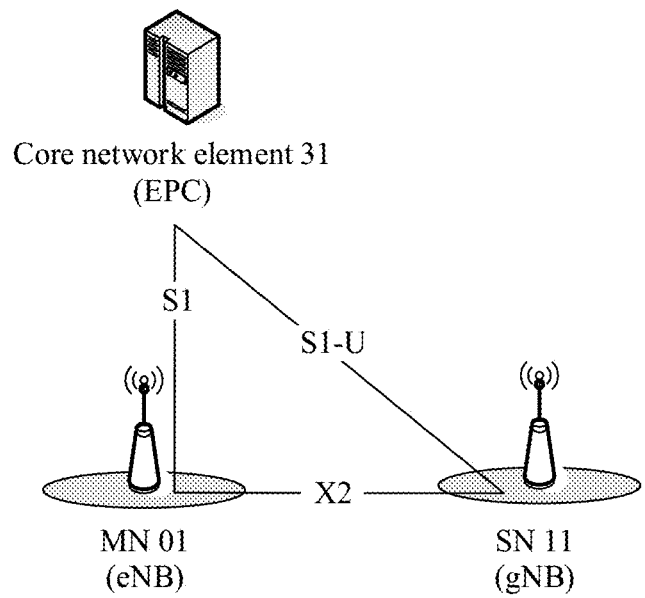
FIG. 2 is a schematic diagram of EN-DC.
Figure 3:
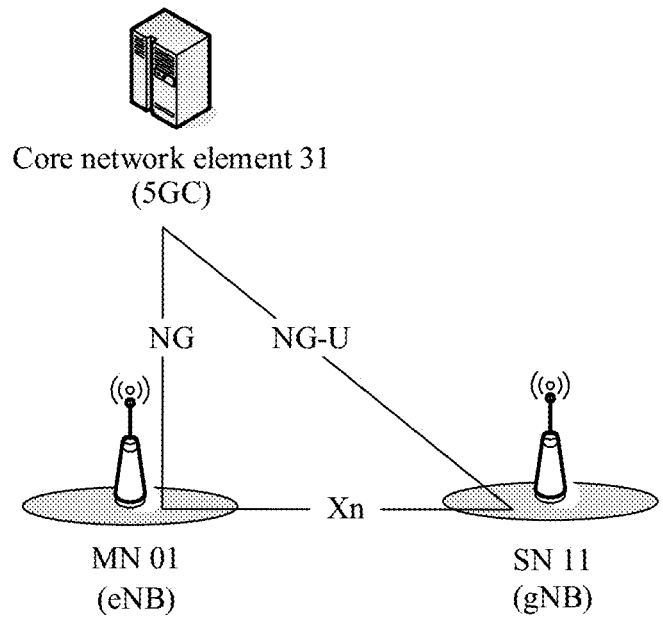
FIG. 3 is a schematic diagram of NGEN-DC.
Figure 4:
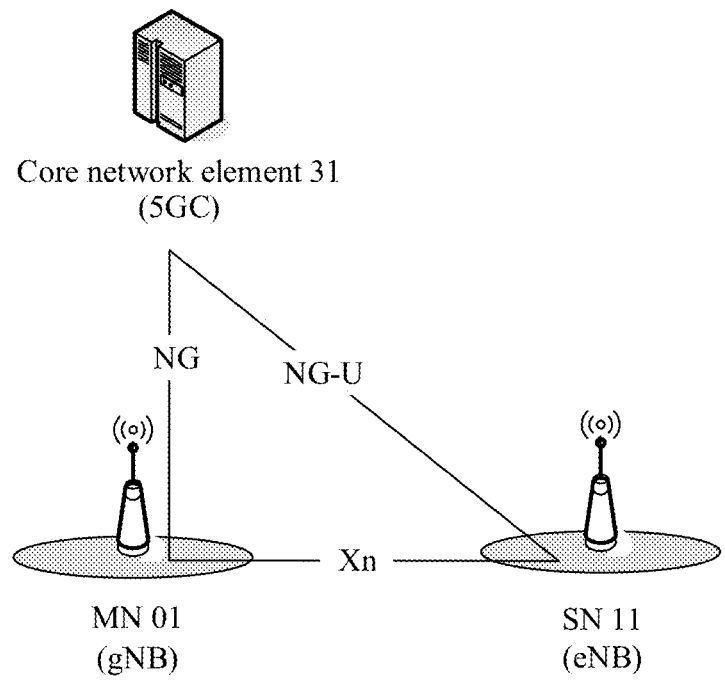
FIG. 4 is a schematic diagram of NG-DC.
Figure 5:
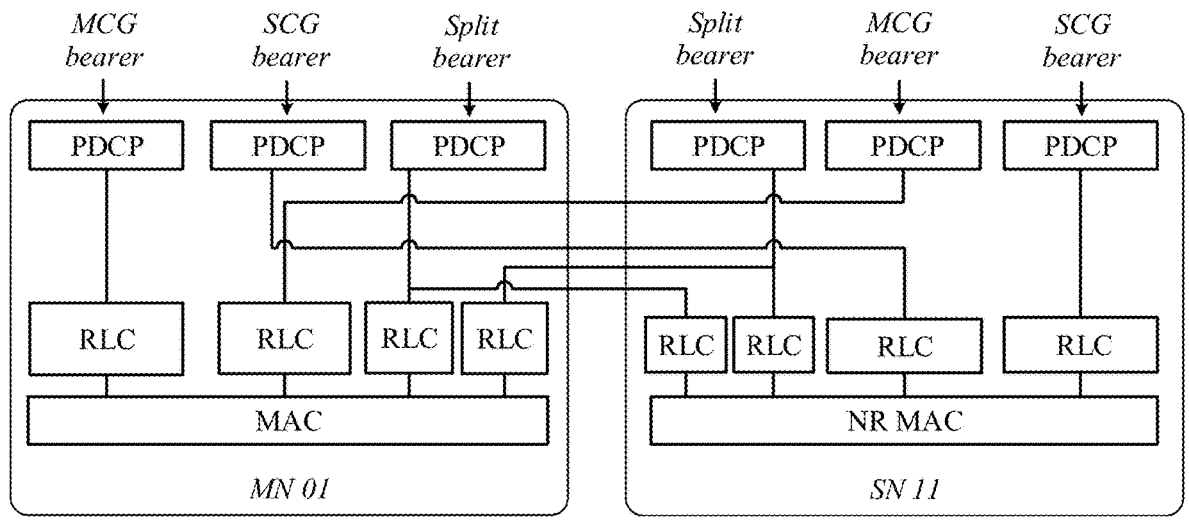
FIG. 5 is a schematic diagram of a user plane bearer type in MR-DC.

The technical solutions in the embodiments of this application may be applicable to a communications system shown in FIG. 1. It should be noted that a core network element, an MN, an SN, and a terminal that are included in the communications system shown in FIG. 1 are merely examples, and a connection relationship between the core network element and the MN or the SN is also merely an example. In this embodiment of this application, a type of a network element included in the communications system, a quantity of network elements, and a connection relationship between the network elements are not limited herein.

Figure 6A:
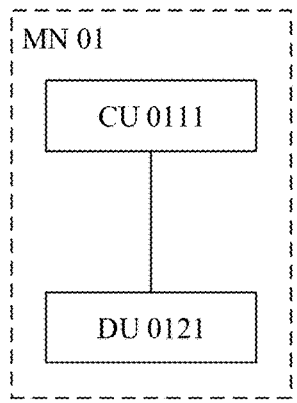
FIG. 6A is a schematic diagram of an MN 01 that has a CU-DU architecture.

As shown in FIG. 6A, when an MN 01 is a gNB, the MN 01 may be of a centralized unit (Centralized Unit, CU)-distributed unit (Distributed Unit, DU) architecture, and the MN 01 may include a CU 0111 and a DU 0121. For example, in NG DC, the MN 01 is a gNB, the MN 01 may be of a CU-DU architecture, and the MN 01 may include a CU 0111 and a DU 0121. The CU 0111 is connected to the DU 0121 by using, for example, an F1 interface. The CU 0111 is connected to a core network element 31 by using, for example, an NG interface. In FIG. 6a, one CU 0111 and one DU 0121 are used as an example for description. In this embodiment of this application, there may be a plurality of DUs 0121. The plurality of DUs 0121 may share one CU 0111, and the plurality of DUs 0121 are all connected to the CU 0111 by using, for example, an F1 interface.

Figure 6B:
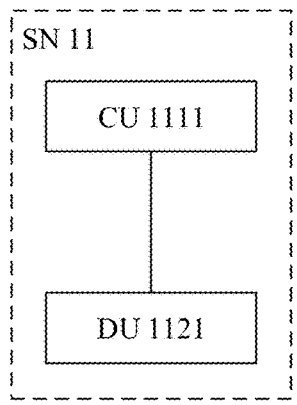
FIG. 6B is a schematic diagram of an SN 11 that has a CU-DU architecture.

As shown in FIG. 6B, when an SN 11 is a gNB, the SN 11 may be of a CU-DU architecture, and the SN 11 may include a CU 1111 and a DU 1121. For example, in EN-DC or NGEN-DC, the SN 11 is a gNB, the SN 11 may be of a CU-DU architecture, and the SN 11 may include a CU 1111 and a DU 1121. The CU 1111 is connected to the DU 1121 by using, for example, an F1 interface. The CU 1111 is connected to a core network element 31 by using, for example, an NG interface. In FIG. 6b, one CU 1111 and one DU 1121 are used as an example for description. In this embodiment of this application, there may be a plurality of DUs 1121. The plurality of DUs 1121 may share one CU 1111, and the plurality of DUs 1121 are all connected to the CU 1111 by using, for example, an F1 interface.

Figure 7:
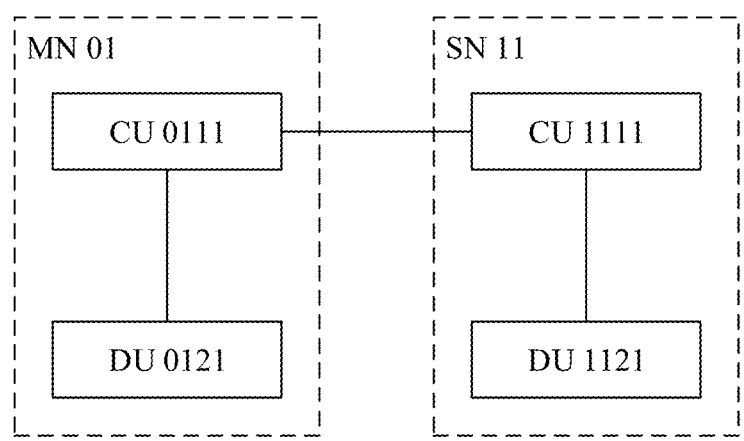
FIG. 7 is a schematic diagram of an MN 01 and an SN 11 that both have a CU-DU architecture.

As shown in FIG. 7, when both an MN 01 and an SN 11 are of a CU-DU architecture, a CU 0111 and a CU 1111 may be connected to each other.

In the CU-DU architecture, some functions of the MN 01 are deployed on the CU 0111, and the other functions of the MN 01 are deployed on the DU 0121. Function division of the CU 0111 and the DU 0121 may be performed based on a wireless protocol stack. One possible manner is to deploy a radio resource control (radio resource control, RRC) layer, a service data adaptation protocol (Service Data Adaptation Protocol, SDAP) layer, and a packet data convergence protocol (packet data convergence protocol, PDCP) layer on the CU 0111, and deploy a radio link control protocol (Radio Link Control, RLC) layer, a media access control (Media Access Control, MAC) layer, and a physical layer (physical layer, PHY) on the DU 0121. In another possible manner, the RRC layer, the PDCP layer, the RLC layer, the SDAP layer, the MAC layer, and some physical layers are deployed on the CU 0111, and some physical layers are deployed on the DU 0121. It should be noted that the foregoing function division is merely an example, and there may be another division manner. This embodiment of this application imposes no limitation thereto.

When the SN 11 uses the CU-DU architecture, for functions and function division of the CU 1111 and the DU 1121, refer to related content of the functions and function division of the CU 0111 and the DU 0121 in the case of the CU-DU architecture used by the MN 01. Details are not described herein again.

In the foregoing communications system, when the bearer is terminated at the MN 01 (or the SN 11), the MN 01 (or the SN 11) may change a PDCP SN length.

In this embodiment of this application, a solution is provided. In this solution, when a PDCP SN length of a bearer is changed, bearer release and addition are performed. In this solution, when the PDCP SN length is changed, the MN 01 and the SN 11 interact with each other, so that both the MN 01 and the SN 11 can learn that the PDCP SN length is changed. This ensures that the MN 01 and the SN 11 can simultaneously generate release and addition configuration information for the bearer for the terminal 21, thereby completing the changing the PDCP SN length.

The foregoing solution may specifically include a first solution, a second solution, and a third solution. In the first solution, the SN 11 may generate a new PDCP SN length for a bearer of a PDCP anchor on the SN 11. When the new PDCP SN length is changed compared with a previous PDCP SN length, the SN 11 sends a PDCP SN length change indication to the MN 01. Then, the MN 01 and the SN 11 generate release and addition configuration information for the bearer for the terminal 21. In the second solution, the SN 11 may send a PDCP SN length to the MN 01, and the MN 01 and the SN 11 may store the PDCP SN length. When the PDCP SN length is changed, the MN 01 and the SN 11 generate release and addition configuration information for the bearer for the terminal 21. In the third solution, one type of PDCP SN length may be fixedly used corresponding to one bearer type. When the bearer type is changed, the MN 01 and the SN 11 may learn that the PDCP SN length is changed, to generate release and addition configuration information for the bearer for the terminal 21.

The following explains words that may appear in this embodiment of this application.

1. Generating a PDCP SN length of a first bearer may be understood as generating PDCP SN length configuration information of the first bearer, and the PDCP SN length configuration of the first bearer indicates the PDCP SN length of the first bearer. Sending or receiving the PDCP SN length of the first bearer may be understood as sending or receiving the PDCP SN length configuration information of the first bearer, and the PDCP SN length configuration of the first bearer indicates the PDCP SN length of the first bearer.
2. That a PDCP entity of the first bearer is on an MN (or an SN) may be understood as that a PDCP anchor of the first bearer is on the MN (or the SN), or that the first bearer is terminated at the MN (or SN), or that a PDCP entity of the first bearer exists on the MN (or the SN), or the first bearer has a PDCP entity on the MN (or the SN).

That an RLC entity (or a MAC entity) of the first bearer exists on the MN (or the SN) may be understood as that the first bearer has an RLC entity (or a MAC entity) on the MN (or the SN).

3. Configuration information of the first bearer may include configuration information of one or more of a PDCP entity, an RLC entity, or a MAC entity of the first bearer. Different entities may have different names for operations on the entities, for example, release or addition, which is not limited in this embodiment of this application. For example, an addition of a MAC entity may be understood as an addition of a logical channel, or a release of a MAC entity may be understood as a release of a logical channel or a reset of the MAC entity.

The following describes the first solution.

Figure 8:
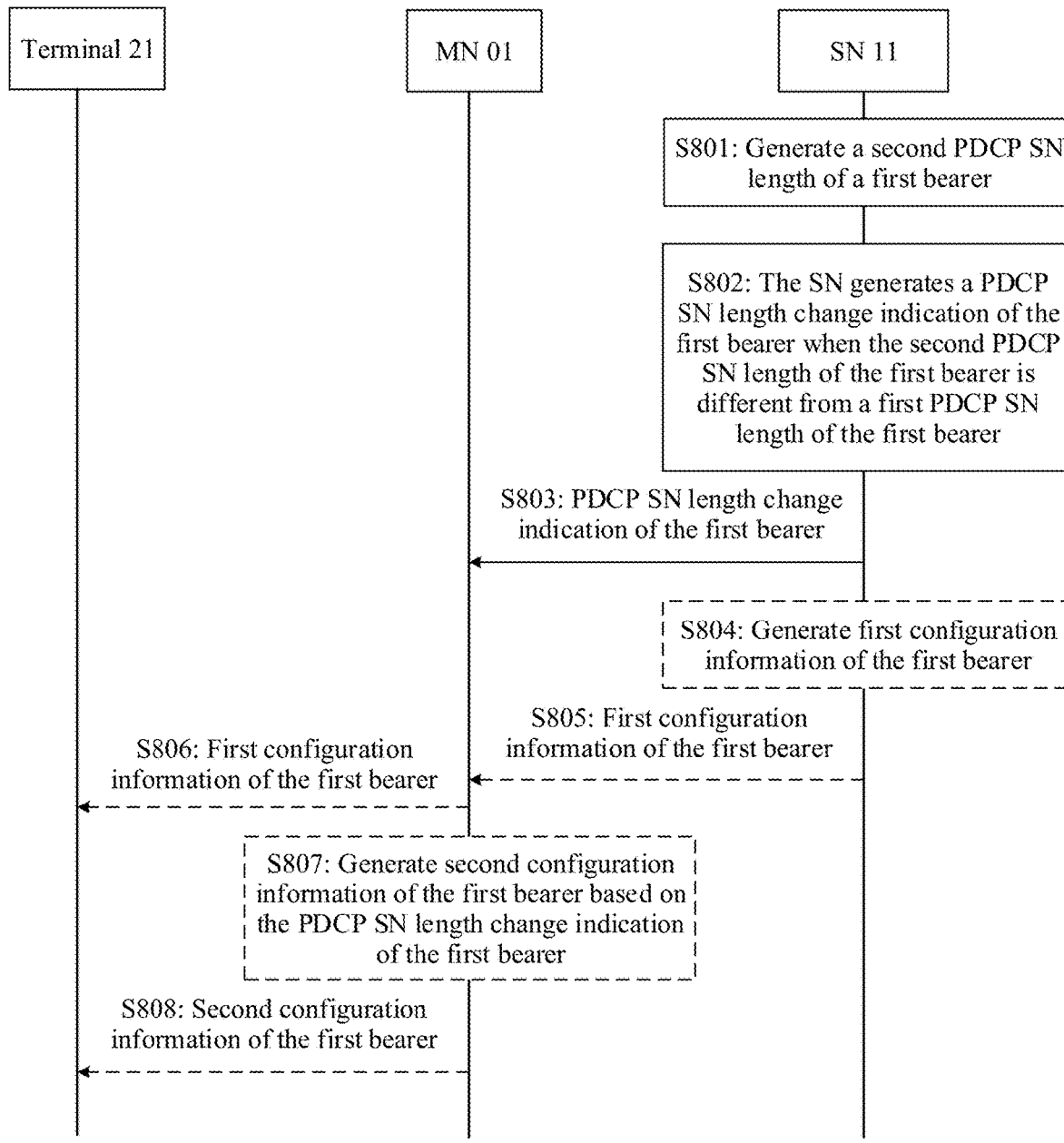
FIG. 8 is a schematic diagram of an implementation of changing a PDCP SN length.

FIG. 8 is a schematic diagram of an implementation of changing a PDCP SN length.

S801: An SN 11 generates a second PDCP SN length of a first bearer. Herein, it may be referred to as that the SN 11 generates second PDCP SN length configuration information of the first bearer.

Because only a node in which a PDCP entity of a bearer is located can generate a PDCP SN length, a person skilled in the art can understand that when a PDCP SN length of the first bearer is the second PDCP SN length, a PDCP entity of the first bearer is on the SN 11, that is, the first bearer is terminated at the SN.

S802: The SN generates a PDCP SN length change indication of the first bearer when the second PDCP SN length of the first bearer is different from a first PDCP SN length of the first bearer.

The PDCP SN length change indication of the first bearer may indicate that the PDCP SN length of the first bearer is changed.

The PDCP SN length of the first bearer may be the first PDCP SN length before the PDCP SN length of the first bearer is the second PDCP SN length. This may be understood as that the PDCP SN length of the first bearer is the first PDCP SN length before the SN 11 generates or determines the second PDCP SN length of the first bearer. This may alternatively be understood as that the PDCP SN length of the first bearer is the first PDCP SN length before the PDCP SN length of the first bearer is changed, and the PDCP SN length of the first bearer is the second PDCP SN length after the PDCP SN length of the first bearer is changed.

In a first implementation, the first bearer is terminated at the SN when the PDCP SN length of the first bearer is the first PDCP SN length. In other words, the PDCP entity of the first bearer is on the SN 11 before the PDCP SN length of the first bearer is changed. The SN 11 may store a PDCP-related configuration of the PDCP SN length, such as the first PDCP SN length, of the first bearer. The SN 11 may read the first PDCP SN length, and then compare the first PDCP SN length with the second PDCP SN length. When the first PDCP SN length is inconsistent with the second PDCP SN length, the SN 11 generates the PDCP SN length change indication of the first bearer.

In the first implementation, the first bearer is terminated at the SN before and after the PDCP SN length of the first bearer is changed. That is, the PDCP entity of the first bearer is on the SN 11 in both two cases. This may specifically include but is not limited to the following cases: (1) A bearer type of the first bearer before the PDCP SN length is changed is the same as a bearer type of the first bearer after the PDCP SN length is changed. For example, both the bearer type of the first bearer before the PDCP SN length is changed and the bearer type of the first bearer after the PDCP SN length is changed are SN-terminated MCG bearers, SN-terminated SCG bearers, or SN-terminated split bearers. (2) A bearer type of the first bearer before the PDCP SN length is changed is different from a bearer type of the first bearer after the PDCP SN length is changed. For example, the bearer type of the first bearerbefore the PDCP SN length is changed is an SN-terminated MCG bearer, and the bearer type of the first bearer after the PDCP SN length is changed is an SN-terminated SCG bearer or an SN-terminated split bearer. Alternatively, the bearer type of the first bearer before the PDCP SN length is changed is an SN-terminated SCG bearer, and the bearer type of the first bearer after the PDCP SN length is changed is an SN-terminated MCG bearer or an SN-terminated split bearer. Alternatively, the bearer type of the first bearer before the PDCP SN length is changed is an SN-terminated split bearer, and the bearer type of the first bearer after the PDCP SN length is changed is an SN-terminated MCG bearer or an SN-terminated SCG bearer.

In a second implementation, the first bearer is terminated at an MN when the PDCP SN length of the first bearer is the first PDCP SN length. In other words, the PDCP entity of the first bearer is on an MN 01 before the PDCP SN length of the first bearer is changed. The MN 01 may store a PDCP-related configuration of the PDCP SN length, such as the first PDCP SN length, of the first bearer. The MN 01 may read the first PDCP SN length, and then send the first PDCP SN length to the SN 11. After receiving the first PDCP SN length, the SN 11 compares the first PDCP SN length with the second PDCP SN length. When the first PDCP SN length is inconsistent with the second PDCP SN length, the SN 11 generates the PDCP SN length change indication of the first bearer.

In the second implementation, the first bearer is terminated at the MN before the PDCP SN length is changed, and the first bearer is terminated at the SN after the PDCP SN length is changed. This may specifically include but is not limited to the following cases: For example, a bearer type of the first bearer before the PDCP SN length is changed is an MN-terminated MCG bearer, and a bearer type of the first bearer after the PDCP SN length is changed is an SN-terminated MCG bearer, an SN-terminated SCG bearer, or an SN-terminated split bearer. Alternatively, a bearer type of the first bearer before the PDCP SN length is changed is an MN-terminated SCG bearer, and a bearer type of the first bearer after the PDCP SN length is changed is an SN-terminated MCG bearer, an SN-terminated SCG bearer, or an SN-terminated split bearer. Alternatively, a bearer type of the first bearer before the PDCP SN length is changed is an MN-terminated split bearer, and a bearer type of the first bearer after the PDCP SN length is changed is an SN-terminated MCG bearer, an SN-terminated SCG bearer, or an SN-terminated split bearer.

S803: The SN 11 sends the PDCP SN length change indication of the first bearer to the MN 01.

In the first implementation, the PDCP SN length change indication of the first bearer may be carried in a secondary node modification required (SN modification required) message or a secondary node modification request acknowledge (SN modification request acknowledge) message.

In the second implementation, the PDCP SN length change indication of the first bearer may be carried in a secondary node addition request acknowledge (SN addition request acknowledge) message, a secondary node modification required message, or a secondary node modification request acknowledge message. For example, when the first bearer is the MN-terminated MCG bearer before the PDCP SN length is changed, the PDCP SN length change indication of the first bearer may be further carried in a secondary node addition request acknowledge message or a secondary node modification request acknowledge message.

Optionally, after receiving the PDCP SN length change indication sent by the SN 11, the MN 01 may store the PDCP SN length change indication.

Optionally, the MN 01 may learn of a new PDCP SN length such as the second PDCP SN length based on the PDCP SN length change indication, and the MN 01 may store the second PDCP SN length, so that the MN 01 subsequently determines whether the PDCP SN length is changed.

Optionally, S804 to S806 may be further included.

S804: The SN 11 generates first configuration information of the first bearer.

Optionally, S804 and S801 may simultaneously occur. That is, the SN 11 may generate the first configuration information of the first bearer when generating the second PDCP SN length of the first bearer.

In a first example of the first implementation, the first configuration information includes configuration information for releasing and adding a PDCP entity.

That the first configuration information includes configuration information for releasing and adding a PDCP entity may be implemented by using an information element that includes both configuration information for releasing a PDCP entity and configuration information for adding a PDCP entity, and may be specifically implemented by deleting one identifier and adding the same identifier in an information element. The identifier may be a bearer identifier. For example, when the SN 11 is a gNB, for example, a gNB in an EN-DC or NGEN-DC scenario, a RadioBearerConfig information element in section 6.3.2 in 3GPP TS 38.331 V15.1.0 may be used for implementation. The first configuration information may include the RadioBearerConfig. The RadioBearerConfig includes configuration information for releasing a PDCP entity. For example, DRB-ToReleaseList in the RadioBearerConfig includes a bearer identifier 1. The RadioBearerConfig includes configuration information for adding a PDCP entity. For example, DRB-ToAddMod in the RadioBearerConfig includes the bearer identifier 1. The same bearer identifier is deleted and added, so that a PDCP entity of a bearer may be deleted and then added by using one configuration message. In this way, the PDCP SN length is changed.

For example, that the first configuration information includes configuration information for releasing and adding a PDCP entity may be applied to cases including the bearer types of the first bearer before and after the PDCP SN length is changed, listed in the first implementation in S802.

In a second example of the first implementation, based on the foregoing first example of the first implementation, the first configuration information may further include configuration information for releasing and adding an RLC entity.

That the first configuration information includes configuration information for releasing and adding an RLC entity may be implemented by using an information element that includes both configuration information for releasing an RLC entity and configuration information for adding an RLC entity, and may be specifically implemented by deleting one identifier and adding the same identifier in an information element. The identifier may be a bearer identifier, a logical channel identifier, or the like. For example, when the SN 11 is a gNB, for example, a gNB in an EN-DC or NGEN-DC scenario, a CellGroupConfig information element in section 6.3.2 in 3GPP TS 38.331 V15.1.0 may be used for implementation. The first configuration information may include the CellGroupConfig. The CellGroupConfig includes configuration information for releasing an RLC entity. For example, rlc-BearerToReleaseList in the CellGroupConfig includes a logical channel identifier 1. The CellGroupConfig includes configuration information for adding an RLC entity. For example, rlc-BearerToAddModList in the CellGroupConfig includes the logical channel identifier 1. For example, when the SN 11 is an eNB, for example, an eNB in an NE-DC scenario, a RadioResourceConfigDedicated information element in section 6.3.2 in 3GPP TS 36.331 V15.1.0 may be used for implementation. The first configuration information may include the RadioResourceConfigDedicated. DRB-ToReleaseList in the RadioResourceConfigDedicated includes a bearer identifier 1, and DRB-ToAddMod includes the bearer identifier 1. The same logical channel identifier or bearer identifier is deleted and added, so that an RLC entity of a bearer may be deleted and then added by using one configuration message. In this way, the PDCP SN length is changed.

For example, that the first configuration information includes configuration information for releasing and adding an RLC entity may be applied to but is not limited to the following cases: A bearer type of the first bearer before the PDCP SN length is changed is an SN-terminated SCG bearer, and a bearer type of the first bearer after the PDCP SN length is changed is an SN-terminated SCG bearer or an SN-terminated split bearer. Alternatively, a bearer type of the first bearer before the PDCP SN length is changed is an SN-terminated split bearer, and a bearer type of the first bearer after the PDCP SN length is changed is an SN-terminated SCG bearer or an SN-terminated split bearer.

In the first implementation, the first configuration information may be carried in a secondary node modification request acknowledge message or a secondary node modification required message.

In a first example of the second implementation, the first configuration information includes configuration information for adding a PDCP entity.

That the first configuration information includes configuration information for adding a PDCP entity may be implemented by using an information element that includes configuration information for adding a PDCP entity, for example, by adding one identifier in an information element. The identifier may be a bearer identifier. For example, a RadioBearerConfig information element in section 6.3.2 in 3GPP TS 38.331 V15.1.0 may be used for implementation. The first configuration information may include the RadioBearerConfig. The RadioBearerConfig includes configuration information for adding a PDCP entity. For example, DRB-ToAddMod in the RadioBearerConfig information element includes a bearer identifier 1.

It should be noted that, in this case, the first configuration information may not include configuration information for releasing a PDCP entity. Because the PDCP entity of the first bearer is on the MN 01 before the PDCP SN length is changed, the MN 01 may generate configuration information for releasing a PDCP entity for a terminal 21.

For example, that the first configuration information includes configuration information for adding a PDCP entity may be applied to the cases, including the bearer types of the first bearer before and after the PDCP SN length is changed, listed in the second implementation in S802.

In a second example of the second implementation, the first configuration information includes configuration information for releasing and adding a PDCP entity.

Reference may be made to related content in the first example of the first implementation in which the first configuration information includes the configuration information for releasing and adding a PDCP entity. Details are not described herein again.

It should be noted that, before the PDCP SN length is changed, the PDCP entity of the first bearer is on the MN 01. After the PDCP SN length is changed, the PDCP entity of the first bearer is on the SN 11. In addition, the PDCP entity on the MN 01 and the PDCP entity on the SN 11 may be configured as PDCP entities of a same standard, for example, NR PDCP entities. In this case, the SN 11 may directly generate configuration information for releasing and adding a PDCP entity. In this case, the MN 01 does not need to generate configuration information for releasing a PDCP entity for the terminal 21. This can simplify implementation complexity of a network and the terminal.

For example, that the first configuration information includes configuration information for adding a PDCP entity may be applied to the cases, including the bearer types of the first bearer before and after the PDCP SN length is changed, listed in the second implementation in S802.

In a third example of the second implementation, based on the foregoing first example of the second implementation and the foregoing second example of the second implementation, the first configuration information may further include configuration information for releasing and adding an RLC entity.

Reference may be made to related content in the second example of the first implementation in which the first configuration information includes the configuration information for releasing and adding an RLC entity. Details are not described herein again.

For example, that the first configuration information includes configuration information for releasing and adding an RLC entity may be applied to but is not limited to the following cases: A bearer type that is of the first bearer before the PDCP SN length is changed is an MN-terminated SCG bearer, and a bearer type of the first bearer after the PDCP SN length is changed is an SN-terminated SCG bearer or an SN-terminated split bearer. Alternatively, a bearer type of the first bearer before the PDCP SN length is changed is an MN-terminated split bearer, and a bearer type of the first bearer after the PDCP SN length is changed is an SN-terminated SCG bearer or an SN-terminated split bearer.

In the second implementation, the first configuration information may be carried in a secondary node addition request acknowledge message and a secondary node modification request acknowledge message. For example, when the first bearer is the MN-terminated MCG bearer before the PDCP SN length is changed, the first configuration information may be further carried in a secondary node addition request acknowledge message or a secondary node modification request acknowledge message.

S805: The SN 11 sends the first configuration information of the first bearer to the MN.

Optionally, S803 and S805 may simultaneously occur. For example, the PDCP SN length change indication of the first bearer and the first configuration information of the first bearer may be carried in a same message and the message is sent by the SN 11 to the MN 01.

S806: The MN 01 sends the first configuration information of the first bearer to the terminal 21.

For example, the MN 01 may send an RRC connection reconfiguration message to the terminal 21, where the RRC connection reconfiguration message includes the first configuration information of the first bearer.

Optionally, S807 and S808 may be further included.

S807: The MN 01 generates second configuration information of the first bearer based on the PDCP SN length change indication of the first bearer.

In an example of the first implementation, the second configuration information includes configuration information for releasing and adding an RLC entity.

That the second configuration information includes configuration information for releasing and adding an RLC entity may be implemented by using an information element that includes both configuration information for releasing an RLC entity and configuration information for adding an RLC entity, and may be specifically implemented by deleting one identifier and adding the same identifier in an information element. The identifier may be a bearer identifier, a logical channel identifier, or the like. For example, when the MN 01 is a gNB, for example, a gNB in an NE-DC scenario, a CellGroupConfig information element in section 6.3.2 in 3GPP TS 38.331 V15.1.0 may be used for implementation. The first configuration information may include the CellGroupConfig. The CellGroupConfig includes configuration information for releasing an RLC entity. For example, rlc-BearerToReleaseList in the CellGroupConfig includes a logical channel identifier 1. The CellGroupConfig includes configuration information for adding an RLC entity. For example, rlc-BearerToAddModList in the CellGroupConfig includes the logical channel identifier 1. For example, when the MN 01 is an eNB, for example, an eNB in an EN-DC or NGEN-DC scenario, a RadioResourceConfigDedicated information element in section 6.3.2 in 3GPP TS 36.331 V15.1.0 may be used for implementation. The second configuration information may include the RadioResourceConfigDedicated. DRB-ToReleaseList in the RadioResourceConfigDedicated includes a bearer identifier 1, and DRB-ToAddMod includes the bearer identifier 1. The same logical channel identifier or bearer identifier is deleted and added, so that an RLC entity of a bearer may be deleted and then added by using one configuration message. In this way, the PDCP SN length is changed.

For example, that the second configuration information includes configuration information for releasing and adding an RLC entity may be applied to but is not limited to the following cases: A bearer type of the first bearer before the PDCP SN length is changed is an SN-terminated MCG bearer, and a bearer type of the first bearer after the PDCP SN length is changed is an SN-terminated MCG bearer or an SN-terminated split bearer. Alternatively, a bearer type of the first bearer before the PDCP SN length is changed is an SN-terminated split bearer, and a bearer type of the first bearer after the PDCP SN length is changed is an SN-terminated MCG bearer or an SN-terminated split bearer.

In a first example of the second implementation, the second configuration information includes configuration information for releasing a PDCP entity.

That the second configuration information includes configuration information for releasing a PDCP entity may be implemented by using an information element that includes configuration information for releasing a PDCP entity, and may be specifically implemented by deleting one identifier in an information element. The identifier may be a bearer identifier. For example, a RadioBearerConfig information element in section 6.3.2 in 3GPP TS 38.331 V15.1.0 may be used for implementation. The second configuration information may include the RadioBearerConfig. The RadioBearerConfig includes configuration information for releasing a PDCP entity. For example, DRB-ToReleaseList in the RadioBearerConfig information element includes a bearer identifier 1, so that an RLC entity of a bearer may be deleted and then added by using one configuration message. In this way, the PDCP SN length is changed.

It should be noted that, because the PDCP entity of the first bearer is on the MN 01 before the PDCP SN length is changed and the PDCP entity of the first bearer is on the SN 11 after the PDCP SN length is changed, the MN 01 may generate configuration information for releasing a PDCP entity for the terminal 21, and the SN 11 may generate configuration information for adding a PDCP entity for the terminal 21. For example, based on the cases, of the bearer types of the first bearer before and after the PDCP SN length is changed, listed in the second implementation in S802, the second configuration information may include the configuration information for releasing a PDCP entity.

In a second example of the second implementation, based on the first example of the second implementation, the second configuration information may further include configuration information for releasing and adding an RLC entity.

Reference may be made to related content in the example of the first implementation in which the second configuration information includes the configuration information for releasing and adding an RLC entity in S807. Details are not described herein again.

For example, the second configuration information may further include configuration information for releasing and adding an RLC entity in the following cases of bearer types used before and after the PDCP SN length is changed: A bearer type of the first bearer before the PDCP SN length is changed is an MN-terminated MCG bearer, and a bearer type of the first bearer after the PDCP SN length is changed is an SN-terminated MCG bearer or an SN-terminated split bearer. Alternatively, a bearer type of the first bearer before the PDCP SN length is changed is an MN-terminated split bearer, and a bearer type of the first bearer after the PDCP SN length is changed is an SN-terminated MCG bearer or an SN-terminated split bearer.

In a third example of the second implementation, the second configuration information includes configuration information for releasing and adding an RLC entity.

It should be noted that, in this case, the second configuration information may not include configuration information for releasing a PDCP entity. The SN 11 may generate configuration information for releasing a PDCP entity for the terminal 21.

Reference may be made to related content in the example of the first implementation in which the second configuration information includes the configuration information for releasing and adding an RLC entity in S807. Details are not described herein again.

For example, the second configuration information may include configuration information for releasing and adding an RLC entity in the following cases of bearer types used before and after the PDCP SN length is changed: A bearer type that is of the first bearer and used before the PDCP SN length is changed is an MN-terminated MCG bearer, and a bearer type of the first bearer after the PDCP SN length is changed is an SN-terminated MCG bearer or an SN-terminated split bearer. Alternatively, a bearer type of the first bearer before the PDCP SN length is changed is an MN-terminated split bearer, and a bearer type of the first bearer after the PDCP SN length is changed is an SN-terminated MCG bearer or an SN-terminated split bearer.

S808: The MN 01 sends the second configuration information of the first bearer to the terminal 21.

For example, the MN 01 may send an RRC connection reconfiguration message to the terminal 21, where the RRC connection reconfiguration message includes the second configuration information of the first bearer.

Optionally, S806 and S808 may simultaneously occur. For example, the MN 01 sends a message to the terminal 21, where the message carries both the first configuration information and the second configuration information of the first bearer, and the message may be an RRC connection reconfiguration message.

The following further describes, with reference to FIG. 9 to FIG. 12*a*, changing a PDCP SN length.

The following describes, with reference to an SN addition request procedure, how to change a PDCP SN length in the SN addition request procedure.

Figure 9:
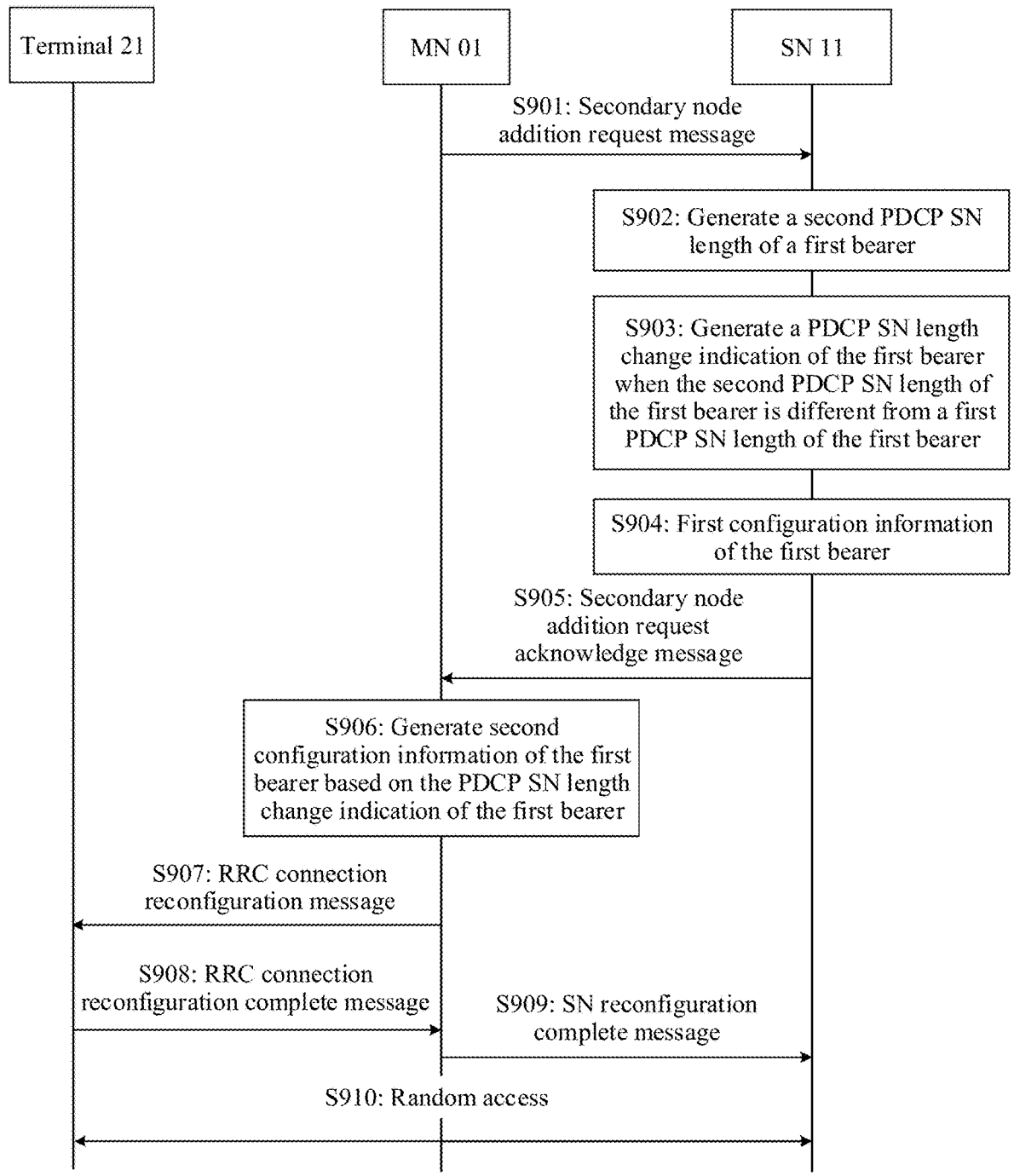
FIG. 9 is a schematic diagram of an implementation of changing a PDCP SN length.

FIG. 9 is a schematic diagram of an implementation of changing a PDCP SN length.

S901: An MN 01 sends a secondary node addition request message to an SN 11.

A bearer type of a first bearer may be an MN-terminated MCG bearer before the MN 01 sends the secondary node addition request message to the SN 11. The MN 01 may determine a bearer type of the first bearer after a secondary node is added. The first bearer may be terminated at the SN after the secondary node is added. That is, a PDCP entity of the first bearer is on the SN 11 after the secondary node is added. For example, after the secondary node is added, the bearer type of the first bearer is an SN-terminated MCG bearer, an SN-terminated SCG bearer, or an SN-terminated split bearer.

The secondary node addition request message may include:

(1) A bearer identifier of the first bearer.
(2) Indication information that is of the bearer type of the first bearer and used after the secondary node is added.

For example, whether the PDCP entity of the first bearer is on the SN 11 after the secondary node is added, whether there is an MCG resource for the first bearer after the secondary node is added, and whether there is an SCG resource for the first bearer after the secondary node is added may be included.

For example, the PDCP entity of the first bearer is on the SN 11 after the secondary node is added, and there is an MCG resource but no SCG resource on the first bearer after the secondary node is added. That is, the bearer type of the first bearer is an SN-terminated MCG bearer after the secondary node is added. Alternatively, the PDCP entity of the first bearer is on the SN 11 after the secondary node is added, and there is an SCG resource but no MCG resource on the first bearer after the secondary node is added. That is, the bearer type of the first bearer is an SN-terminated SCG bearer after the secondary node is added. Alternatively, the PDCP entity of the first bearer is on the SN 11 after the secondary node is added, and there is an MCG resource and an SCG resource on the first bearer after the secondary node is added. That is, the bearer type of the first bearer is an SN-terminated split bearer after the secondary node is added.

(3) Configuration information of a PDCP entity of the first bearer on the MN 01, including a PDCP SN length of the first bearer on the MN 01, namely, the first PDCP SN length in FIG. 8 (where for example, the first PDCP SN length may be 12 bits), where the configuration information of the PDCP entity of the first bearer on the MN 01 may be used to assist the SN 11 in generating new configuration information of the PDCP entity.

The following further describes S902 to S907 as an example of S801 to S808.

S902: The SN 11 generates a second PDCP SN length of the first bearer.

Before S902, because the PDCP entity of the first bearer is on the SN 11 after the secondary node is added, the SN 11 may determine to generate a PDCP SN length, namely, the second PDCP SN length in S801 in FIG. 8 (where for example, the second PDCP SN length is 18 bits).

S903: The SN 11 generates a PDCP SN length change indication of the first bearer when the second PDCP SN length of the first bearer is different from the first PDCP SN length of the first bearer.

The PDCP SN length of the first bearer may be the first PDCP SN length before the PDCP SN length of the first bearer is the second PDCP SN length. This may be understood as that the PDCP SN length of the first bearer is the first PDCP SN length before the SN 11 generates the second PDCP SN length of the first bearer. This may alternatively be understood as that the PDCP SN length of the first bearer is the first PDCP SN length before the PDCP SN length of the first bearer is changed, and the PDCP SN length of the first bearer is the second PDCP SN length after the PDCP SN length of the first bearer is changed.

For example, the first PDCP SN length of the first bearer is 12 bits, and the second PDCP SN length of the first bearer is 18 bits. The first PDCP SN length is different from the second PDCP SN length. The SN 11 generates the PDCP SN length change indication of the first bearer.

S904: The SN 11 generates first configuration information of the first bearer.

Optionally, S902 and S904 may simultaneously occur. In other words, the SN 11 may generate the second PDCP SN length of the first bearer when generating the first configuration information of the first bearer.

The first configuration information of the first bearer may be configuration information, of an entity that is on the SN 11 and that is of the first bearer, generated by the SN 11 for a terminal 21.

No entity of the first bearer is on the SN 11 before the secondary node is added. For example, before the secondary node is added, a bearer type of the first bearer is an MN-terminated MCG bearer, and the PDCP entity, a RLC entity, and a MAC entity of the first bearer are all on the MN 01. After the secondary node is added, the PDCP entity of the first bearer is on the SN 11, the RLC entity or the MAC entity may or may not be on the SN 11, and the RLC entity or the MAC entity may or may not be on the MN 01. For example, after the secondary node is added, a bearer type of the first bearer is an SN-terminated MCG bearer, the PDCP entity of the first bearer is on the SN 11, and the RLC entity and the MAC entity of the first bearer are on the MN 01; after the secondary node is added, a bearer type of the first bearer is an SN-terminated SCG bearer, and the PDCP entity, the RLC entity, and the MAC entity of the first bearer are on the SN 11; after the secondary node is added, a bearer type of the first bearer is an SN-terminated split bearer, the PDCP entity of the first bearer is on the SN 11, and the RLC entity and the MAC entity of the first bearer are on the MN 01 and the SN 11 respectively.

If an entity (for example, a PDCP entity, an RLC entity, or a MAC entity) is not on the SN 11 before the secondary node is added, and the entity is on the SN 11 after the secondary node is added, the first configuration information of the first bearer may include configuration information for adding the entity.

The first configuration information of the first bearer may include configuration information of a PDCP entity, for example, configuration information for adding a PDCP entity. Alternatively, for example, the first configuration information may include configuration information for releasing and adding a PDCP entity. For example, the PDCP entity of both the MN 01 and the PDCP entity of the SN 11 may be NR PDCP, and the MN 01 may generate configuration information for releasing a PDCP entity for the terminal 21, or the SN 11 may directly generate the configuration information for releasing a PDCP entity while generating configuration information for adding a PDCP entity. In this case, the MN 01 does not need to generate the configuration information for releasing a PDCP entity.

Optionally, the first configuration information of the first bearer may further include configuration information of an RLC entity and configuration information of a MAC entity, for example, configuration information for adding an RLC entity and configuration information for adding a MAC entity.

For example, a bearer type of the first bearer is an MN-terminated MCG bearer before the secondary node is added, a bearer type of the first bearer is an SN-terminated MCG bearer after the secondary node is added, and the first configuration information of the first bearer may include configuration information for adding a PDCP entity or configuration information for releasing and adding a PDCP entity.

For example, a bearer type of the first bearer is an MN-terminated MCG bearer before the secondary node is added, a bearer type of the first bearer is an SN-terminated SCG bearer or an SN-terminated split bearer after the secondary node is added, and the first configuration information of the first bearer may include configuration information for adding a PDCP entity or configuration information for releasing and adding a PDCP entity, configuration information for adding an RLC entity, and configuration information for adding a MAC entity.

In this embodiment of this application, for example, configuration information of a PDCP entity on the MN 01 or the SN 11 may be implemented by using a RadioBearerConfig information element in section 6.3.2 in 3GPP TS 38.331 V15.1.0. Configuration information of an RLC entity and a MAC entity on the MN 01 or the SN 11 may be implemented by using a CellGroupConfig information element in section 6.3.2 in 3GPP TS 38.331 V15.1.0 or a RadioResourceConfigDedicated information element in section 6.3.2 in 3GPP TS 36.331 V15.1.0.

S905: The SN 11 sends a secondary node addition request acknowledge message to the MN 01.

The secondary node addition request acknowledge message may include the bearer identifier of the first bearer, the PDCP SN length change indication of the first bearer, and the first configuration information of the first bearer.

Optionally, a new information element may be defined in the secondary node addition request acknowledge message, and the PDCP SN length change indication of the first bearer may be carried in the new information element. One bit may be used to carry the PDCP SN length change indication. For example, 1 indicates that the PDCP SN length is changed, and 0 indicates that the PDCP SN length is not changed.

S906: The MN 01 generates second configuration information of the first bearer based on the PDCP SN length change indication of the first bearer.

The second configuration information of the first bearer may be configuration information, of an entity that is on the MN 01 and that is of the first bearer, generated by the MN 01 for the terminal 21.

If an entity (for example, a PDCP entity, an RLC entity, or a MAC entity) is on the MN 01 before the secondary node is added, and the entity is on the MN 01 after the secondary node is added, the second configuration information of the first bearer may include configuration information for releasing and adding the entity. If an entity (for example, a PDCP entity, an RLC entity, or a MAC entity) is on the MN 01 before the secondary node is added, and the entity is not on the MN 01 after the secondary node is added, the second configuration information of the first bearer may include configuration information for releasing the entity.

The second configuration information of the first bearer may include configuration information of a PDCP entity, for example, configuration information for releasing a PDCP entity. In this case, the MN 01 generates the configuration information for releasing a PDCP entity for the terminal 21. Alternatively, the second configuration information of the first bearer may not include configuration information for releasing a PDCP entity, and the SN 11 generates the configuration information for releasing a PDCP entity for the terminal 21.

Optionally, the second configuration information of the first bearer may include configuration information of an RLC entity and configuration information of a MAC entity, for example, configuration information for releasing and adding an RLC entity and configuration information for releasing and adding a MAC entity.

For example, a bearer type of the first bearer is an MN-terminated MCG bearer before the secondary node is added, and a bearer type of the first bearer is an SN-terminated MCG bearer or an SN-terminated split bearer after the secondary node is added.

Optionally, the second configuration information of the first bearer may further include configuration information for releasing an RLC entity and configuration information for releasing a MAC entity.

For example, a bearer type of the first bearer is an MN-terminated MCG bearer before the secondary node is added, and a bearer type of the first bearer is an SN-terminated SCG bearer after the secondary node is added.

S907: The MN 01 sends an RRC connection reconfiguration message to the terminal 21.

The RRC connection reconfiguration message may include the bearer identifier of the first bearer, the first configuration information of the first bearer, and the second configuration information of the first bearer.

S908: The terminal 21 sends an RRC connection reconfiguration complete message to the MN 01.

The terminal 21 performs an operation of deleting and then adding a bearer based on the bearer identifier, the first configuration information of the first bearer, and the second configuration information of the first bearer that are included in the RRC connection reconfiguration message.

S909: The MN 01 sends an SN reconfiguration complete message to the SN 11.

S910: The terminal 21 completes random access to the SN 11.

The following describes, with reference to a secondary node modification procedure triggered by a secondary node, how to change a PDCP SN length in the secondary node modification procedure.

After a secondary node is added, for example, referring to related content in FIG. 9, a PDCP entity of a first bearer may be on an SN 11. For example, a bearer type of the first bearer is an SN-terminated MCG bearer, an SN-terminated SCG bearer, or an SN-terminated split bearer. The SN 11 may maintain a PDCP configuration. For example, the SN 11 may modify the PDCP SN length without changing the bearer type in the secondary node modification procedure.

Figure 10:
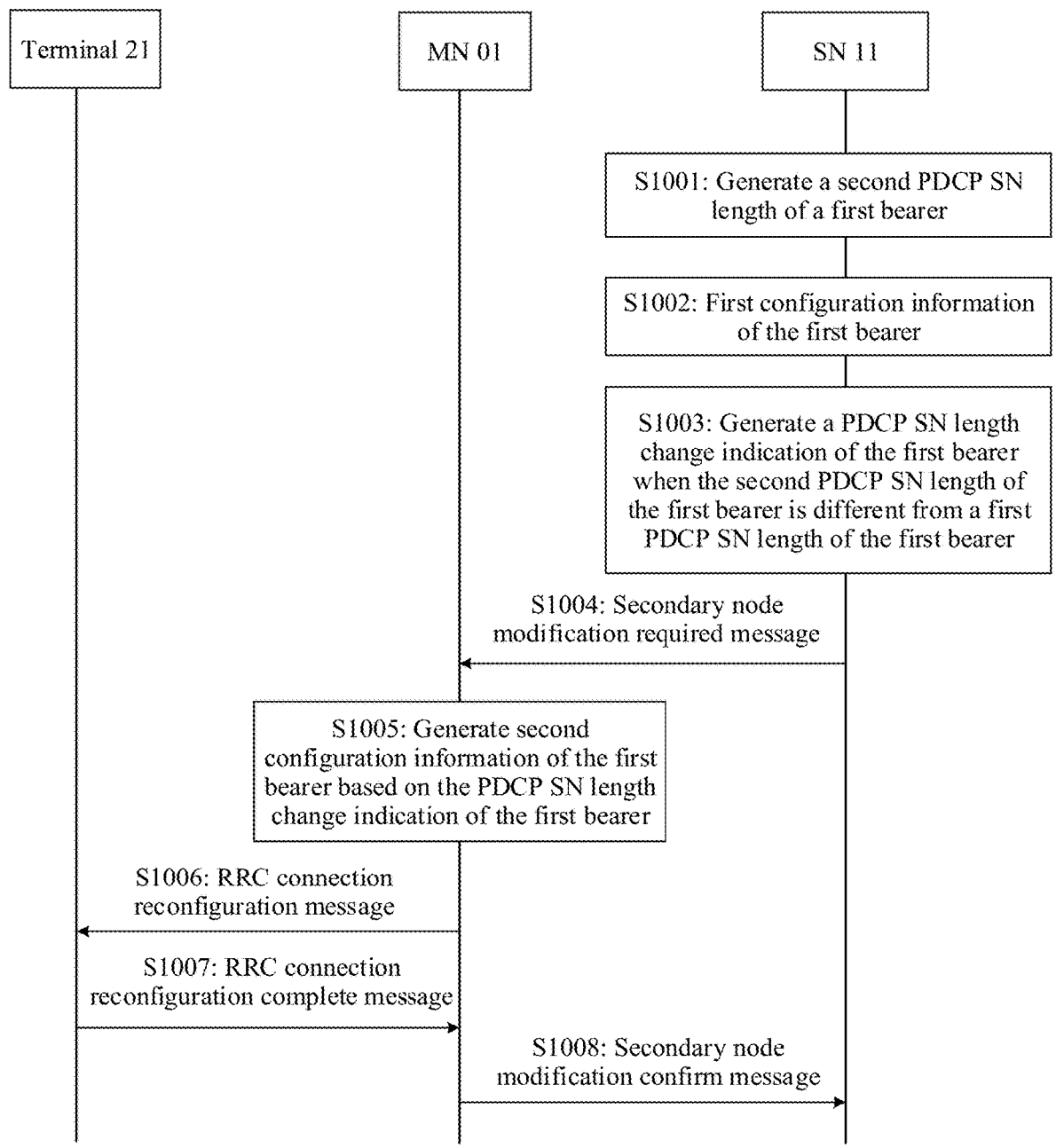
FIG. 10 is a schematic diagram of another implementation of changing a PDCP SN length.

FIG. 10 is a schematic diagram of another implementation of changing a PDCP SN length.

S1001: An SN 11 generates a second PDCP SN length of a first bearer.

For example, the second PDCP SN length may be 12 bits.

For example, the first bearer is an SN-terminated MCG bearer, an SN-terminated SCG bearer, or an SN-terminated split bearer.

S1002: The SN 11 generates first configuration information of the first bearer.

Optionally, S1002 and S1001 may simultaneously occur. In other words, the SN 11 may generate the second PDCP SN length of the first bearer when generating the first configuration information of the first bearer.

The first configuration information of the first bearer may be configuration information, of an entity that is on the SN 11 and that is of the first bearer, generated by the SN 11 for a terminal 21.

Before and after a PDCP SN length is changed, a bearer type of the first bearer remains unchanged, a PDCP entity of the first bearer is on the SN 11, and an RLC entity and a MAC entity may or may not be on the SN 11. For example, the first bearer is an SN-terminated MCG bearer, the PDCP entity of the first bearer is on the SN 11, and the RLC entity and the MAC entity are not on the SN 11; the first bearer is an SN-terminated SCG bearer or an SN-terminated split bearer, the PDCP entity of the first bearer is on the SN 11, and the RLC entity and the MAC entity are on the SN 11.

For example, if an entity (for example, a PDCP entity, an RLC entity, or a MAC entity) is on the SN 11 before a secondary node is added, and the entity is on the SN 11 after the secondary node is added, the first configuration information of the first bearer may include configuration information for releasing and adding the entity.

The first configuration information of the first bearer may include configuration information of a PDCP entity, for example, configuration information for releasing and adding a PDCP entity.

Optionally, the first configuration information of the first bearer may further include configuration information of an RLC entity and configuration information of a MAC entity, for example, configuration information for releasing and adding an RLC entity and configuration information for releasing and adding a MAC entity.

For example, the first bearer is an SN-terminated MCG bearer, and the first configuration information of the first bearer may include configuration information for releasing and adding a PDCP entity.

For example, the first bearer is an SN-terminated SCG bearer or an SN-terminated split bearer, and the first configuration information of the first bearer may include configuration information for releasing and adding a PDCP entity, configuration information for releasing and adding an RLC entity, and configuration information for releasing and adding a MAC entity.

S1003: The SN 11 generates a PDCP SN length change indication of the first bearer when the second PDCP SN length of the first bearer is different from a first PDCP SN length of the first bearer.

The PDCP SN length of the first bearer may be the first PDCP SN length before the PDCP SN length of the first bearer is the second PDCP SN length. This may be understood as that the PDCP SN length of the first bearer is the first PDCP SN length before the SN 11 generates the second PDCP SN length of the first bearer. This may alternatively be understood as that the PDCP SN length of the first bearer is the first PDCP SN length before the PDCP SN length of the first bearer is changed, and the PDCP SN length of the first bearer is the second PDCP SN length after the PDCP SN length of the first bearer is changed.

Before the PDCP SN length is changed, the first bearer is terminated at the SN 11, and the SN 11 may obtain the first PDCP SN length. For example, the first PDCP SN length may be 18 bits.

For example, the first PDCP SN length may be 18 bits, and the second PDCP SN length may be 12 bits. The first PDCP SN length is different from the second PDCP SN length. The SN 11 generates the PDCP SN length change indication of the first bearer.

S1004: The SN 11 sends a secondary node modification required message to an MN 01.

The secondary node modification required message may include a bearer identifier of the first bearer, the PDCP SN length change indication of the first bearer, and the first configuration information of the first bearer.

Optionally, a new information element may be defined in the secondary node modification required message, and the PDCP SN length change indication of the first bearer may be carried in the new information element. One bit may be used to carry the PDCP SN length change indication. For example, 1 indicates that the PDCP SN length is changed, and 0 indicates that the PDCP SN length is not changed.

S1005: The MN 01 generates second configuration information of the first bearer based on the PDCP SN length change indication of the first bearer.

The second configuration information of the first bearer may be configuration information, of an entity that is on the MN 01 and that is of the first bearer, generated by the MN 01 for the terminal 21.

For example, if an entity (for example, an RLC entity or a MAC entity) is on the MN 01 before a secondary node is added, and the entity is on the MN 01 after the secondary node is added, the second configuration information of the first bearer may include configuration information for releasing and adding the entity.

The second configuration information of the first bearer may include configuration information of an RLC entity and configuration information of a MAC entity, for example, configuration information for releasing and adding an RLC entity and configuration information for releasing and adding a MAC entity.

For example, the first bearer is an SN-terminated MCG bearer or an SN-terminated split bearer, and the second configuration information of the first bearer may include configuration information for releasing and adding an RLC entity and configuration information for releasing and adding a MAC entity.

For example, if the first bearer is an SN-terminated SCG bearer and the first bearer has no entity on the MN 01, the second configuration information of the first bearer may not be generated.

S1006: The MN 01 sends an RRC connection reconfiguration message to the terminal 21.

The RRC connection reconfiguration message may include the identifier of the first bearer, the first configuration information of the first bearer, and the second configuration information of the first bearer.

S1007: The terminal 21 sends an RRC connection reconfiguration complete message to the MN 01.

The terminal 21 performs an operation of deleting and then adding the bearer based on the bearer identifier, the first configuration information of the first bearer, and the second configuration information of the first bearer that are included in the RRC connection reconfiguration message.

S1008: The MN 01 sends a secondary node modification confirm message to the SN 11.

The following describes, with reference to a secondary node modification procedure, how to change a PDCP SN length in the secondary node modification procedure.

After a secondary node is added or secondary node modification triggered by a secondary node is completed, for example, referring to related content in FIG. 9 and FIG. 10, a PDCP entity of a first bearer may be on an SN 11. For example, a bearer type of the first bearer is an SN-terminated MCG bearer, an SN-terminated SCG bearer, or an SN-terminated split bearer. Optionally, the MN 01 may initiate a secondary node modification procedure, or the SN 11 may request the MN 01 to initiate a secondary node modification procedure, to change a bearer type of the first bearer. For example, the bearer type of the first bearer is an MN-terminated MCG bearer, an MN-terminated SCG bearer, or an MN-terminated split bearer. The MN 01 may initiate a secondary node modification procedure, or the SN 11 may request the MN 01 to initiate a secondary node modification procedure, to change or not to change a bearer type based on the foregoing six bearer types of the first bearer, and the SN 11 modifies a PDCP SN length.

Figure 11:
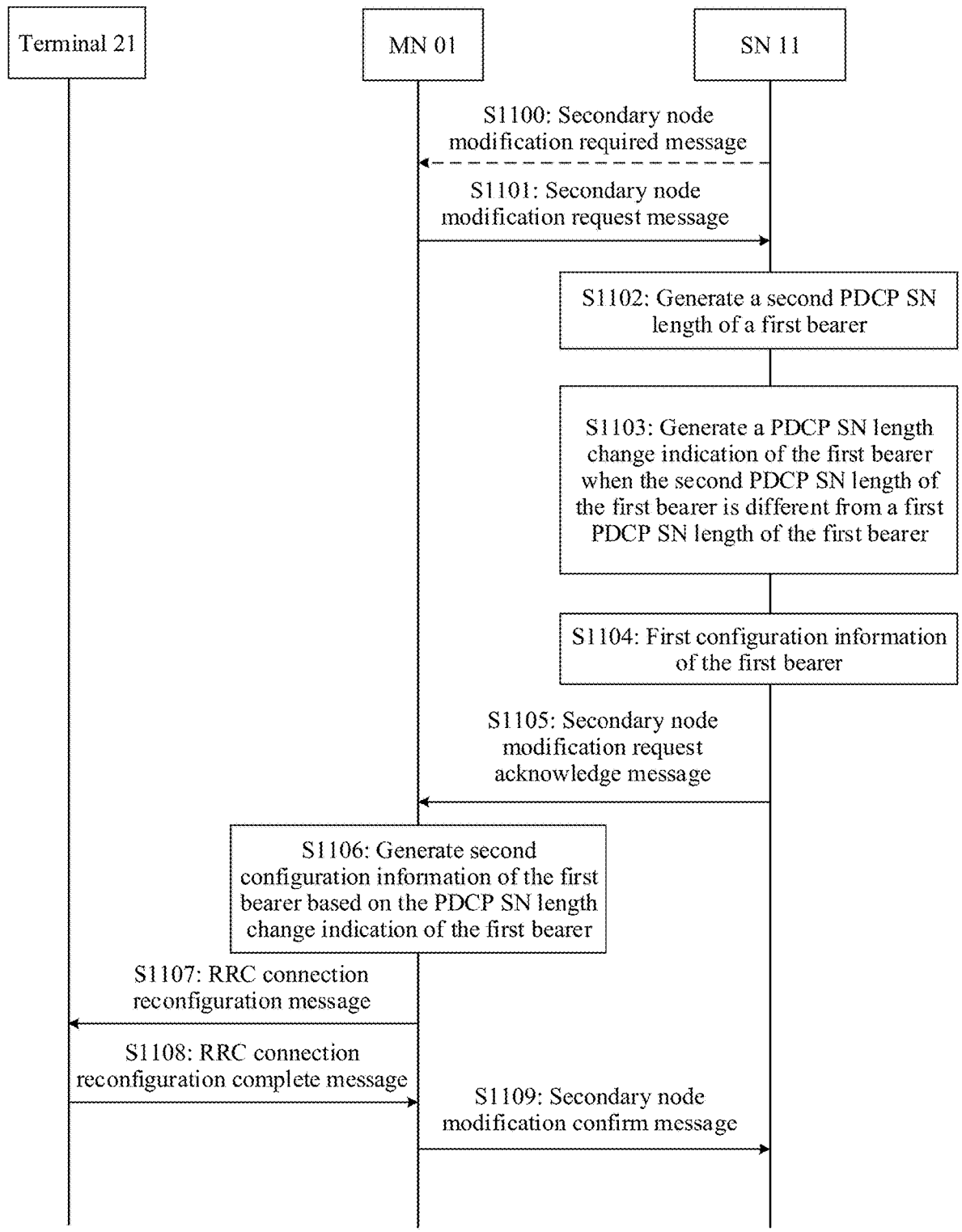
FIG. 11 is a schematic diagram of another implementation of changing a PDCP SN length.

FIG. 11 is a schematic diagram of another implementation of changing a PDCP SN length.

S1101: An MN 01 sends a secondary node modification request message to an SN 11.

Before the MN 01 sends the secondary node modification request message to the SN 11, a bearer type of the first bearer may be an MN-terminated MCG bearer, an MN-terminated SCG bearer, an MN-terminated split bearer, an SN-terminated MCG bearer, an SN-terminated SCG bearer, or an SN-terminated split bearer.

The MN 01 may modify the bearer type of the first bearer by using the secondary node modification request message. For example, the bearer type of the first bearer may be changed to a type of an SN-terminated bearer. For example, the foregoing three types of MN-terminated bearers may be changed to any of types of SN-terminated bearers, and one of the foregoing types of SN-terminated bearers may be changed to the other two types of SN-terminated bearers.

The secondary node modification request message may include:
- (1) Bearer identifier of the first bearer
- (2) Indication information of a modified bearer type The modified bearer type may be a type of SN-terminated bearer.

For example, whether a PDCP entity of the first bearer is on the SN 11 after the bearer type is modified, whether there is an MCG resource for the first bearer after a secondary node is added, and whether there is an SCG resource for the first bearer after the secondary node is added may be included.

- (3) Optionally, when the first bearer is terminated at the MN 01 before the bearer type of the first bearer is changed, configuration information of a PDCP entity that is of the first bearer and that is on the MN 01 may be included, and the configuration information may include a PDCP SN length of the first bearer on the MN 01, namely, the first PDCP SN length in FIG. 8 (where for example, the first PDCP SN length may be 12 bits), where the configuration information of the PDCP entity that is of the first bearer and that is on the MN 01 may be used to assist the SN 11 in generating new configuration information of the PDCP entity.

Optionally, before S1101, S1100 may be further included.

S1100: The SN 11 sends a secondary node modification required message to the MN 01.

The SN 11 may request the MN 01 to initiate a secondary node modification procedure.

S1102: The SN 11 generates a second PDCP SN length of the first bearer.

Because after the bearer type of the first bearer is modified, the first bearer may be terminated at the SN, the SN 11 may generate the second PDCP SN length of the first bearer, namely, the second PDCP SN length in S801 in FIG. 8, where for example, the second PDCP SN length is 18 bits.

S1103: The SN 11 generates a PDCP SN length change indication of the first bearer when the second PDCP SN length of the first bearer is different from the first PDCP SN length of the first bearer.

The PDCP SN length of the first bearer may be the first PDCP SN length before the PDCP SN length of the first bearer is the second PDCP SN length.

For example, the first PDCP SN length of the first bearer is 12 bits, and the second PDCP SN length of the first bearer is 18 bits. The first PDCP SN length is different from the second PDCP SN length. The SN 11 generates the PDCP SN length change indication of the first bearer.

S1104: The SN 11 generates first configuration information of the first bearer.

Optionally, S1103 and S1102 may simultaneously occur. In other words, the SN 11 may generate the second PDCP SN length of the first bearer when generating the first configuration information of the first bearer.

The first configuration information of the first bearer may be configuration information, of an entity that is on the SN 11 and that is of the first bearer, generated by the SN 11 for a terminal 21.

The first bearer may be terminated at the SN before the bearer type is changed. Before the bearer type is changed, the PDCP entity of the first bearer may be on the SN 11, an RLC entity and a MAC entity may or may not be on the SN 11, and the RLC entity or the MAC entity may or may not be on the MN 01. For example, before the bearer type is changed, the first bearer is an SN-terminated MCG bearer, the PDCP entity is on the SN 11, and the RLC entity and the MAC entity are on the MN 01. For example, before the bearer type is changed, the first bearer is an SN-terminated SCG bearer, and the PDCP entity, the RLC entity, and the MAC entity are on the SN 11. For example, before the bearer type is changed, the first bearer is an SN-terminated split bearer, the PDCP entity is on the SN 11, and the RLC entity and the MAC entity are on the MN 01 and the SN 11 respectively. The first bearer may be terminated at the SN after the bearer type is changed. For an entity that is of the first bearer and that is on the SN 11, refer to the related description of the entity that is of the first bearer and that is on the SN 11 before the bearer type is changed.

The first bearer may be terminated at the MN before the bearer type is changed. Before the bearer type is changed, the PDCP entity of the first bearer may be on the MN 01, an RLC entity and a MAC entity may or may not be on the MN 01, and the RLC entity or the MAC entity may or may not be on the SN 11. For example, before the bearer type is changed, the first bearer is an MN-terminated MCG bearer, the PDCP entity is on the MN 01, and the RLC entity and the MAC entity are on the MN 01. For example, before the bearer type is changed, the first bearer is an MN-terminated SCG bearer, the PDCP entity may be on the MN 01, and the RLC entity and the MAC entity are on the SN 11. For example, before the bearer type is changed, the first bearer is an MN-terminated split bearer, the PDCP entity is on the MN 01, and the RLC entity and the MAC entity are on the MN 01 and the SN 11 respectively. The first bearer may be terminated at the SN after the bearer type is changed. For an entity that is of the first bearer and that is on the SN 11, refer to the related description of the entity that is of the first bearer and that is on the SN 11 before the bearer type is changed.

If an entity (for example, the PDCP entity, the RLC entity, or the MAC entity) is not on the SN 11 before the bearer type is changed, and the entity is on the SN 11 after the bearer type is changed, the first configuration information of the first bearer may include configuration information for adding the entity. If an entity (for example, the PDCP entity, the RLC entity, or the MAC entity) is on the SN 11 before the bearer type is changed, and the entity is on the SN 11 after the bearer type is changed, the first configuration information of the first bearer may include configuration information for releasing and adding the entity. If an entity (for example, the PDCP entity, the RLC entity, or the MAC entity) is on the SN 11 before the bearer type is changed, and the entity is not on the SN 11 after the bearer type is changed, the first configuration information of the first bearer may include configuration information for releasing the entity.

The first bearer is terminated at the SN before the bearer type is changed. In other words, the first bearer is changed from one of an SN-terminated MCG bearer, an SN-terminated SCG bearer, or an SN-terminated split bearer to another of the SN-terminated MCG bearer, the SN-terminated SCG bearer, or the SN-terminated split bearer. The first configuration information of the first bearer may include the following cases:

In a first example, the first configuration information of the first bearer may include configuration information of a PDCP entity, for example, configuration information for releasing and adding a PDCP entity.

In a second example, based on the first example, the first configuration information of the first bearer may further include configuration information of an RLC entity and configuration information of a MAC entity, for example, configuration information for releasing and adding an RLC entity and configuration information for releasing and adding a MAC entity.

In a third example, based on the first example, the first configuration information of the first bearer may further include configuration information of an RLC entity and configuration information of a MAC entity, for example, configuration information for releasing an RLC entity and configuration information for releasing a MAC entity.

In a fourth example, based on the first example, the first configuration information of the first bearer may further include configuration information of an RLC entity and configuration information of a MAC entity, for example, configuration information for adding an RLC entity and configuration information for adding a MAC entity.

For example, the bearer type of the first bearer is an SN-terminated SCG bearer before the bearer type is modified, and the bearer type of the first bearer is an SN-terminated split bearer after the bearer type is modified. Alternatively, the bearer type of the first bearer is an SN-terminated split bearer before the bearer type is modified, and the bearer type of the first bearer is an SN-terminated SCG bearer after the bearer type is modified. The first configuration information of the first bearer may include configuration information for releasing and adding a PDCP entity, configuration information for releasing and adding an RLC entity, and configuration information for releasing and adding a MAC entity.

For example, the bearer type of the first bearer is an SN-terminated SCG bearer or split bearer before the bearer type is changed, and the bearer type of the first bearer is an SN-terminated MCG bearer after the bearer type is changed. The first configuration information of the first bearer may include configuration information for releasing and adding a PDCP entity, configuration information for releasing an RLC entity, and configuration information for releasing a MAC entity.

For example, the bearer type of the first bearer is an SN-terminated MCG bearer before the bearer type is modified, and the bearer type of the first bearer is an SN-terminated split bearer or an SN-terminated SCG bearer after the bearer type is modified. The first configuration information of the first bearer may include configuration information for releasing and adding a PDCP entity, configuration information for adding an RLC entity, and configuration information for adding a MAC entity.

The first bearer is terminated at the MN before the bearer type is changed. In other words, the first bearer is changed from one of an MN-terminated MCG bearer, an MN-terminated SCG bearer, or an MN-terminated split bearer to one of an SN-terminated MCG bearer, the SN-terminated SCG bearer, or the SN-terminated split bearer. The first configuration information of the first bearer may include the following:

In a first example, the first configuration information of the first bearer may include configuration information of a PDCP entity, for example, configuration information for adding a PDCP entity. Alternatively, for example, the first configuration information of the first bearer may include configuration information for releasing and adding a PDCP entity. For example, PDCP of both the MN 01 and the SN 11 may be NR PDCP, and the MN 01 may generate PDCP entity release information for the terminal 21, or the SN 11 may directly generate configuration information for releasing a PDCP entity while generating configuration information for adding a PDCP entity. In this case, the MN 01 does not need to generate the configuration information for releasing a PDCP entity.

In a second example, based on the first example, the first configuration information of the first bearer may include configuration information of an RLC entity and configuration information of a MAC entity, for example, configuration information for releasing and adding an RLC entity and configuration information for releasing and adding a MAC entity.

In a third example, based on the first example, the first configuration information of the first bearer may include configuration information of an RLC entity and configuration information of a MAC entity, for example, configuration information for releasing an RLC entity and configuration information for releasing a MAC entity.

In a fourth example, based on the first example, the first configuration information of the first bearer may include configuration information of an RLC entity and configuration information of a MAC entity, for example, configuration information for adding an RLC entity and configuration information for adding a MAC entity.

For example, the bearer type of the first bearer is an MN-terminated MCG bearer before the bearer type is modified, and the bearer type of the first bearer is an SN-terminated MCG bearer after the bearer type is modified. The first configuration information of the first bearer may include configuration information of a PDCP entity or configuration information for releasing and adding a PDCP entity.

For example, the bearer type of the first bearer is an MN-terminated SCG bearer or an MN-terminated split bearer before the bearer type is modified, and the bearer type of the first bearer is an SN-terminated SCG bearer or an SN-terminated split bearer after the bearer type is modified. The first configuration information of the first bearer may include configuration information of a PDCP entity or configuration information for releasing and adding a PDCP entity, configuration information for releasing and adding an RLC entity, and configuration information for releasing and adding a MAC entity.

For example, the bearer type of the first bearer is an MN-terminated MCG bearer before the bearer type is modified, and the bearer type of the first bearer is an SN-terminated SCG bearer or split bearer after the bearer type is modified. The first configuration information of the first bearer may include configuration information of a PDCP entity or configuration information for releasing and adding a PDCP entity, configuration information for adding an RLC entity, and configuration information for adding a MAC entity.

For example, the bearer type of the first bearer is an MN-terminated SCG bearer or an MN-terminated split bearer before the bearer type is modified, and the bearer type of the first bearer is an SN-terminated MCG bearer after the bearer type is modified. The first configuration information of the first bearer may include configuration information of a PDCP entity or configuration information for releasing and adding a PDCP entity, configuration information for releasing an RLC entity, and configuration information for releasing a MAC entity.

S1105: The SN 11 sends a secondary node modification request acknowledge message to the MN 01.

The secondary node modification request acknowledge message may include the bearer identifier of the first bearer, the PDCP SN length change indication of the first bearer, and the first configuration information of the first bearer.

Optionally, a new information element may be defined in the secondary node modification request acknowledge message, and the PDCP SN length change indication of the first bearer may be carried in the new information element. One bit may be used to carry the PDCP SN length change indication. For example, 1 indicates that the PDCP SN length is changed, and 0 indicates that the PDCP SN length is not changed.

S1106: The MN 01 generates second configuration information of the first bearer based on the PDCP SN length change indication of the first bearer.

The second configuration information of the first bearer may be configuration information, of an entity that is on the MN 01 and that is of the first bearer, generated by the MN 01 for the terminal 21.

If an entity (for example, the PDCP entity, the RLC entity, or the MAC entity) is not on the MN 01 before the bearer type is changed, and the entity is on the MN 01 after the bearer type is changed, the second configuration information of the first bearer may include configuration information for adding the entity. If an entity (for example, the PDCP entity, the RLC entity, or the MAC entity) is on the MN 01 before the bearer type is changed, and the entity is on the MN 01 after the bearer type is changed, the second configuration information of the first bearer may include configuration information for releasing and adding the entity. If an entity (for example, the PDCP entity, the RLC entity, or the MAC entity) is on the MN 01 before the bearer type is changed, and the entity is not on the MN 01 after the bearer type is changed, the second configuration information of the first bearer may include configuration information for releasing the entity.

The first bearer is terminated at the SN before the bearer type is changed. In other words, the first bearer is changed from one of an SN-terminated MCG bearer, an SN-terminated SCG bearer, or an SN-terminated split bearer to another of the SN-terminated MCG bearer, the SN-terminated SCG bearer, or the SN-terminated split bearer. The second configuration information of the first bearer may include the following:

In a first example, the second configuration information of the first bearer may include configuration information of an RLC entity and configuration information of a MAC entity, for example, configuration information for releasing and adding an RLC entity and configuration information for releasing and adding a MAC entity.

In a second example, the second configuration information of the first bearer may include configuration information of an RLC entity and configuration information of a MAC entity, for example, configuration information for releasing an RLC entity and configuration information for releasing a MAC entity.

In a third example, the second configuration information of the first bearer may include configuration information of an RLC entity and configuration information of a MAC entity, for example, configuration information for adding an RLC entity and configuration information for adding a MAC entity.

For example, the bearer type of the first bearer is an SN-terminated MCG bearer before the bearer type is modified, and the bearer type of the first bearer is an SN-terminated split bearer after the bearer type is modified. Alternatively, the bearer type of the first bearer is an SN-terminated split bearer before the bearer type is modified, and the bearer type of the first bearer is an SN-terminated MCG bearer after the bearer type is modified. The second configuration information of the first bearer may include configuration information for releasing and adding an RLC entity and configuration information for releasing and adding a MAC entity.

For example, the bearer type of the first bearer is an SN-terminated MCG bearer or an SN-terminated split bearer before the bearer type is modified, and the bearer type of the first bearer is an SN-terminated SCG bearer after the bearer type is modified. The second configuration information of the first bearer may include configuration information for releasing an RLC entity and configuration information for releasing a MAC entity.

For example, the bearer type of the first bearer is an SN-terminated SCG bearer before the bearer type is modified, and the bearer type of the first bearer is an SN-terminated MCG bearer or an SN-terminated split bearer after the bearer type is modified. The second configuration information of the first bearer may include configuration information for adding an RLC entity and configuration information for adding a MAC entity.

The first bearer is terminated at the MN before the bearer type is changed. In other words, the first bearer is changed from one of an MN-terminated MCG bearer, an SN-terminated SCG bearer, or an SN-terminated split bearer to one of an SN-terminated MCG bearer, the SN-terminated SCG bearer, or the SN-terminated split bearer. The first configuration information of the first bearer may include the following:

In a first example, the second configuration information of the first bearer may include configuration information of a PDCP entity, for example, configuration information for deleting a PDCP entity.

In a second example, based on the first example, the second configuration information of the first bearer may further include configuration information of an RLC entity and configuration information of a MAC entity, for example, configuration information for releasing and adding an RLC entity and configuration information for releasing and adding a MAC entity.

In a third example, based on the first example, the second configuration information of the first bearer may further include configuration information of an RLC entity and configuration information of a MAC entity, for example, configuration information for adding an RLC entity and configuration information for adding a MAC entity.

In a fourth example, based on the first example, the second configuration information of the first bearer may further include configuration information of an RLC entity and configuration information of a MAC entity, for example, configuration information for releasing an RLC entity and configuration information for releasing a MAC entity.

For example, the bearer type of the first bearer is an MN-terminated SCG bearer before the bearer type is modified, and the bearer type of the first bearer is an SN-terminated SCG bearer after the bearer type is modified. The second configuration information of the first bearer may include configuration information for deleting a PDCP entity or may not include configuration information for deleting a PDCP entity. In this case, the MN 01 may not generate the second configuration information.

For example, the bearer type of the first bearer is an MN-terminated MCG bearer or split bearer before the bearer type is modified, and the bearer type of the first bearer is an SN-terminated MCG bearer or split bearer after the bearer type is modified. The second configuration information of the first bearer may include configuration information for deleting a PDCP entity or may not include configuration information for deleting a PDCP entity, and may include configuration information for releasing and adding an RLC entity and configuration information for releasing and adding a MAC entity.

For example, the bearer type of the first bearer is an MN-terminated MCG bearer or split bearer before the bearer type is modified, and the bearer type of the first bearer is an SN-terminated SCG bearer after the bearer type is modified. The second configuration information of the first bearer may include configuration information for deleting a PDCP entity or may not include configuration information for deleting a PDCP entity, and may include configuration information for releasing an RLC entity and configuration information for releasing a MAC entity.

For example, the bearer type of the first bearer is an MN-terminated SCG bearer before the bearer type is modified, and the bearer type of the first bearer is an SN-terminated MCG bearer or an SN-terminated split bearer after the bearer type is modified. The second configuration information of the first bearer may include configuration information for deleting a PDCP entity or may not include configuration information for deleting a PDCP entity, and may include configuration information for adding an RLC entity and configuration information for adding a MAC entity.

S1107: The MN 01 sends an RRC connection reconfiguration message to the terminal 21.

The RRC connection reconfiguration message may include the bearer identifier of the first bearer, the first configuration information of the first bearer, and the second configuration information of the first bearer.

S1108: The terminal 21 sends an RRC connection reconfiguration complete message to the MN 01.

The terminal 21 performs an operation of deleting and then adding the bearer based on the bearer identifier, the first configuration information of the first bearer, and the second configuration information of the first bearer that are included in the RRC connection reconfiguration message.

S1109: The MN 01 sends a secondary node modification confirm (SN modification confirm) message to the SN 11.

Figure 12A:
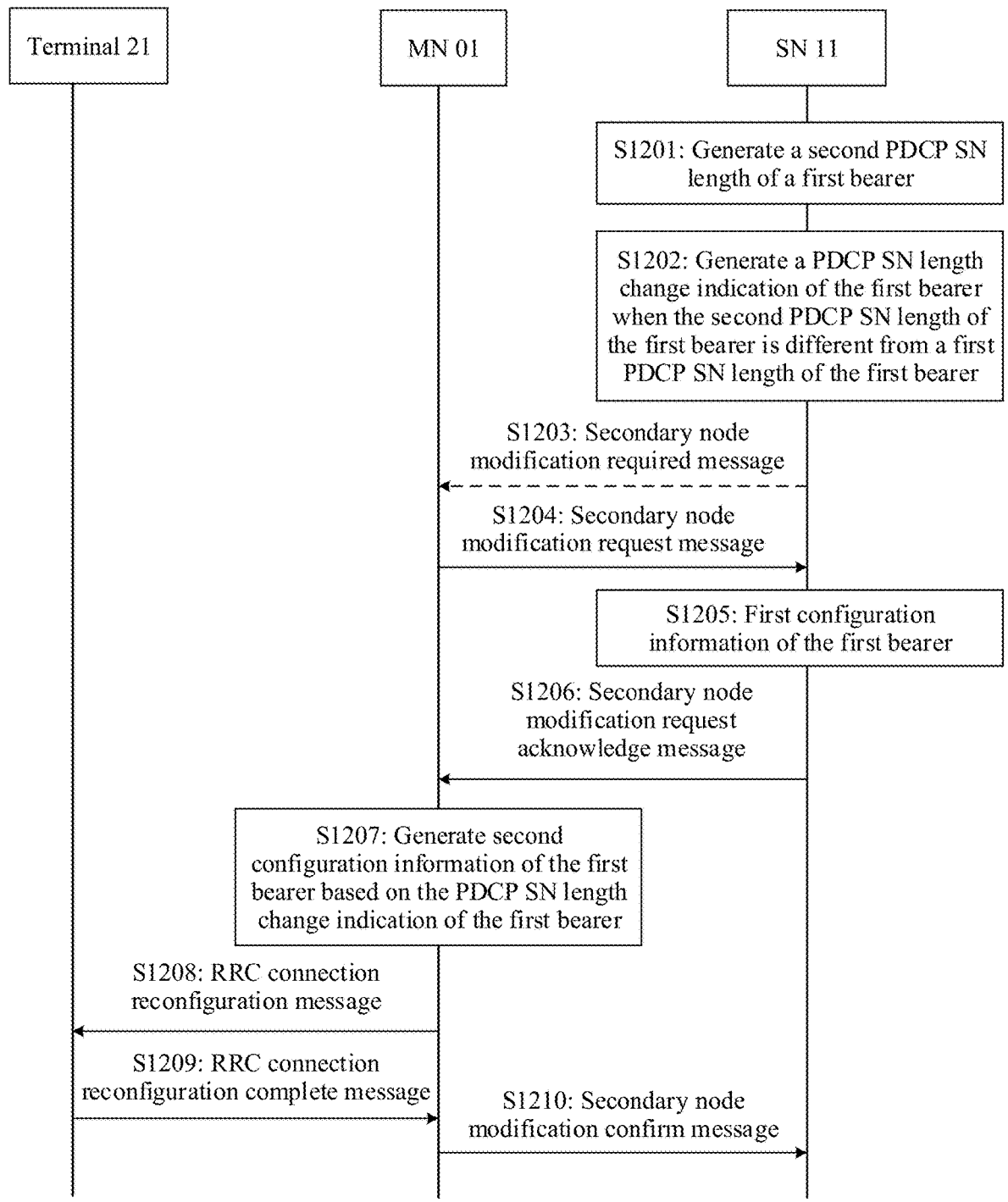
FIG. 12A is a schematic diagram of another implementation of changing a PDCP SN length.

FIG. 12A is a schematic diagram of another implementation of changing a PDCP SN length.

A first bearer may be terminated at an SN. The SN 11 may request an MN 01 to initiate a secondary node modification procedure to modify a bearer type of the first bearer. The first bearer after the modification is terminated at the SN. That is, the foregoing one type of SN-terminated bearer may be modified to the other two types of SN-terminated bearers.

S1201: The SN 11 generates a second PDCP SN length of the first bearer.

S1202: The SN 11 generates a PDCP SN length change indication of the first bearer when the second PDCP SN length of the first bearer is different from a first PDCP SN length of the first bearer.

S1203: The SN 11 sends a secondary node modification required message to the MN 01.

The secondary node modification required message includes the PDCP SN length change indication of the first bearer.

Optionally, a new information element may be defined in the secondary node modification required message, and the PDCP SN length change indication of the first bearer may be carried in the new information element. One bit may be used to carry the PDCP SN length change indication. For example, 1 indicates that the PDCP SN length is changed, and 0 indicates that the PDCP SN length is not changed.

S1204: The MN 01 sends a secondary node modification request message to the SN 11.

S1205: The SN 11 generates first configuration information of the first bearer.

S1206: The SN 11 sends a secondary node modification request acknowledge message to the MN 01.

S1207: The MN 01 generates second configuration information of the first bearer based on the PDCP SN length change indication of the first bearer.

S1208: The MN 01 sends an RRC connection reconfiguration message to a terminal 21.

The RRC connection reconfiguration message may include the bearer identifier of the first bearer, the first configuration information of the first bearer, and the second configuration information of the first bearer.

S1209: The terminal 21 sends an RRC connection reconfiguration complete message to the MN 01.

The terminal 21 performs an operation of deleting and then adding the bearer based on the bearer identifier, the first configuration information of the first bearer, and the second configuration information of the first bearer that are included in the RRC connection reconfiguration message.

S1210: The MN 01 sends a secondary node modification confirm (SN modification confirm) message to the SN 11.

For other content in S1201 to S1210, refer to related content in FIG. 11, for example, related content about "the first bearer may be terminated at the SN before the bearer type is changed".

In a first solution, the MN 01 and the SN 11 exchange the PDCP SN length change indication, so that the MN 01 and the SN 11 generate release and addition configuration information for the bearer for the terminal 21, to complete the change of the PDCP SN length. In addition, when the PDCP SN length may be 12 bits or 18 bits, after receiving the PDCP SN length change indication, the MN 01 can learn of a new PDCP SN length with reference to a PDCP SN length stored by the MN 01, so that the MN 01 can subsequently determine whether the PDCP SN length is changed, to subsequently generate the release and addition configuration information for the bearer.

The following describes a second solution.

Figure 12B:
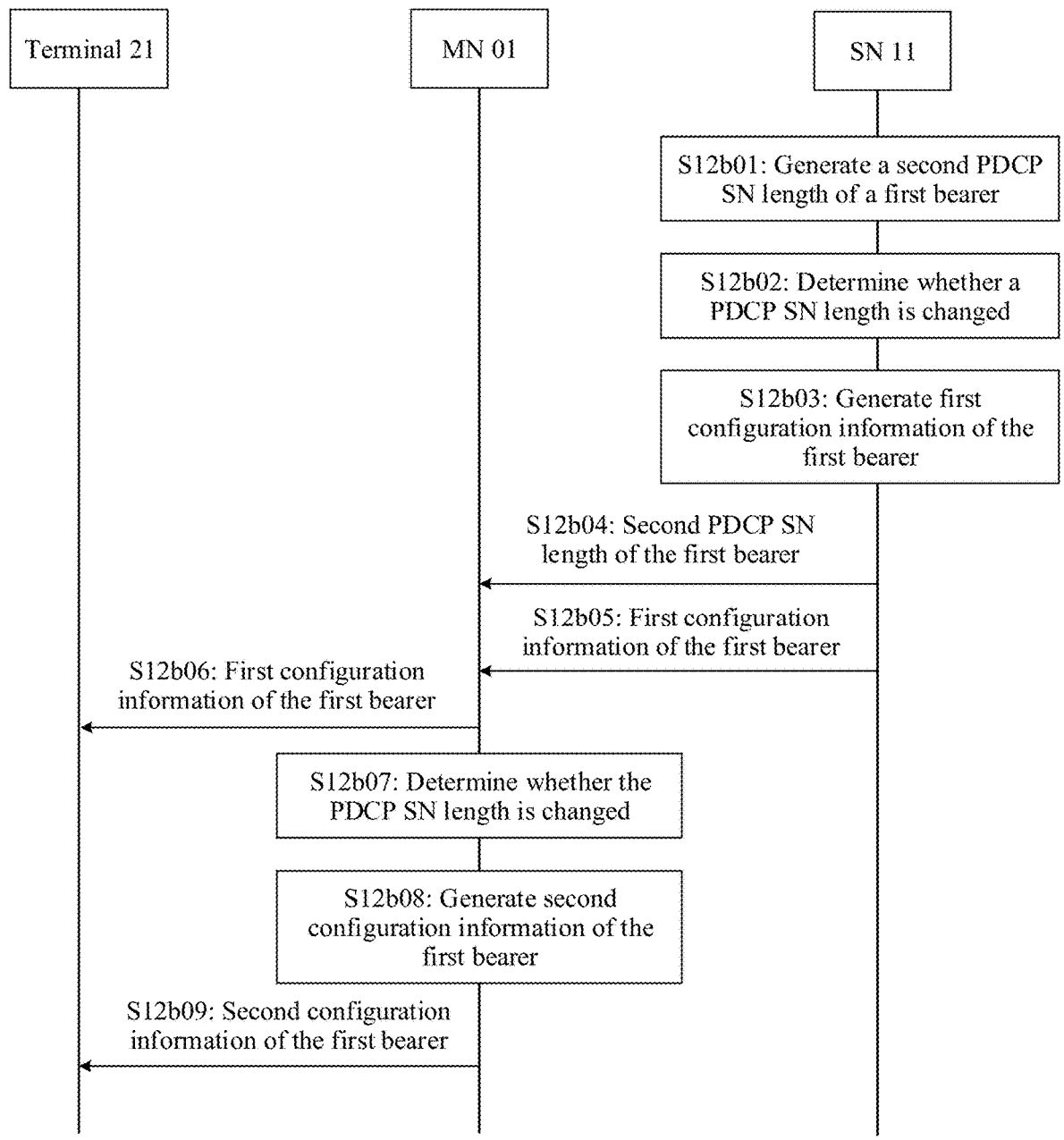
FIG. 12B is a schematic diagram of another implementation of changing a PDCP SN length.

FIG. 12B is a schematic diagram of another implementation of changing a PDCP SN length.

S12*b*01: An SN 11 generates a second PDCP SN length of a first bearer.

Reference may be made to related content in S801.

S12*b*02: The SN 11 determines whether a PDCP SN length is changed.

The PDCP SN length is changed when the second PDCP SN length of the first bearer is different from a first PDCP SN length of the first bearer.

The PDCP SN length of the first bearer may be the first PDCP SN length before the PDCP SN length of the first bearer is the second PDCP SN length.

In a first implementation, when the PDCP SN length of the first bearer is the first PDCP SN length, the first bearer is terminated at the SN, and the SN 11 may obtain the first PDCP SN length.

In a second implementation, when the PDCP SN length of the first bearer is the first PDCP SN length, the first bearer is terminated at the MN. The second implementation may further include: The MN 01 sends the first PDCP SN length to the SN 11, for example, sends the first PDCP SN length by using a secondary node addition request message or a secondary node modification request message.

For other content, refer to related content in S802.

When the PDCP SN length is changed, steps S1203 and S1205 to S1208 may be further included.

S12*b*03: The SN 11 generates first configuration information of the first bearer.

Optionally, S1203 and S1201 may simultaneously occur. In other words, the SN 11 may generate the second PDCP SN length of the first bearer when generating the first configuration information of the first bearer.

Reference may be made to S804 in FIG. 8. Details are not described herein again.

S12*b*04: The SN 11 sends the second PDCP SN length of the first bearer to the MN 01.

For example, the SN 11 may send the second PDCP SN length of the first bearer by using a secondary node addition request message, a secondary node modification request message, or a secondary node modification required message.

In a first example, the SN 11 may send the second PDCP SN length to the MN 01 when determining, in S1202, that the PDCP SN length is changed.

In a second example, the SN 11 may send the second PDCP SN length to the MN 01 after generating the second PDCP SN length. That is, the SN 11 may send the second PDCP SN length to the MN 01 when the PDCP SN length is changed or is not changed.

The MN 01 may read the second PDCP SN length of the first bearer. Optionally, the MN 01 may store the second PDCP SN length of the first bearer.

For example, the SN 11 may include the second PDCP SN length in an information element that is to be read by the MN 01 and send the information element to the MN 01.

For example, the SN 11 may define a new information element, where the information element includes the second PDCP SN length, and the MN 01 may read the second PDCP SN length in the information element.

Reference may be made to section 9.1.3.2 in 3GPP TS 36.423 V15.1.0. The SN 11 may include, in a secondary node addition request acknowledge message, configuration information generated by the SN 11 for a terminal 21. For example, the configuration information may be a container (container). The container may include the second PDCP SN length. However, in this case, the MN 01 is not required to read content in the container. Therefore, the MN 01 does not read the second PDCP SN length carried in the container.

Herein, the new information element may be defined or the second PDCP SN length may be carried in the information element that is to be read by the MN 01, so that the MN 01 reads the second PDCP SN length. Therefore, the MN 01 may determine whether the PDCP SN length is changed, to generate release and addition configuration information for the first bearer for terminal 21.

S12*b*05: The SN 11 sends the first configuration information of the first bearer to the MN 01.

Optionally, S1204 and S1205 may simultaneously occur. For example, the second PDCP SN length and the first configuration information of the first bearer may be sent to the MN 01 by using a same message, for example, a secondary node addition request acknowledge message or a secondary node modification request acknowledge message.

S12*b*06: The MN 01 sends the first configuration information of the first bearer to the terminal 21.

S12*b*07: The MN 01 determines whether the PDCP SN length is changed.

The PDCP SN length is changed when the second PDCP SN length of the first bearer is different from the first PDCP SN length of the first bearer.

In a first implementation, when the PDCP SN length of the first bearer is the first PDCP SN length, the first bearer is terminated at the SN, and the SN 11 may send the first PDCP SN length of the first bearer to the MN 01. For details, refer to related content in S1203.

In a second implementation, when the PDCP SN length of the first bearer is the first PDCP SN length, the first bearer is terminated at the MN, and the MN 01 may obtain the first PDCP SN length of the first bearer.

S12*b*08: The MN 01 generates second configuration information of the first bearer.

Reference may be made to related content in S807 in FIG. 8.

S12*b*09: The MN 01 sends the second configuration information of the first bearer to the terminal 21.

Reference may be made to related content in S808 in FIG. 8.

Optionally, S12*b*09 and S12*b*06 may simultaneously occur. For example, the SN 11 sends a message to the MN 01. The message includes the first configuration information of the first bearer and the second configuration information of the first bearer. For example, the message is an RRC connection reconfiguration message.

In a second solution, the MN 01 and the SN 11 separately determine whether the PDCP SN length is changed, so that the MN 01 and the SN 11 generate release and addition configuration information for the bearer for the terminal 21, thereby completing the change of the PDCP SN length. In addition, when there are more than three possibilities for the PDCP SN length, for example, three, four, or more possibilities, there may be many possibilities for the change of the PDCP SN length. Both the MN 01 and the SN 11 may learn of a latest PDCP SN length, and the MN 01 and the SN 11 may relatively accurately determine whether the PDCP SN length is changed.

The following describes a third solution.

A PDCP SN length corresponding to a bearer type may be configured. The MN 01 and the SN 11 may store PDCP SN lengths corresponding to bearer types. When the bearer type is changed, the MN 01 or the SN 11 may know whether the PDCP SN length is changed. When the PDCP SN length is changed, the MN 01 and the SN 11 generate release and addition configuration information for the bearer for the terminal 21.

For example, a bearer related to a single air interface resource, for example, an MN-terminated or SN-terminated MCG bearer or an MN-terminated or SN-terminated SCG bearer, may be configured as a PDCP SN length, for example, a 12-bit PDCP SN length. A bearer related to dual air interface resources, for example, an MN-terminated or SN-terminated split bearer, may be configured as another PDCP SN length, for example, an 18-bit PDCP SN length. The following uses this case as an example for description. A person skilled in the art may understand that the following content is also applicable to another case.

Figure 13:
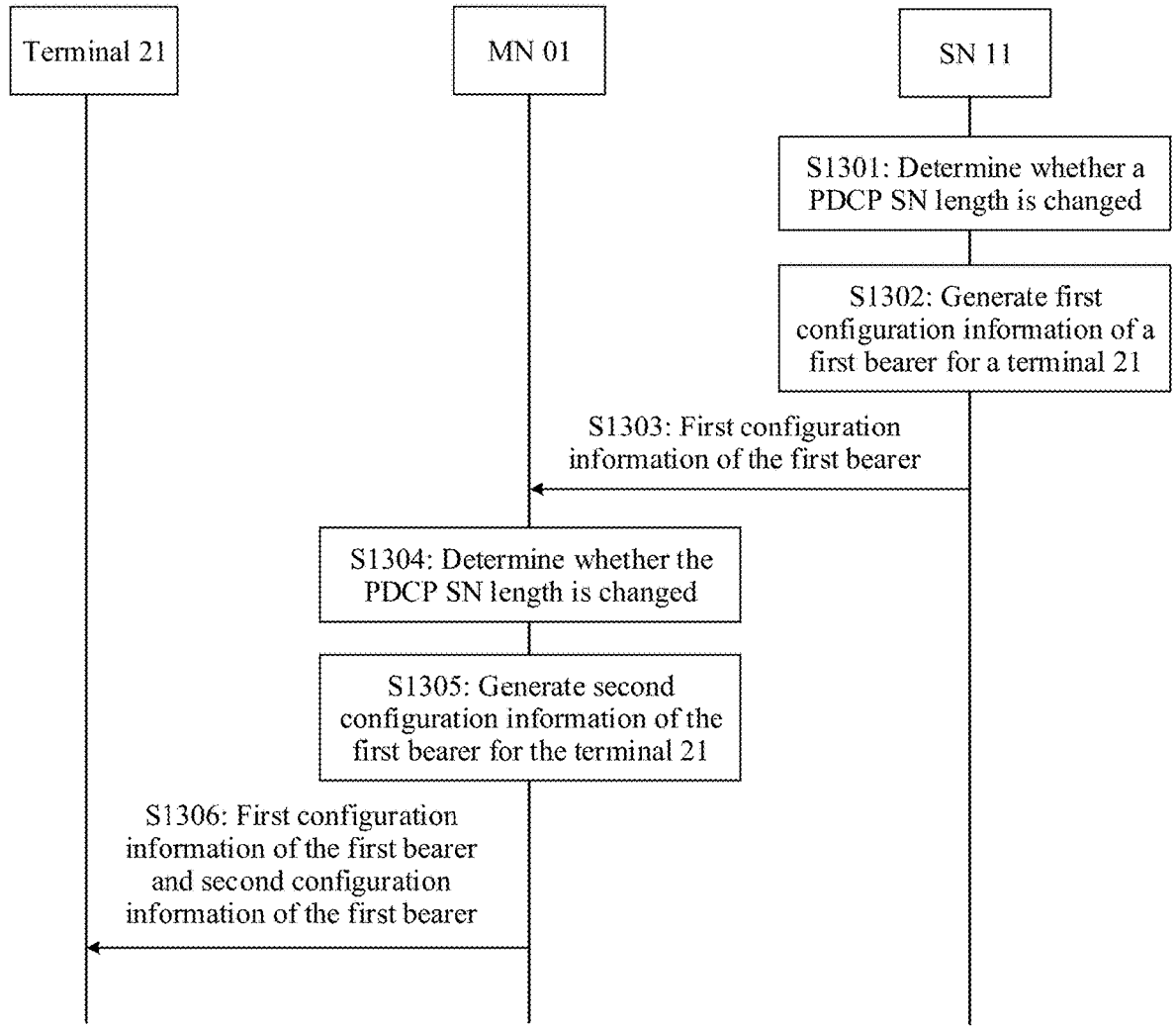
FIG. 13 is a schematic diagram of another implementation of changing a PDCP SN length.

FIG. 13 is a schematic diagram of another implementation of changing a PDCP SN length.

S1301: An SN 11 determines whether the PDCP SN length is changed.

For example, the SN 11 may perform determining by using the following steps: (1) determining whether a bearer type of a first bearer is changed, and (2) determining whether a PDCP SN length corresponding to the bearer type before the change and a PDCP SN length corresponding to a bearer type after the change. The SN 11 may receive the bearer type of the first bearer from an MN 01 by using, for example, a secondary node addition request message or a secondary node modification request message.

For example, the bearer type of the first bearer is changed. Before the change, the bearer type is an MN-terminated MCG bearer, and after the change, the bearer type is an SN-terminated split bearer. The SN 11 may learn that a PDCP SN length of the MN-terminated MCG bearer is 12 bits, and a PDCP SN length of the SN-terminated split bearer is 18 bits. In this case, the PDCP SN length is changed.

S1302: The SN 11 generates first configuration information of the first bearer for a terminal 21.

When the PDCP SN length is changed, the first configuration information of the first bearer may include configuration information of an entity that is of the first bearer and that is on the SN 11. For example, when the entity is on the SN 11 before the PDCP SN length is changed and is not on the SN 11 before the PDCP SN length is changed, the first configuration information may include release information of the entity. When the entity is on the SN 11 before the PDCP SN length is changed and is on the SN 11 before the PDCP SN length is changed, the first configuration information may include configuration information for releasing and adding the entity. When the entity is not on the SN 11 before the PDCP SN length is changed and is on the SN 11 before the PDCP SN length is changed, the first configuration information may include addition information of the entity. The entity may be a PDCP entity, an RLC entity, or a MAC entity.

Reference may be made to related content in FIG. 8 to FIG. 11.

S1303: The SN 11 sends the first configuration information of the first bearer to the MN 01.

For example, the first configuration information of the first bearer may be sent by using a secondary node addition request acknowledge message and a secondary node modification request acknowledge message.

S1304: The MN 01 determines whether the PDCP SN length is changed.

Reference may be made to related content in S1301.

S1305: The MN 01 generates second configuration information of the first bearer for the terminal 21.

When the PDCP SN length is changed, the second configuration information of the first bearer may include configuration information of an entity that is of the first bearer and that is on the MN 01. For example, when the entity is on the MN 01 before the PDCP SN length is changed and is not on the MN 01 before the PDCP SN length is changed, the second configuration information may include release information of the entity. When the entity is on the MN 01 before the PDCP SN length is changed and is on the MN 01 before the PDCP SN length is changed, the second configuration information may include configuration information for releasing and adding the entity. When the entity is not on the MN 01 before the PDCP SN length is changed and is on the MN 01 before the PDCP SN length is changed, the second configuration information may include addition information of the entity. The entity may be a PDCP entity, an RLC entity, or a MAC entity.

Reference may be made to related content in FIG. 8 to FIG. 11.

S1306: The MN 01 sends the first configuration information of the first bearer and the second configuration information of the first bearer to the terminal 21.

For example, the first configuration information of the first bearer and the second configuration information of the first bearer may be sent by using an RRC connection reconfiguration message.

In the three solutions, the MN 01 or the SN 11 may use a CU-DU architecture, some protocol layers may be deployed on a CU, and some protocol layers may be deployed on a DU. An example in which a PDCP layer is deployed on the CU, and an RLC layer, a MAC layer, and a physical layer are deployed on the DU is used below for description.

In this embodiment of this application, an action of sending or receiving performed by the SN 11 may be performed by a CU 1111. Configuration information of a PDCP entity in the first configuration information that is of the first bearer and that is generated by the SN 11 is generated by the CU 1111. Configuration information of an RLC entity or configuration information of a MAC entity in the first configuration information is generated by a DU 1121.

The CU 1111 may generate a PDCP SN length change indication. The CU 1111 may send the PDCP SN length change indication of the first bearer to the DU 1121. The DU 1121 generates the configuration information of an RLC entity or the configuration information of a MAC entity based on the PDCP SN length change indication of the first bearer. The CU 1111 may send the PDCP SN length change indication of the first bearer to the MN 01, for example, a CU 0111.

The CU 1111 may generate a PDCP SN length, and the CU 1111 may send the PDCP SN length of the first bearer to the DU 1121. The DU 1121 determines, based on the received PDCP SN length of the first bearer, whether the PDCP SN length is changed, and generates the configuration information of an RLC entity or the configuration information of a MAC entity. The CU 1111 may send the PDCP SN length of the first bearer to the MN 01, for example, the CU 0111.

In this embodiment of this application, an action of sending or receiving performed by the MN 01 may be performed by the CU 0111. Configuration information of a PDCP entity in the second configuration information that is of the first bearer and that is generated by the MN 01 is generated by the CU 0111. Configuration information of an RLC entity or configuration information of a MAC entity in the second configuration information is generated by the DU 0121. The CU 0111 may send a PDCP SN length change indication of the first bearer to a DU 0112. The DU 0112 generates the configuration information of an RLC entity or the configuration information of a MAC entity based on the PDCP SN length change indication of the first bearer. The CU 0111 may receive the PDCP SN length change indication of the first bearer from the SN 11, for example, the CU 1111, and then may send the PDCP SN length change indication of the first bearer to the DU 0112.

The CU 0111 may generate a PDCP SN length, and the CU 0111 may send the PDCP SN length of the first bearer to the DU 0121. The DU 0121 determines, based on the received PDCP SN length of the first bearer, whether the PDCP SN length is changed, and generates the configuration information of an RLC entity or the configuration information of a MAC entity. The CU 0111 may send the PDCP SN length of the first bearer to the SN 11, for example, the CU 1111.

Figure 14:
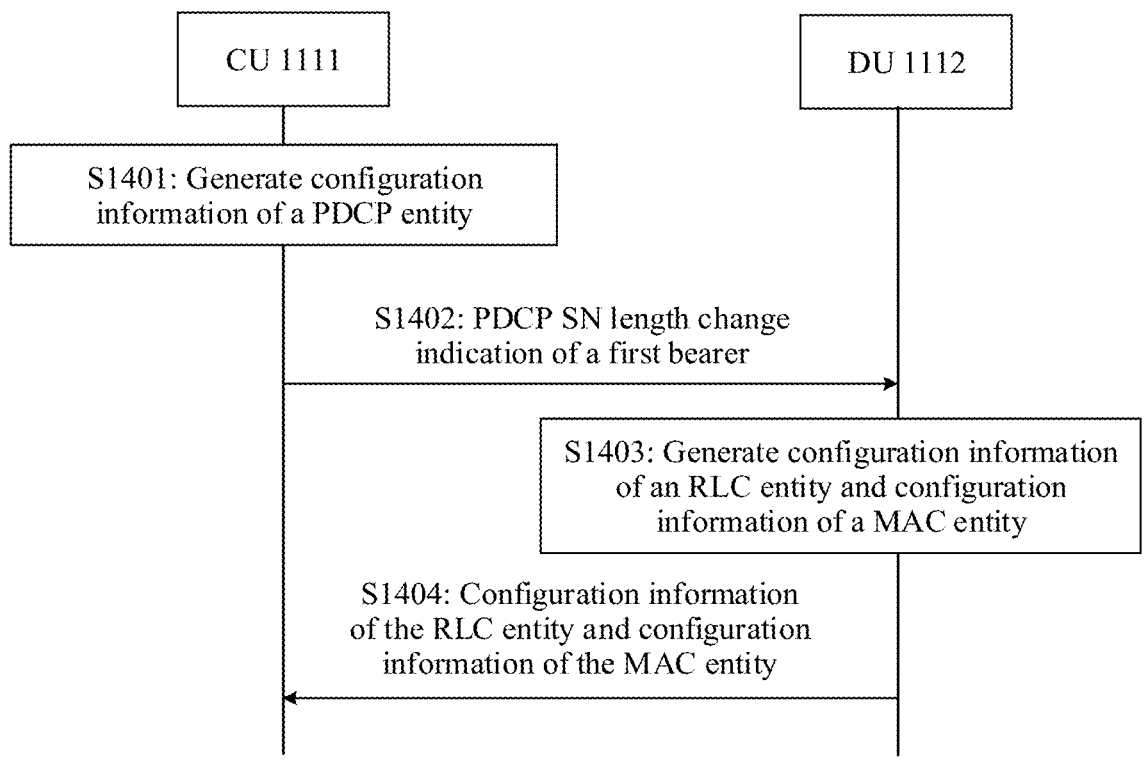
FIG. 14 is a schematic diagram of another implementation of changing a PDCP SN length in a CU-DU architecture.

FIG. 14 is a schematic diagram of another implementation of changing a PDCP SN length in a CU-DU architecture. ACU 1111 and a DU 1121 are used as an example for description. A person skilled in the art may understand that the following is also applicable to a CU 0111 and a DU 0121.

S1401: The CU 1111 generates configuration information of a PDCP entity.

S1402: The CU 1111 sends a PDCP SN length change indication of a first bearer to the DU 1121.

Alternatively, in another implementation, in 1402, the CU 1111 sends a PDCP SN length of the first bearer to the DU 1121, and the CU 1111 may include the PDCP SN length of the first bearer to an information element to be read by the DU 1121. For example, the CU 1111 may define a new information element. The new information element carries the PDCP SN length of the first bearer. The DU 1121 reads the PDCP SN length of the first bearer from the information element.

S1403: The DU 1121 generates configuration information of an RLC entity and configuration information of a MAC entity.

The DU 1121 may generate the configuration information of an RLC entity and the configuration information of a MAC entity based on the PDCP SN length change indication.

In another implementation, the DU 1121 may read the PDCP SN length sent by the CU 1111. The DU 1121 may determine, based on a received PDCP SN length of the first bearer, whether the PDCP SN length is changed, and generate the configuration information of an RLC entity or the configuration information of a MAC entity if the PDCP SN length is changed.

S1404: The DU 1121 sends the configuration information of an RLC entity and the configuration information of a MAC entity to the CU 1111.

Herein, the configuration information of a PDCP entity may include configuration information for releasing a PDCP entity, configuration information for adding a PDCP entity, or configuration information for releasing and adding a PDCP entity in the embodiments of this application.

Herein, the configuration information of an RLC entity may include configuration information for releasing an RLC entity, configuration information for adding an RLC entity, or configuration information for releasing and adding an RLC entity in the embodiments of this application.

Herein, the configuration information of a MAC entity may include configuration information for releasing a MAC entity, configuration information for adding a MAC entity, or configuration information for releasing and adding a MAC entity in the embodiments of this application.

For details, refer to related content in FIG. 8 to FIG. 13. Details are not described herein again.

The foregoing describes a method flowchart of the embodiments of this application. It should be understood that the MN 01 may have a functional unit corresponding to a step of a method or procedure of the MN 01, and the SN 11 may have a functional unit corresponding to a step of a method or procedure of the SN 11.

For example, the SN 11 may include a generation unit and a communications unit. The generation unit may generate a second PDCP SN length of a first bearer. The generation unit may further generate a PDCP SN length change indication of the first bearer when the second PDCP SN length of the first bearer is different from a first PDCP SN length of the first bearer. The communications unit may send the PDCP SN length change indication of the first bearer to an MN. Optionally, the generation unit may be further configured to generate first configuration information of the first bearer, and the communications unit is configured to send the first configuration information of the first bearer to the MN 01.

For example, the SN 11 may include a communications unit and a storage unit. The communications unit may be configured to receive a PDCP SN length change indication of a first bearer from an MN. The storage unit may be configured to store the PDCP SN length change indication of the first bearer. Optionally, the SN 11 may further include a generation unit. The generation unit may be configured to generate second configuration information of the first bearer. The communications unit may send the first configuration information of the first bearer and the second configuration information of the first bearer to a terminal 21.

The following describes a device or an apparatus in the embodiments of this application.

Figure 15:
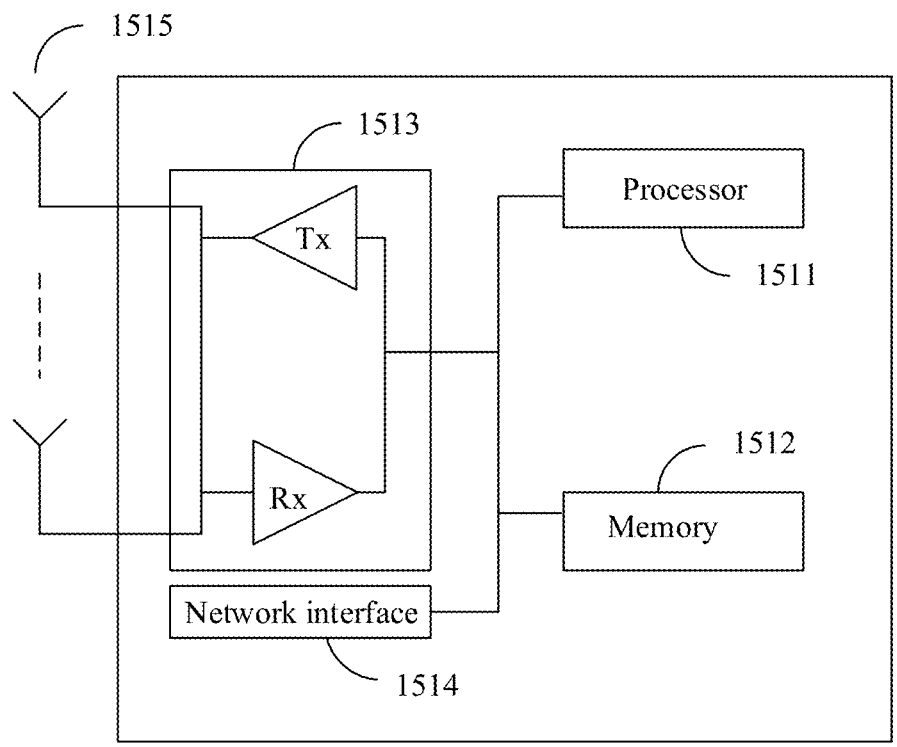
FIG. 15 is a schematic structural diagram of an access network device.

FIG. 15 is a schematic structural diagram of an access network device. For an MN 01 or SN 11, refer to a structure shown in FIG. 15.

The access network device includes at least one processor 1511, at least one memory 1512, at least one transceiver 1513, at least one network interface 1514, and one or more antennas 1515. The processor 1511, the memory 1512, the transceiver 1513, and the network interface 1514 are connected by using, for example, a bus. The antenna 1515 is connected to the transceiver 1513. The network interface 1514 is configured to enable the access network device to connect to another communications device by using a communications link. For example, the access network device is connected to a core network element 101 by using an S1 interface. In this embodiment of this application, the connection may include various types of interfaces, transmission lines, buses, or the like. This is not limited in this embodiment.

In this embodiment of this application, the processor such as the processor 1511 may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 1511 may be a single-core (single-CPU) processor or a multi-core (multi-CPU) processor. The at least one processor 1511 may be integrated into one chip or located on a plurality of different chips.

In this embodiment of this application, the memory such as the memory 1512 may include at least one of the following types: a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited herein.

The memory 1512 may exist independently, and is connected to the processor 1511. Optionally, the memory 1512 may alternatively be integrated with the processor 1511, for example, integrated into a chip. The memory 1512 can store program code for executing the technical solutions in the embodiments of this application, and the processor 1511 controls the execution. Various types of computer program code that are executed may also be considered as drivers of the processor 1511. For example, the processor 1511 is configured to execute the computer program code stored in the memory 1512, to implement the technical solutions in the embodiments of this application.

The transceiver 1513 may be configured to support receiving or sending of a radio frequency signal between the access network device and a terminal, and the transceiver 1513 may be connected to the antenna 1515. The transceiver 1513 includes a transmitter Tx and a receiver Rx. Specifically, the one or more antennas 1515 may receive a radio frequency signal. The receiver Rx of the transceiver 1513 is configured to: receive the radio frequency signal from the antenna, convert the radio frequency signal into a digital baseband signal or a digital intermediate frequency signal, and provide the digital baseband signal or the digital intermediate frequency signal to the processor 1511, so that the processor 1511 further processes the digital baseband signal or the digital intermediate frequency signal, for example, performs demodulation processing and decoding processing. In addition, the transmitter Tx of the transceiver 1513 is further configured to: receive a modulated digital baseband signal or digital intermediate frequency signal from the processor 1511, convert the modulated digital baseband signal or digital intermediate frequency signal into a radio frequency signal, and send the radio frequency signal through the one or more antennas 1515. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

When the access network device is an SN 11, the access network device may implement the method performed by the SN 11 in the embodiments of this application. For example, the processor 1511 may generate a second PDCP SN length of a first bearer, a PDCP SN length change indication of the first bearer, and first configuration information of the first bearer. The processor 1511 may send the PDCP SN length change indication of the first bearer and the first configuration information of the first bearer to an MN 01 through the network interface 1514. The memory 1512 may store a PDCP SN length of the first bearer, for example, a first PDCP SN length and/or the second PDCP SN length. For other steps implemented by the access network device by using components of the access network device, refer to the method performed by the SN 11 in the embodiments of this application. Details are not described herein again.

When the access network device is an MN 01, the access network device may implement the method performed by the MN 01 in the embodiments of this application. For example, the access network device may receive a PDCP SN length change indication of a first bearer and first configuration information of the first bearer through the network interface 1514. The processor 1511 may generate second configuration information of the first bearer based on the PDCP SN length change indication of the first bearer. The antenna 1515 may send the first configuration information of the first bearer and the second configuration information of the first bearer to a terminal 21. The memory 1512 may store a PDCP SN length of the first bearer, for example, a first PDCP SN length and/or a second PDCP SN length. For other steps implemented by the access network device by using the components of the access network device, refer to the method performed by the MN 01 in the embodiments of this application. Details are not described herein again.

Figure 16:
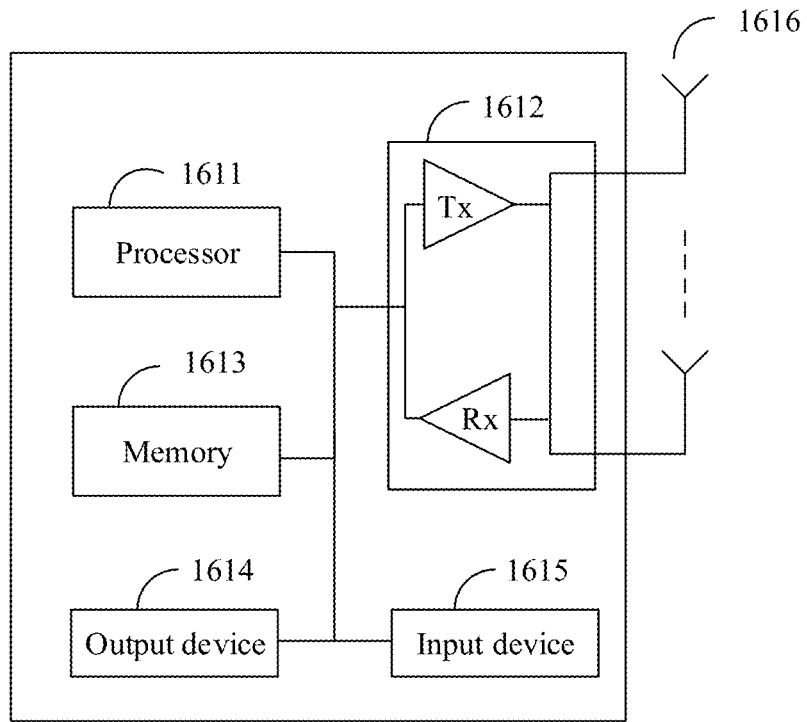
FIG. 16 is a schematic structural diagram of a terminal.

FIG. 16 is a schematic structural diagram of a terminal according to an embodiment of this application. For a structure of a terminal 21, refer to a structure shown in FIG. 16.

The terminal includes at least one processor 1611, at least one transceiver 1612, and at least one memory 1613. The processor 1611, the memory 1613, and the transceiver 1612 are connected. Optionally, the terminal 21 may further include an output device 1614, an input device 1615, and one or more antennas 1616. The antenna 1616 is connected to the transceiver 1612, and the output device 1614 and the input device 1615 are connected to the processor 1611.

For the transceiver 1612, the memory 1613, and the antenna 1616, refer to related descriptions in FIG. 15, to implement a similar function.

The processor 1611 may be a baseband processor or a CPU. The baseband processor and the CPU may be integrated or separated.

The processor 1611 may be configured to implement various functions for the terminal, for example, configured to process a communications protocol and communications data, or configured to control the entire terminal device, execute a software program, and process data of the software program, or configured to assist in completing a computing processing task, for example, performing graphics and image processing or audio processing. Alternatively, the processor 1611 is configured to implement one or more of the foregoing functions.

The output device 1614 communicates with the processor 1611, and may display information in a plurality of manners. For example, the output device 1614 may be a liquid crystal display (Liquid Crystal Display, LCD), a light emitting diode (Light Emitting Diode, LED) display device, a cathode ray tube (Cathode Ray Tube, CRT) display device, a projector (projector), or the like. The input device 1615 communicates with the processor 1611 and may receive a user input in a plurality of manners. For example, the input device 1615 may be a mouse, a keyboard, a touchscreen device, a sensing device, or the like.

When the terminal is a terminal 21, the terminal may implement the method performed by the terminal 21 in the embodiments of this application. For example, the terminal may receive first configuration information of a first bearer and second configuration information of the first bearer from an MN 01 by using the antenna 1616. For other steps implemented by the terminal by using components of the terminal, refer to the method performed by the terminal 21 in the embodiments of this application. Details are not described herein again.

Figure 17:
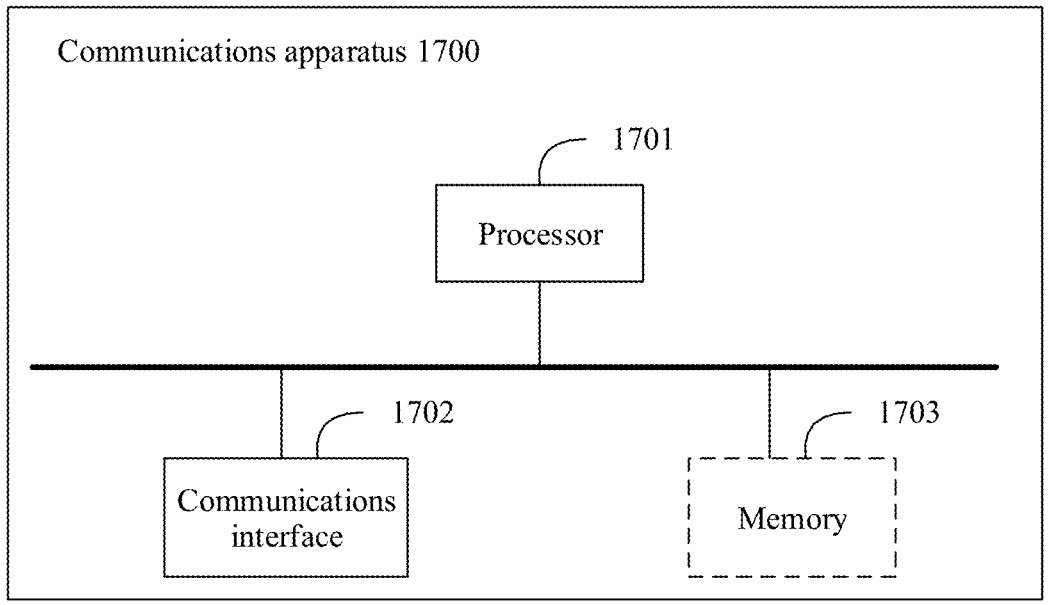
FIG. 17 is a schematic structural diagram of an apparatus 1700.

FIG. 17 is a schematic structural diagram of an apparatus 1700 according to an embodiment of this application.

The communications apparatus 1700 includes a processor 1701 and a communications interface 1702. The processor 1701 is connected to the communications interface 1702. Optionally, the communications apparatus 1700 may further include a memory 1703. The memory 1703 is connected to the processor 1701 and the communications interface 1702.

The processor 1701 may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 1701 may be a single-core processor (single-CPU) or a multi-core processor (multi-CPU). At least one processor 1711 may be integrated into one chip or located on a plurality of different chips.

The memory 1703 may include at least one of the following types: a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited herein.

The communications interface 1702 may have a transceiver function, and is configured to communicate with another communications apparatus or another component in the communications apparatus.

The memory 1703 may exist independently and is connected to the processor 1701 by using a communications bus. The memory 1703 may alternatively be integrated with the processor 1701.

The apparatus 1700 may be an MN (for example, an MN 01), a chip in an MN (for example, an MN 01), an SN (for example, an SN 11), a chip in an SN (for example, an SN 11), a CU (for example, a CU 0111 or a CU 1111), a chip in a CU (for example, a CU 0111 or a CU 1111), and a chip in a DU (for example, a DU 0121 or a DU 1121).

When the apparatus 1700 is the MN 01 or the chip in the MN 01, the memory 1703 may store an instruction and data of the method performed by the MN 01 in the embodiments of this application, and the processor 1701 may read and run the instruction and data of the method in the memory 1703, to implement the method performed by the MN 01 in the embodiments of this application. When the apparatus 1700 is the MN 01, the communications interface 1702 may include an interface with another access network device, for example, an interface with an SN 11, and the communications interface may further include an antenna and a transceiver, for example, the antenna 1515 and the transceiver 1513 in FIG. 15. When the apparatus 1700 is the chip in the MN 01, the communication interface 1702 may be an input or output interface, a pin, a circuit, or the like, and the processor 1701 and the memory 1703 may be integrated together.

When the apparatus 1700 is the SN 11 or the chip in the SN 11, the memory 1703 may store an instruction and data of the method performed by the SN 11 in the embodiments of this application, and the processor 1701 may read and run the instruction and data of the method in the memory 1703, to implement the method performed by the SN 11 in the embodiments of this application. When the apparatus 1700 is the SN 11, the communications interface 1702 may include an interface with another access network device, for example, an interface with an MN 01, and the communications interface may further include an antenna and a transceiver, for example, the antenna 1515 and the transceiver 1513 in FIG. 15. When the apparatus 1700 is the chip in the SN 11, the communication interface 1702 may be an input or output interface, a pin, a circuit, or the like, and the processor 1701 and the memory 1703 may be integrated together.

When the apparatus 1700 is the CU 0111 (or the CU 1111) or the chip in the CU 0111 (or the CU 1111), the memory 1703 may store an instruction and data of the method performed by the CU 0111 (or the CU 1111) in the embodiments of this application, and the processor 1701 may read and run the instruction and data of the method in the memory 1703, to implement the method performed by the CU 0111 (or the CU 1111) in the embodiments of this application. When the apparatus 1700 is the CU 0111 (or the CU 1111), the communications interface 1702 may include an interface with the DU 0121 (or the DU 1121), and may further include an interface with the CU 1111 (or the CU 0111). When the apparatus 1700 is the chip in the CU 0111 (or the CU 1111), the communication interface 1702 may be an input or output interface, a pin, a circuit, or the like, and the processor 1701 and the memory 1703 may be integrated together.

When the apparatus 1700 is the DU 0121 (or the DU 1121) or the chip in the DU 0121 (or the DU 1121), the memory 1703 may store an instruction and data of the method performed by the DU 0121 (or the DU 1121) in the embodiments of this application, and the processor 1701 may read and run the instruction and data of the method in the memory 1703, to implement the method performed by the DU 0121 (or the DU 1121) in the embodiments of this application. When the apparatus 1700 is the DU 0121 (or the DU 1121), the communications interface 1702 may include an interface with the CU 0111 (or the CU 1111), and may further include a transceiver and an antenna. The transceiver and the antenna may be configured to send data to a terminal 21 or receive data from the terminal 21, for example, first configuration information of a first bearer and second configuration information of the first bearer. When the apparatus 1700 is the chip in the CU 0111 (or the CU 1111), the communication interface 1702 may be an input or output interface, a pin, a circuit, or the like, and the processor 1701 and the memory 1703 may be integrated together.

An embodiment of this application further provides a computer-readable storage medium. The method described in the foregoing method embodiments may be all or partially implemented by using software, hardware, firmware, or any combination thereof. If the method is implemented in software, functions serving as one or more instructions or code may be stored in or transmitted on a computer-readable medium. The computer-readable medium may include the computer-storage medium and a communications medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage, a magnetic disk storage or another magnetic storage device, or any other medium that can be configured to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a network relay node, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc, where the magnetic disks usually magnetically reproduce data, and the optical discs optically reproduce data by using laser light. The foregoing combination should also be included within the scope of the computer-readable medium.

An embodiment of this application further provides a computer program product. The method described in the foregoing method embodiments may be all or partially implemented by using software, hardware, firmware, or any combination thereof. When the method is implemented in software, the method may be all or partially implemented in a form of the computer program product. The computer program product includes one or more computer instructions. When the computer program instructions are loaded and executed on a computer, procedures or functions described in the foregoing method embodiments are all or partially generated. The computer may be a general-purpose computer, a dedicated computer, a computer network, a network device, user equipment, or other programmable apparatuses.

Figure 18:
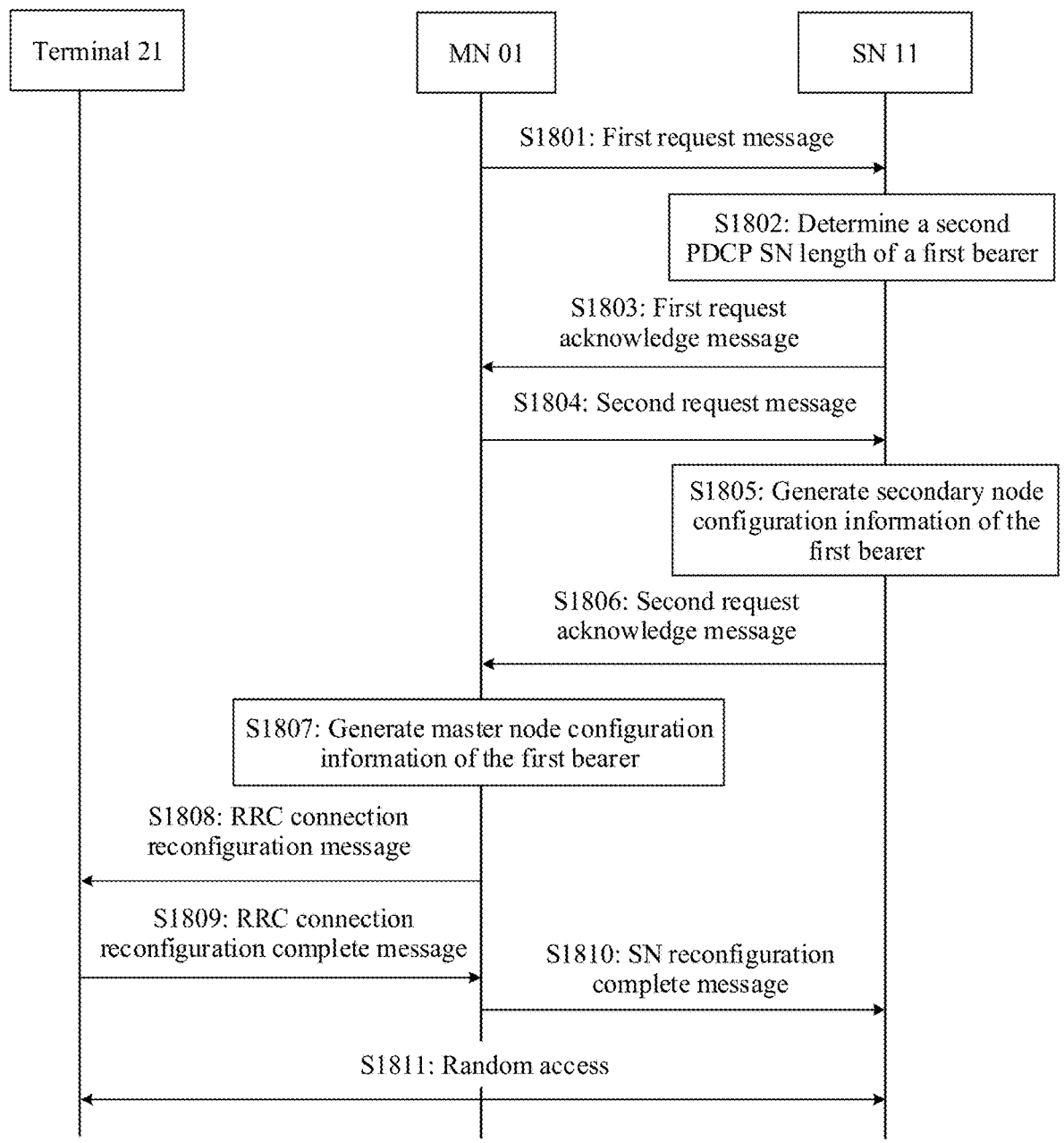
FIG. 18 is a schematic diagram of another implementation of changing a PDCP SN length.
Figure 19:
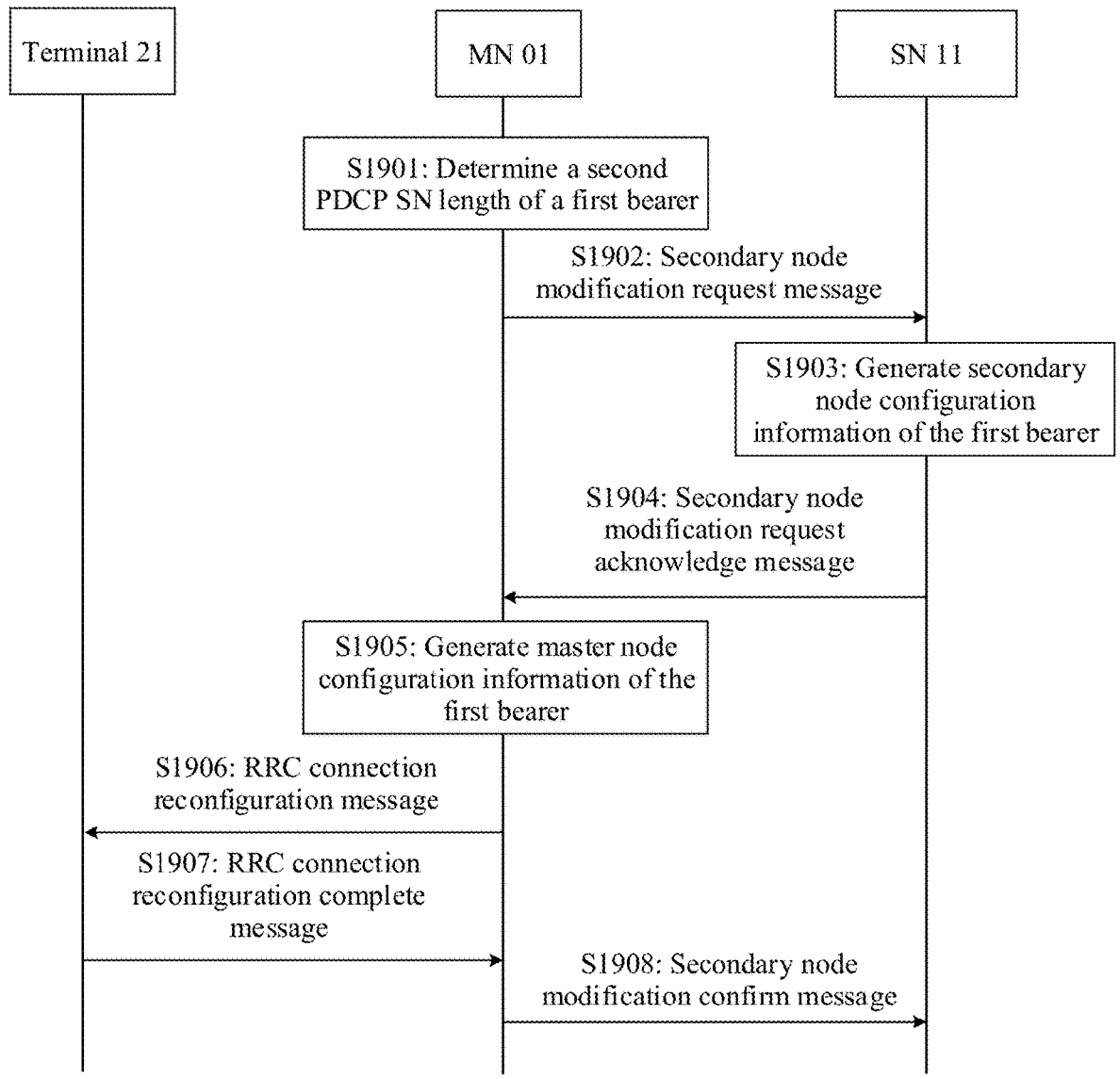
FIG. 19 is a schematic diagram of another implementation of changing a PDCP SN length.
Figure 20:
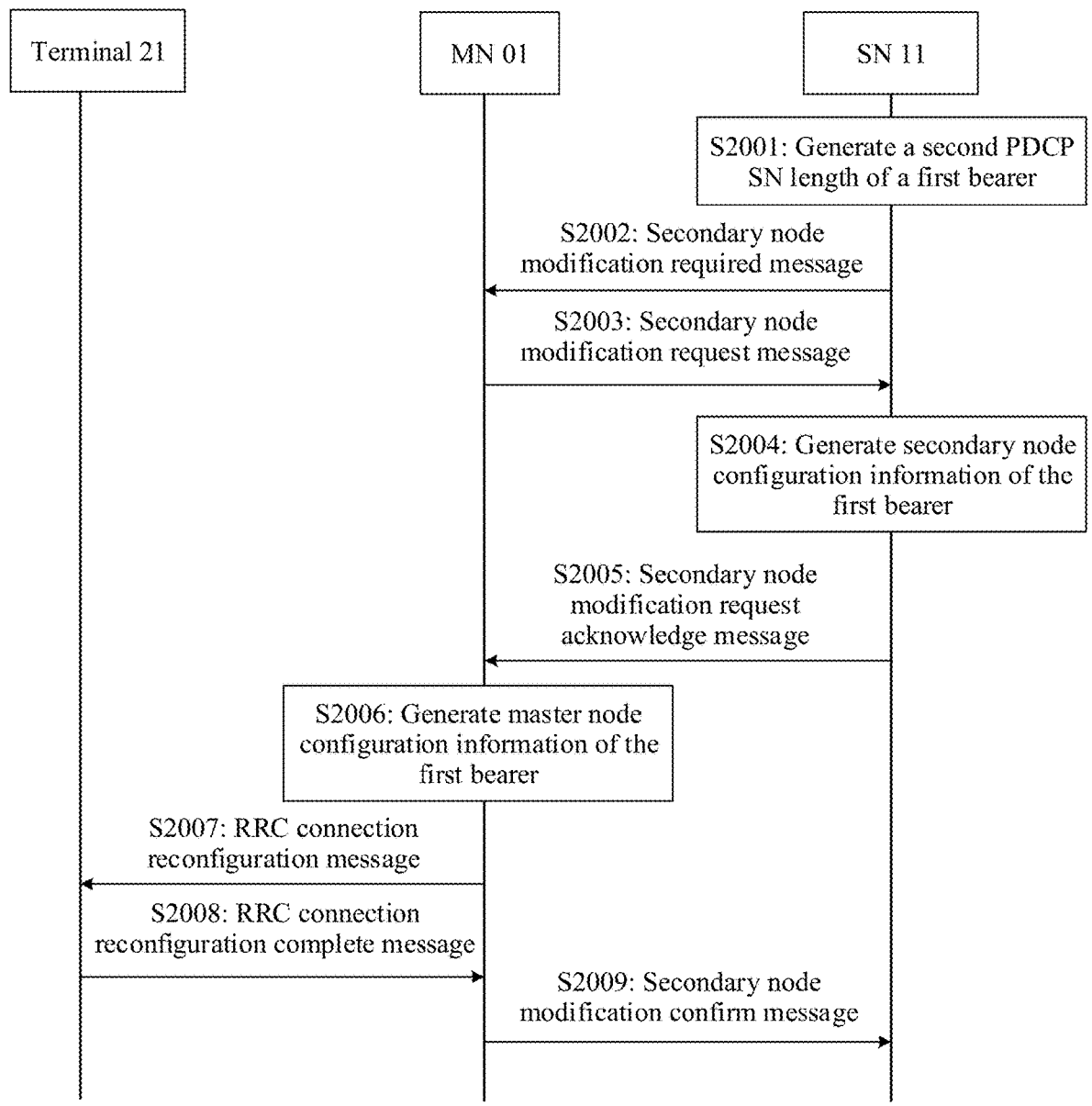
FIG. 20 is a schematic diagram of another implementation of changing a PDCP SN length.

FIG. 18 to FIG. 20 describe a solution for changing a PDCP SN length below. In this solution, when the PDCP SN length is changed, an MN 01 may allocate a new bearer identifier to a bearer, and then the MN 01 and an SN 11 generate configuration information for releasing an entity corresponding to an old bearer identifier of the bearer and configuration information for adding an entity corresponding to the new bearer identifier of the bearer. A terminal 21 releases the entity corresponding to the old bearer identifier of the bearer and adds the entity corresponding to the new bearer identifier of the bearer. The following describes this method from a perspective of a master node and a secondary node.

The following M1 method may be performed by a master node or a chip in a master node, and the M1 method includes the following steps.

M101: Obtain a second PDCP SN length of a first bearer.

Optionally, the second PDCP SN length of the first bearer may be generated or determined by the master node, or the second PDCP SN length of the first bearer may be received from a secondary node.

M102: Determine a second bearer identifier of the first bearer when the second PDCP SN length of the first bearer is different from a first PDCP SN length of the first bearer.

The first PDCP SN length of the first bearer may be a length of the first bearer stored by the master node before the second PDCP SN length of the first bearer is obtained.

Optionally, the second bearer identifier of the first bearer is different from a first bearer identifier of the first bearer.

Optionally, the first bearer identifier of the first bearer may be a bearer identifier of the first bearer when a PDCP SN length of the first bearer is the first PDCP SN length.

Optionally, the first bearer identifier of the first bearer may be a bearer identifier that is of the first bearer and that is stored by the master node.

M103: Send the second bearer identifier of the first bearer to the secondary node.

Optionally, the method may further include M104 to M106.

M104: Receive secondary node configuration information of the first bearer from the secondary node.

Optionally, the secondary node configuration information of the first bearer may include configuration information for adding an entity that is on the secondary node and that corresponds to the second bearer identifier of the first bearer.

Optionally, the secondary node configuration information of the first bearer may include configuration information for releasing an entity that is on the secondary node and that corresponds to the first bearer identifier of the first bearer.

M105: Generate master node configuration information of the first bearer.

Optionally, the master node configuration information of the first bearer may include configuration information for adding an entity that is on the master node and that corresponds to the second bearer identifier of the first bearer.

Optionally, the master node configuration information of the first bearer may include configuration information for releasing an entity that is on the master node and that corresponds to the first bearer identifier of the first bearer.

M106: Send the secondary node configuration information of the first bearer and the master node configuration information of the first bearer to a terminal.

The following M2 method may be performed by a secondary node or a chip in a secondary node.

M201: Determine a second PDCP SN length of a first bearer.

M201 is optional.

M202: Receive a second bearer identifier of the first bearer from a master node.

M203: Send secondary node configuration information of the first bearer to the master node.

Optionally, the secondary node configuration information of the first bearer may include configuration information for adding an entity that is on the secondary node and that corresponds to the second bearer identifier of the first bearer.

Optionally, the secondary node configuration information of the first bearer may include configuration information for releasing an entity that is on the secondary node and that corresponds to the first bearer identifier of the first bearer.

The following provides further descriptions with reference to FIG. 18 to FIG. 20.

FIG. 18 is a schematic diagram of an implementation of changing a PDCP SN length, and an EN-DC scenario is used as an example.

S1801: An MN 01 sends a first request message to an SN 11.

Optionally, the first request message may be a first secondary node addition request message or a first secondary node modification request message.

For example, the first request message may be the first secondary node addition request message. A bearer type of a first bearer may be an MN-terminated MCG bearer before the MN 01 sends the secondary node addition request message to the SN 11. The MN 01 may determine a bearer type that is of the first bearer and used after a secondary node is added. The first bearer may be terminated at the SN after the secondary node is added. That is, a PDCP entity of the first bearer is on the SN 11 after the secondary node is added. For example, after the secondary node is added, the bearer type of the first bearer is an SN-terminated MCG bearer, an SN-terminated SCG bearer, or an SN-terminated split bearer.

For example, the first request message may be the first secondary node modification request message. The first secondary node modification request message may indicate to modify a bearer type of a first bearer. Before the MN 01 sends the secondary node modification request message to the SN 11, the bearer type of the first bearer may be terminated at the MN or the SN, and the MN 01 may determine to modify the bearer type of the first bearer. The first bearer may be terminated at the SN after the bearer type is modified. To be specific, a PDCP entity of the first bearer is on the SN 11 after the secondary node is added. For example, the bearer type of the first bearer is an SN-terminated MCG bearer, an SN-terminated SCG bearer, or an SN-terminated split bearer after the secondary node is added.

The first request message may include:
(1) Identifier (identifier, ID) that is of a terminal 21 and allocated by the MN 01 to the terminal 21 and that is on an interface This interface is between the MN 01 and the SN 11.

The ID that is of the terminal 21 and allocated by the MN 01 to the terminal 21 and that is on the interface is used to identify the terminal 21 on the interface between the MN 01 and the SN 11.

For example, in an EN-DC scenario, the interface between the MN 01 and the SN 11 is an X2 interface, and the ID that is allocated by the MN 01 to the terminal 21 and that is on the interface is an X2 application protocol (application protocol, AP) ID.

For another example, in an NGEN-DC, NR-DC, and NR-E-UTRA dual connectivity (NR-E-UTRA Dual Connectivity, NE-DC) scenario, the interface between the MN 01 and the SN 11 is an Xn interface, and the ID that is allocated by the MN 01 to the terminal 21 and that is on the interface is an XnAP ID. It should be noted that in NR-DC, a core network element 31 is a 5GC, the MN 01 is a gNB, and the SN 11 is a gNB. In NGEN-DC and NE-DC, the core network element 31 is a 5GC.

(2) Evolved universal terrestrial radio access network (evolved universal terrestrial radio access network, E-UTRAN) radio access bearer (E-UTRAN radio access bearer, E-RAB) ID of the first bearer
(3) First bearer identifier of the first bearer
(4) Indication information that is of the bearer type of the first bearer and used after the bearer type is modified For example, whether the PDCP entity of the first bearer is on the SN 11 after the secondary node is added, whether there is an MCG resource for the first bearer after the secondary node is added, and whether there is an SCG resource for the first bearer after the secondary node is added may be included.

For example, the PDCP entity of the first bearer is on the SN 11 after the secondary node is added, and there is an MCG resource but no SCG resource on the first bearer after the secondary node is added. That is, the bearer type of the first bearer is an SN-terminated MCG bearer after the secondary node is added. Alternatively, the PDCP entity of the first bearer is on the SN 11 after the secondary node is added, and there is an SCG resource but no MCG resource on the first bearer after the secondary node is added. That is, the bearer type of the first bearer is an SN-terminated SCG bearer after the secondary node is added. Alternatively, the PDCP entity of the first bearer is on the SN 11 after the secondary node is added, and there is an MCG resource and an SCG resource on the first bearer after the secondary node is added. That is, the bearer type of the first bearer is an SN-terminated split bearer after the secondary node is added.

(5) Configuration information that is of the PDCP entity of the first bearer and used before the bearer type is modified For example, before the SN 11 is added, the bearer type of the first bearer is an MN-terminated MCG bearer, and the configuration information of the PDCP entity of the first bearer is configuration information of a PDCP entity of the MN-terminated MCG bearer.

The configuration information that is of the PDCP entity of the first bearer and used before the bearer type is modified may be used to assist the SN 11 in generating new configuration information of the PDCP entity.

The configuration information that is of the PDCP entity of the first bearer and used before the bearer type is modified may include a first PDCP SN length of the first bearer. For example, the first PDCP SN length of the first bearer may be 12 bits, and the first PDCP SN length of the first bearer is a PDCP SN length of the first bearer before the addition of the SN 11.

Herein, the first PDCP SN length of the first bearer may include one or both of a first uplink PDCP SN length of the first bearer and a first downlink PDCP SN length of the first bearer. For example, the first PDCP SN length of the first bearer may be the first uplink PDCP SN length of the first bearer. Alternatively, the first PDCP SN length of the first bearer may be the first downlink PDCP SN length of the first bearer. Alternatively, the first PDCP SN length of the first bearer may be the first uplink PDCP SN length of the first bearer and the first downlink PDCP SN length of the first bearer. The first uplink PDCP SN length of the first bearer is an uplink PDCP SN length of the first bearer before the addition of the SN 11. The first downlink PDCP SN length of the first bearer is a downlink PDCP SN length of the first bearer before the addition of the SN 11.

For example, when the first request message is the first secondary node addition request message, for the first secondary node addition request message, refer to related content of an "SGNB ADDITION REQUEST" (SGNB ADDITION REQUEST) in section 9.1.4.1 in the 3rd generation partnership project (3rd Generation Partnership Project, 3GPP) technical specification (Technical Specification, TS) 36.423 V15.1.0. For example, the foregoing information (2) and (3) may be carried in an information element "E-RAB ID" and an information element "data radio bearer identifier" (DRB ID) that are in an "E-RABs To Be Added Item" ("E-RABs To Be Added Item") in the "SGNB ADDITION REQUEST".

For example, when the first request message is the first secondary node modification request message, for the first secondary node modification request message, refer to related content of an "SGNB MODIFICATION REQUEST" in section 9.1.4.5 in 3GPP TS 36.423 V15.1.0. For example, the foregoing information (2) and (3) may be carried in an information element "E-RAB ID" and an information element "DRB ID" that are in an "E-RABs To Be Added Item" in the "SGNB MODIFICATION REQUEST" ("SGNB MODIFICATION REQUEST").

S1802: The SN 11 determines a second PDCP SN length of the first bearer.

The second PDCP SN length of the first bearer is a PDCP SN length of the first bearer after the addition of the SN 11.

For example, when the first request message is the secondary node addition request message, the secondary node addition request message may indicate that the PDCP entity of the first bearer is on the SN 11 after the SN 11 is added, and the SN 11 may generate the second PDCP SN length of the first bearer.

For example, when the first request message is the secondary node modification request message, the secondary node modification request message may indicate that the PDCP entity of the first bearer is on the SN 11 after the bearer type is modified, and the SN 11 may generate the second PDCP SN length of the first bearer.

The second PDCP SN length of the first bearer may be different from the first PDCP SN length of the first bearer.

For example, the second PDCP SN length of the first bearer may be 18 bits.

Optionally, the second PDCP SN length may include one or both of a second uplink PDCP SN length of the first bearer and a second downlink PDCP SN length of the first bearer. For example, the second PDCP SN length of the first bearer may be the second uplink PDCP SN length of the first bearer. Alternatively, the second PDCP SN length of the first bearer may be the second downlink PDCP SN length of the first bearer. Alternatively, the second PDCP SN length of the first bearer may be the second uplink PDCP SN length of the first bearer and the second downlink PDCP SN length of the first bearer. The second uplink PDCP SN length of the first bearer is an uplink PDCP SN length of the first bearer before the modification of the bearer. The second downlink PDCP SN length of the first bearer is a downlink PDCP SN length of the first bearer before the modification of the bearer type.

It should be noted that, in this embodiment of this application, that the second PDCP SN length is different from the first PDCP SN length may be understood as that the second uplink PDCP SN length is different from the first uplink PDCP SN length, or the second downlink PDCP SN length is different from the first downlink PDCP SN length.

S1803: The SN 11 sends a first request acknowledge message to the MN 01.

Optionally, the first request acknowledge message may be a secondary node addition request acknowledge message or a secondary node modification request acknowledge message.

For example, when the first request message is the first secondary node addition request message, the first request acknowledge message is a first secondary node addition request acknowledge message. When the first request message is the first secondary node modification request message, the first request acknowledge message is a first secondary node modification request acknowledge message.

The first request acknowledge message may include:

(1) ID that is of the terminal 21 and allocated by the MN 01 to the terminal 21 and that is on an interface Reference may be made to related content of the ID that is of the terminal 21 and allocated by the MN 01 to the terminal 21 and that is on the interface in S1801.

(2) ID that is of the terminal 21 and allocated by the SN 11 to the terminal 21 and that is on an interface This interface is between the MN 01 and the SN 11.

The ID that is of the terminal 21 and allocated by the SN 11 to the terminal 21 and that is on the interface is used to identify the terminal 21 on the interface between the SN 11 and the MN 01.

For example, in the EN-DC scenario, the interface between the MN 01 and the SN 11 is an X2 interface, and the ID that is of the terminal 21 and allocated by the SN 11 to the terminal 21 and that is on the interface is an X2AP ID.

For another example, in the NGEN-DC, NR-DC, and NE-DC scenarios, the interface between the MN 01 and the SN 11 is an Xn interface, and the ID that is allocated by the SN 11 to the terminal 21 and that is on the interface is an XnAP ID.

(3) E-RAB identifier of the first bearer

This identifier may be the same as the E-RAB identifier of the first bearer carried in the first request message in S1801, and reference may be made to related content of the E-RAB identifier in S1801.

(4) Second PDCP SN length of the first bearer

Optionally, when the SN 11 determines the second PDCP SN length of the first bearer, and the second PDCP SN length of the first bearer is different from the first PDCP SN length of the first bearer, the SN 11 may not generate configuration information of an entity that is on the SN 11 and that corresponds to the first bearer identifier of the first bearer, and the first acknowledge message may not carry the configuration information of the entity that is on the SN 11 and that corresponds to the first bearer identifier of the first bearer. The configuration information of the entity that is on the SN 11 and that is of the first bearer is delivered after a second bearer identifier of the first bearer sent by the MN 01 is received. This saves a communication resource.

S1804: The MN 01 sends a second request message to the SN 11.

Optionally, the second request message may be a second secondary node addition request message or a second secondary node modification request message.

For example, when the first request message is the first secondary node addition request message, the second request message may be the second secondary node addition request message or the second secondary node modification request message.

For example, when the first request message is the first secondary node modification request message, the second request message may be the second secondary node modification request message.

In S1803, after receiving the first request acknowledge message sent by the SN 11, the MN 01 may obtain the second PDCP SN length of the first bearer, and the MN 01 may compare the first PDCP SN length of the first bearer with the second PDCP SN length of the first bearer. When the first PDCP SN length of the first bearer is different from the second PDCP SN length of the first bearer, it indicates that the SN 11 modifies the PDCP SN length of the first bearer. The MN 01 may provide the second bearer identifier for the first bearer, and send the second bearer identifier to the SN 11, so that the SN 11 releases and then adds the bearer. The second bearer identifier of the first bearer is different from the first bearer identifier of the first bearer.

The second request message may include:

(1) ID that is of the terminal 21 and allocated by the MN 01 to the terminal 21 and that is on an interface Reference may be made to related content of the ID that is of the terminal 21 and allocated by the MN 01 to the terminal 21 and that is on the interface in S1801.

(2) E-RAB identifier of the first bearer

This identifier may be the same as the E-RAB identifier of the first bearer carried in the first request message in S1801 and the E-RAB identifier of the first bearer carried in the first request acknowledge message in S1803.

(3) Second bearer identifier of the first bearer

The first bearer identifier of the first bearer and the second bearer identifier of the first bearer correspond to the same E-RAB identifier.

Optionally, for a case in which the second request message is the second secondary node modification request message, in a bearer modification list in the second secondary node modification request message, the second bearer identifier of the first bearer needs to be indicated while the E-RAB ID of the first bearer is indicated.

For example, an information element "DRB ID" may be added in an "E-RABs To Be Modified Item" ("E-RABs To Be Modified Item") in an "SGNB MODIFICATION REQUEST" in section 9.1.4.5 in 3GPP TS 36.423 V15.1.0. A specific information element structure may be shown in the following Table 1:

TABLE 1

>E-RABs To Be Modified List
>>E-RABs To Be Modified Item
>>>E-RAB ID
>>>DRB ID

Optionally, the second request message may further include first indication information.

In a first optional implementation, the first indication information is used to indicate that the bearer identifier of the first bearer is changed.

In a second optional implementation, the first indication information may indicate that the second request message is related to the first request message. Herein, that the second request message is related to the first request message may be understood as that the bearer identifier in the second request message modifies the bearer identifier in the first request message, or the second request message is a continuation of the first request message.

In a third optional implementation, the first indication information may indicate that the second request message is related to the first request acknowledge message. Herein, that the second request message is related to the first request acknowledge message may be understood as that the second request message is generated based on the first request acknowledge message, or the second request message is a response to the first request acknowledge message.

In a fourth optional implementation, the first indication information may indicate the SN 11 to generate the configuration information based on the second bearer identifier of the first bearer. For example, when the second request message is the second secondary node modification request message, the SN 11 needs to generate a set of full configurations, instead of performing delta (delta) configuration based on the configuration generated in S1803, and the first indication information may be used to indicate the SN 11 to generate the full configuration.

It should be noted that the first indication information may be carried by using an existing information element, and the existing information element may be used by the MN 01 to request a latest configuration on the SN 11 from the SN 11. In this embodiment of this application, a meaning of the information element may be extended. After receiving the second bearer identifier and the first indication information of the first bearer, the SN 11 may generate a full configuration for the terminal 21. For example, the existing information element may be an information element "SCG Configuration Query" (SCG Configuration Query) in section 9.2.103 in 3GPP TS 36.423 V15.1.0.

Alternatively, a new information element may be defined. The first indication information may be carried by using the new information element, and the new information element is used to indicate the SN 11 to generate a full configuration for the terminal 21.

The foregoing descriptions are all examples, and do not constitute any limitation.

In the foregoing plurality of optional implementations, the first indication information may specifically include one or two of the ID that is of the terminal 21 and allocated by the SN 11 to the terminal 21 and that is on the interface and the first bearer identifier of the first bearer, or may be other information. This is not limited in this embodiment of this application.

Optionally, the MN 01 and the SN 11 may determine through negotiation that, when the second request message includes one or two of the ID that is of the terminal 21 and allocated by the SN 11 to the terminal 21 and that is on the interface and the first bearer identifier of the first bearer, the first indication information may indicate content of the foregoing plurality of optional implementations.

When the second request message is the second secondary node addition request message, the first indication information is carried in the second secondary node addition request message, to prevent the SN 11 from performing the following operation: After receiving the second secondary node addition request message, because the E-RAB identifier of the first bearer carried in the second secondary node addition request message is the same as that carried in the first secondary node addition request message, the SN 11 considers the second secondary node addition request message as an abnormal message and does not perform processing.

When the second request message is the second secondary node modification request message, the first indication information is carried in the second secondary node modification request message, to prevent the SN 11 from performing the following operation: After receiving the second secondary node modification request message, the SN 11 considers that the second secondary node modification request message is used to modify the identifier of the first bearer, and modifies only the bearer identifier of the first bearer, for example, modifies the first bearer identifier to the second bearer identifier.

Optionally, the second request message may not include the first indication information. For example, the first request acknowledge message in S1803 does not include the configuration information of the entity that is on the SN 11 and that corresponds to the first bearer identifier of the first bearer. It is indicated that the SN 11 has determined that the PDCP SN length is changed but no configuration is generated in S1803. In this case, the SN 11 knows that a set of full configurations needs to be generated. In this case, no additional indication may be required.

The following describes, with reference to S1805 to S1807, that the MN 01 and the SN 11 generate configuration information for releasing an entity corresponding to the first bearer identifier and configuration information for adding an entity corresponding to the second bearer identifier for the terminal 21.

S1805: The SN 11 generates secondary node configuration information of the first bearer.

The SN 11 may generate the secondary node configuration information of the first bearer after receiving the second bearer identifier of the first bearer.

Optionally, the secondary node configuration information of the first bearer includes configuration information for releasing a PDCP entity corresponding to the first bearer identifier and configuration information for adding a PDCP entity corresponding to the second bearer identifier.

For example, the bearer type of the first bearer is an MN-terminated MCG bearer before the bearer type is modified, and the bearer type of the first bearer is an SN-terminated MCG bearer after the bearer type is modified. The secondary node configuration information of the first bearer may include the configuration information for releasing the PDCP entity corresponding to the first bearer identifier and the configuration information for adding the PDCP entity corresponding to the second bearer identifier.

Optionally, the secondary node configuration information of the first bearer may further include configuration information for adding an RLC entity corresponding to the second bearer identifier. Optionally, the secondary node configuration information of the first bearer further includes configuration information for adding a logical entity corresponding to the second bearer identifier.

For example, the bearer type of the first bearer is an MN-terminated MCG bearer before the bearer type is modified, and the bearer type of the first bearer is an SN-terminated SCG bearer or an SN-terminated split bearer after the bearer type is modified. The secondary node configuration information of the first bearer may include the configuration information for releasing the PDCP entity corresponding to the first bearer identifier, the configuration information for adding the PDCP entity corresponding to the second bearer identifier, the configuration information for adding the RLC entity corresponding to the second bearer identifier, and configuration information for adding a MAC entity corresponding to the second bearer identifier.

Optionally, the secondary node configuration information of the first bearer may further include configuration information for releasing an RLC entity corresponding to the first bearer identifier and configuration information for adding the RLC entity corresponding to the second bearer identifier. Optionally, the secondary node configuration information of the first bearer further includes configuration information for releasing a logical channel corresponding to the first bearer identifier and configuration information for adding a logical channel corresponding to the second bearer identifier.

For example, the bearer type of the first bearer is an MN-terminated split bearer before the bearer type is modified, and the bearer type of the first bearer is an SN-terminated SCG bearer or an SN-terminated split bearer after the bearer type is modified. The secondary node configuration information of the first bearer may include configurations for releasing the PDCP entity and the RLC entity that correspond to the first bearer identifier, and configurations for adding the PDCP entity and the RLC entity that correspond to the second bearer identifier. Optionally, the secondary node configuration information of the first bearer may further include a configuration for releasing the logical channel corresponding to the first bearer identifier and a configuration for adding the logical channel corresponding to the second bearer identifier.

S1806: The SN 11 sends a second request acknowledge message to the MN 01.

The second request acknowledge message may include the secondary node configuration information of the first bearer.

Optionally, the second request acknowledge message may be a second secondary node addition request acknowledge message or a second secondary node modification request acknowledge message.

For example, when the second request message is the second secondary node addition request message, the second request acknowledge message is the second secondary node addition request acknowledge message. When the second request message is the second secondary node modification request message, the second request acknowledge message is the second secondary node modification request acknowledge message.

S1807: The MN 01 generates master node configuration information of the first bearer.

Optionally, the master node configuration information of the first bearer may include the configuration information for releasing the RLC entity corresponding to the first bearer identifier of the first bearer and the configuration information for adding the RLC entity corresponding to the second bearer identifier of the first bearer. Optionally, the configuration information for releasing the logical channel corresponding to the first bearer identifier and the configuration information for adding the logical channel corresponding to the second bearer identifier may be further included.

For example, the bearer type of the first bearer is an MN-terminated MCG bearer or an MN-terminated split bearer before the bearer type is modified, and the bearer type of the first bearer is an SN-terminated MCG bearer or an SN-terminated split bearer after the bearer type is modified. The master node configuration information of the first bearer may include the configuration information for releasing the RLC entity corresponding to the first bearer identifier and the configuration information for adding the RLC entity corresponding to the second bearer identifier. Optionally, the configuration information for releasing the logical channel corresponding to the first bearer identifier and the configuration information for adding the logical channel corresponding to the second bearer identifier may be further included.

Optionally, the master node configuration information of the first bearer may include the configuration information for releasing the RLC entity corresponding to the first bearer identifier of the first bearer. Optionally, the configuration information for releasing the logical channel corresponding to the first bearer identifier may be further included.

For example, the bearer type of the first bearer is an MN-terminated MCG bearer or an MN-terminated split bearer before the bearer type is modified, and the bearer type of the first bearer is an SN-terminated SCG bearer after the bearer type is modified. The master node configuration information of the first bearer may include the configuration information for releasing the RLC entity corresponding to the first bearer identifier of the first bearer and the configuration information for releasing the logical channel corresponding to the first bearer identifier of the first bearer.

S1808: The MN 01 sends an RRC connection reconfiguration message to the terminal 21.

The RRC connection reconfiguration message may include the second bearer identifier of the first bearer, the master node configuration information of the first bearer, and the secondary node configuration information of the first bearer.

Optionally, the terminal 21 performs an operation of deleting and then adding the first bearer based on the bearer identifier, the master node configuration information of the first bearer, and the secondary node configuration information of the first bearer that are included in the RRC connection reconfiguration message.

Optionally, the terminal 21 may perform, based on the RRC connection reconfiguration message, an operation of deleting the first bearer corresponding to the first bearer identifier and an operation of adding the first bearer corresponding to the second bearer identifier.

Optionally, the terminal 21 may perform, based on the RRC connection reconfiguration message, an operation of deleting an entity corresponding to the first bearer identifier and an operation of adding the entity corresponding to the second bearer identifier.

S1809: The terminal 21 sends an RRC connection reconfiguration complete message to the MN 01.

S1810: The MN 01 sends an SN reconfiguration complete message to the SN 11.

S1811: The terminal 21 completes random access to the SN 11.

The EN-DC scenario is used as an example in FIG. 18. However, the method in FIG. 18 is also applicable to an NGEN-DC scenario, an NR-DC scenario, and an NE-DC scenario. To be specific, a core network element 31 is a 5GC. The following describes changes that occur in FIG. 18 when the core network element 31 is the 5GC.

Optionally, in the message that needs to carry the E-RAB ID in FIG. 18, the E-RAB identifier may not be carried or may be replaced with the first bearer identifier of the first bearer.

In S1801, the first request message may be the first secondary node addition request message or the first secondary node modification request message. The first request message may not carry the E-RAB identifier, and may carry the first bearer identifier of the first bearer in S1801.

In S1803, the first request acknowledge message may be the first secondary node addition request acknowledge message or the first secondary node modification request acknowledge message, and the first bearer identifier of the first bearer may be used to replace the E-RAB identifier. For example, the first request acknowledge message may not carry the E-RAB identifier, but carry the first bearer identifier of the first bearer.

In S1804, when the second request message is the second secondary node addition request message, the second request message may not carry the E-RAB identifier, but carry the first bearer identifier of the first bearer and the second bearer identifier of the first bearer in S1804. When the second request message is the second secondary node modification request message, the second secondary node modification request message may not carry the E-RAB identifier, but carry the first bearer identifier of the first bearer and the second bearer identifier of the first bearer in S1804. For example, reference may be made to Table 1. The first bearer identifier of the first bearer and the second bearer identifier of the first bearer may be carried in the information element "DRB ID" in Table 1.

For example, the first request message in FIG. 18 is the first secondary station node request message, and the second request message is the second secondary node modification request message. The second request message carries information about the first bearer identifier and the corresponding second bearer identifier, and is used to indicate the SN 11 to modify a bearer identifier. In other words, the first bearer identifier is replaced with the second bearer identifier.

According to the foregoing solution, when the core network 31 is the 5GC, the first bearer identifier of the first bearer may be used to replace the E-RAB identifier, so that the MN 01 and the SN 11 can learn that the second bearer identifier corresponds to the bearer of the first bearer identifier. In other words, the bearer identifier of the first bearer is changed.

In the method in FIG. 18, this application further provides an alternative implementation. The second bearer identifier of the first bearer may be carried in S1803. However, the first bearer identifier of the first bearer does not need to be carried. After receiving the second request message, the SN 11 determines that the second request message includes a bearer identifier of the first bearer, for example, the second bearer identifier of the first bearer. After receiving the second request message, the SN 11 may generate the secondary node configuration information of the first bearer by using a new bearer identifier, for example, generate the secondary node configuration information of the first bearer by using the second bearer identifier of the first bearer.

FIG. 19 is a schematic diagram of an implementation of changing a PDCP SN length. EN-DC is used as an example. In this implementation, a first bearer is terminated at an MN 01 before and after a bearer type is modified. In addition, the first bearer is established on the MN 01 and an SN 11 before and after the bearer type is modified.

S1901: The MN 01 determines a second PDCP SN length of the first bearer.

The first bearer is terminated at the MN 01 before and after the bearer type is modified. The MN 01 may determine a PDCP SN length of the first bearer after the modification of the bearer type. Herein, the PDCP SN length of the first bearer after the modification of the bearer type is referred to as the second PDCP SN length, and a PDCP SN length of the first bearer before the modification of the bearer type is referred to as a first PDCP SN length.

Optionally, the second PDCP SN length of the first bearer herein may be an uplink PDCP SN length and/or a downlink PDCP SN length. For details, refer to related content of the second PDCP SN length in S1802.

S1902: The MN 01 sends a secondary node modification request message to the SN 11.

When the second PDCP SN length is different from the first PDCP SN length, the MN 01 may regenerate a bearer identifier for the first bearer. Herein, the bearer identifier of the first bearer after the modification of the bearer type is referred to as a second bearer identifier of the first bearer, and a bearer identifier of the first bearer before the modification of the bearer type is referred to as a first bearer identifier of the first bearer.

The secondary node modification request message may include an ID that is allocated by the MN 01 to a terminal 21 and that is on an interface, an E-RAB ID of the first bearer, and the second PDCP SN length of the first bearer.

The secondary node modification request message may further include the second bearer identifier of the first bearer.

Optionally, in a bearer modification list in the secondary node modification request message, the second bearer identifier of the first bearer may be indicated while the E-RAB ID of the first bearer is indicated.

For example, an information element "DRB ID" may be added in an "E-RABs To Be Modified Item" in an "SGNB MODIFICATION REQUEST" in section 9.1.4.5 in 3GPP TS 36.423 V15.1.0. A specific information element structure may be shown in the foregoing Table 1.

Because when the MN 01 modifies a configuration of the bearer, the bearer modification list in the secondary node modification request message does not carry an identifier of the bearer, that the secondary node modification request message carries the second bearer identifier of the first bearer can enable the SN 11 to learn that the MN 01 modifies the PDCP SN length of the bearer, and secondary node configuration information of the bearer needs to be regenerated.

The following describes how the MN 01 and the SN 11 generate configuration information of the first bearer. The MN 01 and the SN 11 generate configuration information for releasing an entity corresponding to the first bearer identifier and configuration information for adding an entity corresponding to the second bearer identifier for the terminal 21.

S1903: The SN 11 generates the secondary node configuration information of the first bearer.

After receiving the second bearer identifier of the first bearer in S1903, the SN 11 may obtain the first bearer identifier of the first bearer by using the E-RAB identifier of the first bearer. For example, the SN 11 stores the E-RAB identifier and the first bearer identifier of the corresponding first bearer. Then, the SN 11 may compare the first bearer identifier of the first bearer with the second bearer identifier of the first bearer. When the first bearer identifier is different from the second bearer identifier of the first bearer, it indicates that the MN 01 reallocates a bearer identifier to the bearer, and the SN 11 may generate the secondary node configuration information of the first bearer.

Optionally, the secondary node configuration information of the first bearer may include configuration information for releasing an RLC entity corresponding to the first bearer identifier and configuration information for adding an RLC entity corresponding to the second bearer identifier. Optionally, the secondary node configuration information of the first bearer may include configuration information for releasing a logical channel corresponding to the first bearer identifier and configuration information for adding a logical channel corresponding to the second bearer identifier.

For example, the first bearer is an MN-terminated SCG bearer before the bearer type is modified, and the first bearer is an MN-terminated split bearer after the bearer type is modified, or the first bearer is an MN-terminated split bearer before the bearer type is modified, and the first bearer is an MN-terminated SCG bearer after the bearer type is modified. The secondary node configuration information of the first bearer may include configuration information for releasing the RLC entity and the logical channel that correspond to the first bearer identifier, and configuration information for adding the RLC entity and the logical channel that correspond to the second bearer identifier.

S1904: The SN 11 sends a secondary node modification request acknowledge message to the MN 01.

The secondary node modification request acknowledge message includes the secondary node configuration information of the first bearer.

S1905: The MN 01 generates master node configuration information of the first bearer.

Optionally, the master node configuration information of the first bearer may include configuration information for releasing a PDCP entity corresponding to the first bearer identifier and configuration information for adding a PDCP entity corresponding to the second bearer identifier.

Optionally, the master node configuration information of the first bearer may further include configuration information for adding an RLC entity corresponding to the second bearer identifier. Optionally, configuration information for adding a logical channel corresponding to the first bearer identifier may be further included.

Optionally, the master node configuration information of the first bearer may further include configuration information for releasing an RLC entity corresponding to the first bearer identifier. Optionally, the master node configuration information of the first bearer may further include configuration information for releasing a logical channel corresponding to the first bearer identifier.

For example, the first bearer is an MN-terminated SCG bearer before the bearer type is modified, and the first bearer is an MN-terminated split bearer after the bearer type is modified. The master node configuration information of the first bearer may include configuration information for releasing a PDCP entity corresponding to the first bearer identifier, configuration information for adding a PDCP entity corresponding to the second bearer identifier, and configuration information for adding an RLC entity corresponding to the second bearer identifier.

For example, the first bearer is an MN-terminated split bearer before the bearer type is modified, and the first bearer is an MN-terminated SCG bearer after the bearer type is modified. The master node configuration information of the first bearer may include configuration information for releasing a PDCP entity corresponding to the first bearer identifier, configuration information for adding a PDCP entity corresponding to the second bearer identifier, and configuration information for releasing an RLC entity corresponding to the first bearer identifier.

S1906: The MN 01 sends an RRC connection reconfiguration message to the terminal 21.

The RRC connection reconfiguration message may include the second bearer identifier of the first bearer, the secondary node configuration information of the first bearer, and the master node configuration information of the first bearer.

Optionally, the terminal 21 performs an operation of deleting and then adding the first bearer based on the bearer identifier, the master node configuration information of the first bearer, and the secondary node configuration information of the first bearer that are included in the RRC connection reconfiguration message.

Optionally, the terminal 21 may perform, based on the RRC connection reconfiguration message, an operation of deleting the first bearer corresponding to the first bearer identifier and an operation of adding the first bearer corresponding to the second bearer identifier.

Optionally, the terminal 21 may perform, based on the RRC connection reconfiguration message, an operation of deleting an entity corresponding to the first bearer identifier and an operation adding the entity corresponding to the second bearer identifier.

S1907: The terminal 21 sends an RRC connection reconfiguration complete message to the MN 01.

S1908: The MN 01 sends a secondary node modification confirm (SN modification confirm) message to the SN 11.

The EN-DC scenario is used as an example in FIG. 19. However, the method in FIG. 19 is also applicable to an NGEN-DC scenario, an NR-DC scenario, and an NE-DC scenario. To be specific, a core network element 31 is a 5GC. The following describes changes that occur in FIG. 19 when the core network element 31 is the 5GC.

Optionally, in the message that needs to carry the E-RAB ID in FIG. 19, the E-RAB identifier may be replaced with the first bearer identifier of the first bearer.

In S1902, the secondary node modification request message may not carry the E-RAB identifier, and may carry the first bearer identifier of the first bearer. In S1903, the SN 11 may determine the first bearer identifier of the first bearer and the second bearer identifier of the first bearer. When the first bearer identifier of the first bearer is different from the second bearer identifier of the first bearer, it indicates that the MN 01 reallocates a bearer identifier to the bearer, and the SN 11 may generate the secondary node configuration information of the first bearer.

FIG. 20 is a schematic diagram of an implementation of changing a PDCP SN length, and an EN-DC scenario is used as an example.

S2001: An SN 11 determines a second PDCP SN length of a first bearer.

The first bearer is terminated at the SN 11, and the SN 11 may determine to change a PDCP SN length of the first bearer, for example, to change the PDCP SN length of the first bearer from a first PDCP SN length to the second PDCP SN length.

Optionally, the first PDCP SN length herein may be a first uplink PDCP SN length and/or a first downlink PDCP SN length, and the second PDCP SN length may be a second uplink PDCP SN length and/or a second downlink PDCP SN length. Reference may be made to related content in FIG. 18 and FIG. 19.

S2002: The SN 11 sends a secondary node modification required message to an MN 01.

The secondary node modification required message includes an ID that is of a terminal 21 and allocated by the MN 01 to the terminal 21 and that is on an interface, an ID that is of the terminal 21 and allocated by the SN 11 to the terminal 21 and that is on an interface, an E-RAB ID of the first bearer, and the second PDCP SN length of the first bearer.

After receiving the secondary node modification required message, the MN 01 may obtain the first PDCP SN length of the first bearer by using the E-RAB ID of the first bearer. When the first PDCP SN length of the first bearer is different from the second PDCP SN length of the first bearer, the MN 01 may determine a second bearer identifier of the first bearer. The second bearer identifier of the first bearer is different from the first bearer identifier of the first bearer. The first bearer identifier of the first bearer is a bearer identifier that is of the first bearer and used before the MN 01 receives the secondary node modification required message. For example, the MN 01 may store the E-RAB ID of the first bearer and the first bearer identifier of the first bearer.

S2003: The MN 01 sends a secondary node modification request message to the SN 11.

The secondary node modification request message may include the E-RAB identifier and the second bearer identifier of the first bearer.

Optionally, in a bearer modification list in the secondary node modification request message, the second bearer identifier of the first bearer may be indicated while the E-RAB ID of the first bearer is indicated.

For example, an information element "DRB ID" may be added in an "E-RABs To Be Modified Item" in an "SGNB MODIFICATION REQUEST" in section 9.1.4.5 in 3GPP TS 36.423 V15.1.0. A specific information element structure may be shown in the foregoing Table 1.

S2004: The SN 11 generates secondary node configuration information of the first bearer.

Optionally, the secondary node configuration information of the first bearer may include configuration information for releasing a PDCP entity corresponding to the first bearer identifier of the first bearer and configuration information for adding a PDCP entity corresponding to the second bearer identifier of the first bearer.

Optionally, the secondary node configuration information of the first bearer may include configuration information for releasing an RLC entity corresponding to the first bearer identifier of the first bearer and configuration information for adding an RLC entity corresponding to the second bearer identifier of the first bearer. Optionally, the secondary node configuration information of the first bearer may further include configuration information for releasing a logical channel corresponding to the first bearer identifier of the first bearer and configuration information for adding a logical channel corresponding to the second bearer identifier of the first bearer.

For example, the first bearer is an SN-terminated MCG bearer before and after the PDCP SN length is changed. The secondary node configuration information of the first bearer may include the configuration information for releasing the PDCP entity corresponding to the first bearer identifier of the first bearer and the configuration information for adding the PDCP entity corresponding to the second bearer identifier of the first bearer.

For example, the first bearer is an SN-terminated split bearer before and after the PDCP SN length is changed. The secondary node configuration information of the first bearer may include the configuration information for releasing the PDCP entity and the RLC entity that correspond to the first bearer identifier of the first bearer and the configuration information for adding the PDCP entity and the RLC entity that correspond to the second bearer identifier of the first bearer. Optionally, the secondary node configuration information of the first bearer may further include the configuration information for releasing the logical channel corresponding to the first bearer identifier of the first bearer and the configuration information for adding the logical channel corresponding to the second bearer identifier of the first bearer.

S2005: The SN 11 sends a secondary node modification request acknowledge message to the MN 01.

The secondary node modification request acknowledge message may include the secondary node configuration information of the first bearer.

S2006: The MN 01 generates master node configuration information of the first bearer.

Optionally, the master node configuration information of the first bearer may include the configuration information for releasing the RLC entity corresponding to the first bearer identifier of the first bearer and the configuration information for adding the RLC entity corresponding to the second bearer identifier of the first bearer. Optionally, the master node configuration information of the first bearer may further include the configuration information for releasing the logical channel corresponding to the first bearer identifier of the first bearer and the configuration information for adding the logical channel corresponding to the second bearer identifier of the first bearer.

For example, the first bearer is an SN-terminated MCG bearer or an SN-terminated split bearer before and after the PDCP SN length is changed. The master node configuration information of the first bearer may include the configuration information for releasing the RLC entity and the configuration information for adding the RLC entity corresponding to the second bearer identifier of the first bearer. Optionally, the master node configuration information of the first bearer may further include the configuration information for releasing the logical channel corresponding to the first bearer identifier of the first bearer and the configuration information for adding the logical channel corresponding to the second bearer identifier of the first bearer.

S2007: The MN 01 sends an RRC connection reconfiguration message to the terminal 21.

Optionally, the terminal 21 performs an operation of deleting and then adding the first bearer based on the bearer identifier, the master node configuration information of the first bearer, and the secondary node configuration information of the first bearer that are included in the RRC connection reconfiguration message.

Optionally, the terminal 21 may perform, based on the RRC connection reconfiguration message, an operation of deleting the first bearer corresponding to the first bearer identifier and an operation of adding the first bearer corresponding to the second bearer identifier.

Optionally, the terminal 21 may perform, based on the RRC connection reconfiguration message, an operation of deleting an entity corresponding to the first bearer identifier and an operation of adding the entity corresponding to the second bearer identifier.

S2008: The terminal 21 sends an RRC connection reconfiguration complete message to the MN 01.

S2009: The MN 01 sends a secondary node modification confirm message to the SN 11.

The EN-DC scenario is used as an example in FIG. 20. However, the method in FIG. 20 is also applicable to an NGEN-DC scenario, an NR-DC scenario, and an NE-DC scenario. To be specific, a core network element 31 is a 5GC. The following describes changes that occur in FIG. 20 when the core network element 31 is the 5GC.

In S2002, the secondary node modification required message may not carry the E-RAB ID of the first bearer, but carry the first bearer identifier of the first bearer.

In S2003, the secondary node modification request message may not carry the E-RAB ID of the first bearer, but carry the first bearer identifier of the first bearer. To be specific, the secondary node modification request message may carry the first bearer identifier of the first bearer and the second bearer identifier of the first bearer.

The M1 method, M2 method, and FIG. 18 to FIG. 20 describe several method flowcharts of changing the PDCP SN length. It should be understood that the MN 01 may have a functional unit corresponding to a step of a method or procedure of the MN 01, and the SN 11 may have a functional unit corresponding to a step of a method or procedure of the SN 11.

Actions performed by the MN 01 in the M1 method, the M2 method, and the methods in FIG. 18 to FIG. 20 may be implemented by the communications apparatus provided in FIG. 6A, FIG. 15, or FIG. 17. Actions performed by the SN 11 in the M1 method, the M2 method, and the methods in FIG. 18 to FIG. 20 may be implemented by the structure of the SN 11 provided in FIG. 6B, FIG. 16, or FIG. 17. For details, refer to related content in FIG. 6A, FIG. 6, and FIG. 15 to FIG. 17.

The M1 method, the M2 method, and the methods in FIG. 18 to FIG. 20 may be implemented by using a computer-readable storage medium and a computer program product. For details, refer to related content of the computer-readable storage medium and the computer program product in the embodiments of this application.

An embodiment of this application provides a communications apparatus, including a memory and a processor. The memory is configured to store a computer program, and the processor is configured to invoke and run the computer program from the memory, so that the communications apparatus performs the M1 method, the M2 method, and the method performed by the MN 01 in FIG. 18 to FIG. 20.

An embodiment of this application provides a communications apparatus, including a memory and a processor. The memory is configured to store a computer program, and the processor is configured to invoke and run the computer program from the memory, so that the communications apparatus performs the M1 method, the M2 method, and the method performed by the SN 11 in FIG. 18 to FIG. 20.

An embodiment of this application provides a computer storage medium, storing a program configured to perform the foregoing M1 method, the foregoing M2 method, and the method of the MN 01 or the SN 11 in FIG. 18 to FIG. 20.

An embodiment of this application provides a computer program product. The program product includes a program. When the program is run, the foregoing M1 method, the foregoing M2 method, and the method of the MN 01 or the SN 11 in FIG. 18 to FIG. 20 are performed.

Mutual reference and citation may be made between the M1 method, the M2 method, and the methods in FIG. 18 to FIG. 20 and the remaining content of the embodiments of this application.

What is claimed is:

1. A communication system, comprising a first communications apparatus and a second communications apparatus, wherein the first communications apparatus is a master node or a centralized unit of the master node, and the second communications apparatus is a secondary node or a centralized unit of the secondary node, wherein the master node and the secondary node are both connected to a terminal, and wherein the second communications apparatus is configured to:

generate first packet data convergence protocol sequence number (PDCP SN) length information, wherein the first PDCP SN length information indicates a first PDCP SN length of a first bearer terminated at the secondary node, wherein the first PDCP SN length is determined by the second communications apparatus, and a PDCP SN length of the first bearer is a second PDCP SN length before the first PDCP SN length is determined by the second communications apparatus, and the first PDCP SN length is different from the second PDCP SN length, and wherein the first PDCP SN length indicates a number of bits occupied by a PDCP SN in a PDCP packet, and wherein the first bearer is a Master Cell Group (MCG) bearer terminated at the secondary node or a split bearer terminated at the secondary node; and generate configuration information for releasing and adding a packet data convergence protocol (PDCP) entity of the first bearer; and send the first PDCP SN length information and first configuration information to the first communications apparatus, wherein the first configuration information comprises the configuration information for releasing and adding the PDCP entity of the first bearer; and wherein the first communications apparatus is configured to:

receive the first PDCP SN length information and the first configuration information from the second communications apparatus;

obtain the first PDCP SN length indicated by the first PDCP SN length information;

send the first configuration information and second configuration information of the first bearer to the terminal, wherein the first PDCP SN length is different from the second PDCP SN length, wherein the second configuration information of the first bearer comprises configuration information for releasing and adding a radio link control (RLC) entity of the first bearer.

2. The system according to claim 1, wherein the configuration information for releasing and adding the PDCP entity of the first bearer comprises configuration information for releasing a PDCP entity corresponding to a bearer identifier of the first bearer and configuration information for adding a PDCP entity corresponding to the bearer identifier.

3. The system according to claim 2, wherein the configuration information for releasing a PDCP entity and the configuration information for adding a PDCP entity include the same bearer identifier.

4. The system according to claim 1, wherein the second communications apparatus is the centralized unit of the secondary node, wherein the first configuration information further comprises configuration information for releasing and adding a radio link control (RLC) entity of the first bearer, and wherein the second communications apparatus is further configured to:
receive the configuration information for releasing and adding the RLC entity of the first bearer from a distributed unit of the secondary node.

5. The system according to claim 1, wherein the second communications apparatus is the secondary node, wherein the first configuration information further comprises configuration information for releasing and adding a radio link control (RLC) entity of the first bearer, and wherein the second communications apparatus is further configured to:
generate the configuration information for releasing and adding the RLC entity of the first bearer.

6. The system according to claim 5, wherein the configuration information for releasing and adding the RLC entity of the first bearer comprises configuration information for releasing an RLC entity corresponding to a bearer identifier of the first bearer and configuration information for adding an RLC entity corresponding to the bearer identifier.

7. The system according to claim 1, wherein the first communications apparatus is the master node, and wherein the first communications apparatus is further configured to:
generate the second configuration information of the first bearer.

8. The system according to claim 1, wherein the first communications apparatus is the centralized unit of the master node, and wherein the first communications apparatus is further configured to:
receive the second configuration information of the first bearer from a distributed unit of the master node.

9. The system according to claim 6, wherein the configuration information for releasing a RLC entity and the configuration information for adding a RLC entity include the same bearer identifier.

10. An apparatus for a terminal, comprising at least one processor, wherein the at least one processor is coupled to a memory storing executable instructions that, when executed by the at least one processor, cause the terminal to perform operations comprising:
receiving first configuration information of a first bearer from a secondary node through a master node, wherein the first configuration information comprises configuration information for releasing and adding, by the terminal, a packet data convergence protocol (PDCP) entity of the first bearer terminated at the secondary node, wherein the first configuration information further comprises configuration information for releasing and adding a radio link control protocol layer (RLC) entity of the first bearer; and the configuration information for releasing and adding the RLC entity comprises configuration information for releasing the RLC entity corresponding to a bearer identifier of the first bearer and configuration information for adding the RLC entity corresponding to the bearer identifier; and
configuring the first bearer based on the first configuration information, wherein the terminal connects to both the master node and the secondary node; and wherein:
the configuration information for releasing and adding a PDCP entity comprises configuration information for releasing a PDCP entity and configuration information for adding a PDCP entity, and the configuration information for releasing a PDCP entity and the configuration information for adding a PDCP entity include a same bearer identifier; and wherein configuring the first bearer based on the first configuration information comprises:
releasing a PDCP entity of the first bearer, and adding a PDCP entity of the first bearer, based on the configuration information for releasing and adding a PDCP entity of the first bearer, wherein a PDCP sequence number (SN) length of the released PDCP entity is different from a PDCP SN length of the added PDCP entity.

11. The apparatus according to claim 10, wherein the operations further comprises:
receiving second configuration information of the first bearer from the master node, wherein the second configuration information comprises configuration information for releasing and adding a radio link control (RLC) entity of the first bearer; and
configuring the first bearer based on the second configuration information.

12. The apparatus according to claim 11, wherein the configuration information for releasing and adding an RLC entity of the first bearer comprises configuration information for releasing an RLC entity corresponding to a bearer identifier of the first bearer and configuration information for adding an RLC entity corresponding to the bearer identifier.

13. A communication method, comprising:
receiving, by a terminal, first configuration information of a first bearer from a secondary node through a master node, wherein the first configuration information comprises configuration information for releasing and adding, by the terminal, a packet data convergence protocol (PDCP) entity of the first bearer terminated at the secondary node, wherein the first configuration information further comprises configuration information for releasing and adding a radio link control protocol layer (RLC) entity of the first bearer; and the configuration information for releasing and adding the RLC entity comprises configuration information for releasing the RLC entity corresponding to a bearer identifier of the first bearer and configuration information for adding the RLC entity corresponding to the bearer identifier; and
configuring, by the terminal, the first bearer based on the first configuration information, wherein the terminal connects to both the master node and the secondary node; and wherein:
the configuration information for releasing and adding a PDCP entity comprises configuration information for releasing a PDCP entity and configuration information for adding a PDCP entity, and the configuration information for releasing a PDCP entity and the configuration information for adding a PDCP entity include a same bearer identifier; and wherein configuring the first bearer based on the first configuration information comprises:
releasing, by the terminal, a PDCP entity of the first bearer, and adding a PDCP entity of the first bearer, based on the configuration information for releasing and adding a PDCP entity of the first bearer, wherein a PDCP sequence number (SN) length of the released PDCP entity is different from a PDCP SN length of the added PDCP entity.

14. The method according to claim 13, wherein the method further comprises:
receiving, by the terminal, second configuration information of the first bearer from the master node, wherein the second configuration information comprises configuration information for releasing and adding a radio link control (RLC) entity of the first bearer; and
configuring, by the terminal, the first bearer based on the second configuration information.

* * * * *